US012638912B1

(12) United States Patent
Brayman et al.

(10) Patent No.: US 12,638,912 B1
(45) Date of Patent: *May 26, 2026

(54) AUTOMATED METHODS AND SYSTEMS THAT INFER, TRACK, STORE, AND REPORT EMOTIONAL STATES AND EMOTIONAL DYNAMICS TO RENDER COMPUTATIONAL SYSTEMS EMOTIONALLY AWARE

(71) Applicant: Affective Software, Inc., Seattle, WA (US)

(72) Inventors: Vladimir Brayman, Mercer Island, WA (US); Yuriy Gulak, Highland Park, NJ (US); John Gottman, Deer Harbor, WA (US); Rafael Lisitsa, Seattle, WA (US); Robert W. Bergstrom, Bainbridge Island, WA (US)

(73) Assignee: Affective Software, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/936,092

(22) Filed: Nov. 4, 2024

Related U.S. Application Data

(63) Continuation of application No. 18/544,055, filed on Dec. 18, 2023, now Pat. No. 12,164,680.

(51) Int. Cl.
*G06F 3/01* (2006.01)

(52) U.S. Cl.
CPC ........ *G06F 3/011* (2013.01); *G06F 2203/011* (2013.01)

(58) Field of Classification Search
CPC ........................... G06F 3/011; G06F 2203/011
See application file for complete search history.

(56) References Cited

U.S. PATENT DOCUMENTS

| | | | |
|---|---|---|---|
| 10,437,332 B1 * | 10/2019 | Paterson | G06F 40/166 |
| 2005/0143138 A1 * | 6/2005 | Lee | G06F 3/011 455/566 |
| 2014/0324749 A1 * | 10/2014 | Peters | G09B 7/04 706/46 |
| 2016/0288708 A1 * | 10/2016 | Chang | G06V 20/597 |

* cited by examiner

*Primary Examiner* — Michael Pervan
(74) *Attorney, Agent, or Firm* — OPWII, LLC

(57) ABSTRACT

The current document is directed to methods and systems that provide an emotional compass that reflects the emotional states of human beings, dynamics of the emotional states over time periods, emotional synchronization between humans and between humans and automated interactive systems, and the degree to which the emotional state of one human is influenced or affected by the emotional state of another human or by an automated interactive system. The emotional compass can be used for continuous or intermittent emotional orientation by both automated systems and human analysts. The emotional awareness provided by the emotional compass facilitates continuous or intermittent strategy selection for achieving various different types of emotion-related results.

21 Claims, 59 Drawing Sheets

FIG. 5D emotion = <valence, arousal>

$$\frac{d\theta_i}{dt} = \omega_i + \frac{K}{N} \sum_{j=1,\, j \neq i}^{N} \sin(\theta_j - \theta_i) \quad\text{—— 1020}$$

where N = number of oscillators, $\omega_i$ = natural frequency of oscillator i, and K = coupling constant << 1

$K > K_c \longrightarrow$ synchronization ($K > K_{max} \longrightarrow$ full synchronization)

$K = 0 \longrightarrow$ no synchronization $0 < K < K_c \longrightarrow$ various chaotic behaviors or periodic orbits 1022 $\left\{ \begin{array}{l} \text{oscillators } \{O_1,\ O_2\} \\ S_{O_1} = <x_1,\ x_2,\ x_3,\ ...,\ x_n>^T \quad\text{—— 1024} \\ S_{O_2} = <y_1,\ y_2,\ y_3,\ ...,\ y_m>^T \quad\text{—— 1026} \qquad\qquad\qquad\text{—— 1028} \\ \text{synchronization occurs when } S_{O_1} = F(S_{O_2}) \text{ and } S_{O_2} = F^{-1}(S_{O_1}) \end{array} \right.$ 1030 $\left\{ \begin{array}{l} \text{oscillators } \{O_1,\ O_2\} \\ S_{O_1} = <x_1,\ x_2,\ x_3,\ ...,\ x_n>^T \\ S_{O_2} = <y_1,\ y_2,\ y_3,\ ...,\ y_n>^T \\ \text{synchronization occurs when, for each } i \in \{1,\ ...,\ n\},\ y_i(t) = x_i(t+\tau) \end{array} \right.$

FIG. 10C $$Y = \frac{1}{N} \cdot \sum_{i=1}^{N} |\Delta_i - \bar{\Delta}| = 0.0$$

Figure 12A:
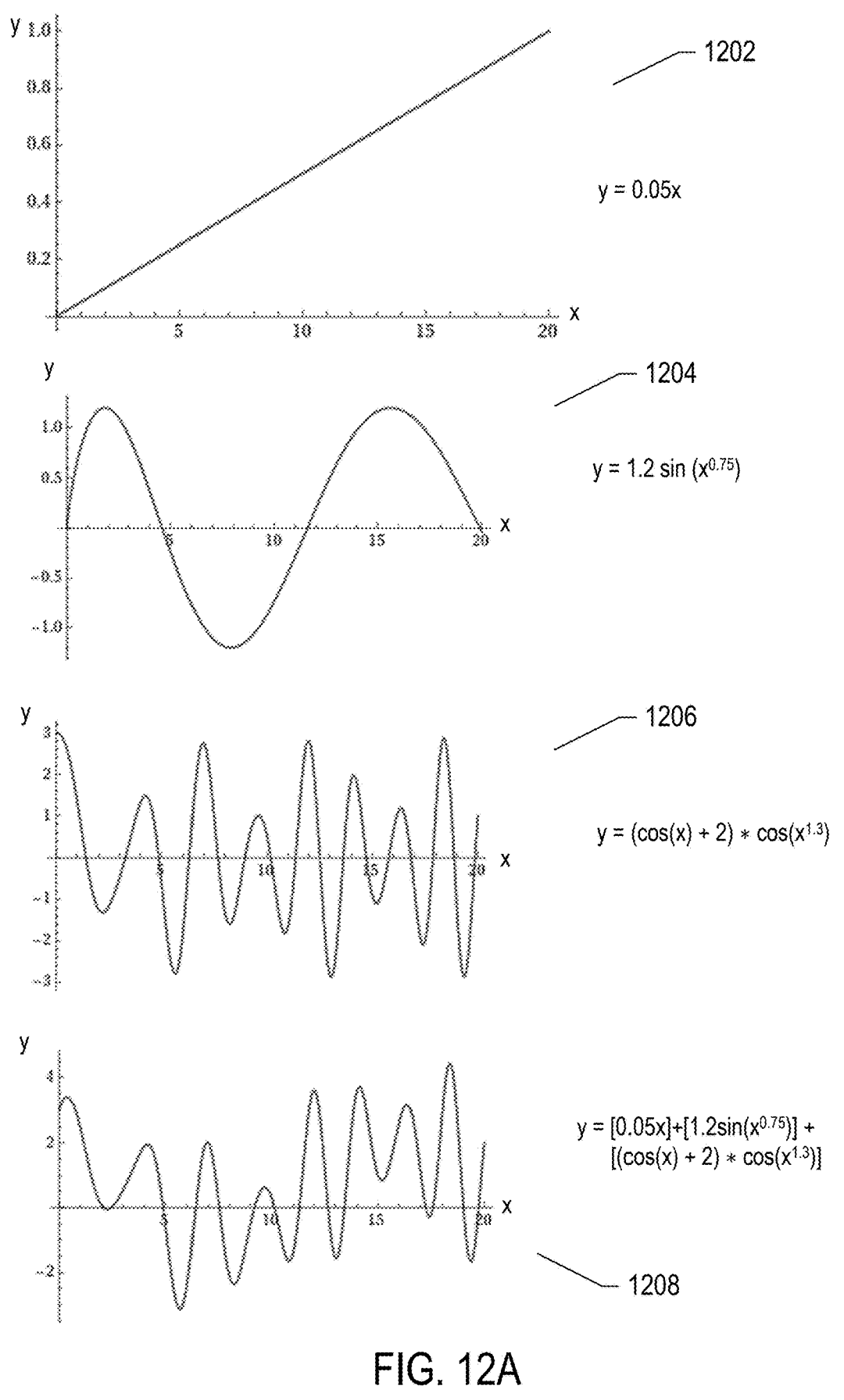

1202

$y = 0.05x$

1204

$y = 1.2 \sin(x^{0.75})$

1206

$y = (\cos(x) + 2) * \cos(x^{1.3})$ $y = [0.05x] + [1.2\sin(x^{0.75})] + [(\cos(x) + 2) * \cos(x^{1.3})]$

| | p1 | p2 |
|---|---|---|
| | $\dfrac{dv_{p1}}{dt}$ | $\dfrac{dv_{p2}}{dt}$ |
| | $\dfrac{da_{p1}}{dt}$ | $\dfrac{da_{p2}}{dt}$ |
| | $\dfrac{dPC}{dt}$ | $\dfrac{dY}{dt}$ | emotion dynamics

```
const int MAX_DATA = 101;
const int MIN_DATA_SIZE = 30;
const int IGNORE = 10;
const int MAX_SPLINES = (MAX_DATA / 2) + 1;
const int MAX_IMFs = 20;
const double COMPARE_THRESHOLD = 2.0;
const double MONOTONIC_HIGH_THRESHOLD = 0.001;
const double MONOTONIC_LOW_THRESHOLD = -0.001;
const double RANGE_THRESHOLD = .05;
const double NEW_DS_RANGE_THRESHOLD = .075;
const int MAX_K = 10;
```
⎫ 1702

```
enum exType { MIN, MAX, NONE };
```
— 1704

```
struct extremum
{
    double y;
    int x;
    exType type;
};
```
⎬ 1706

```
struct spline
{
        extremum knot;
        double m;
};
```
⎬ 1708

```
class dataset

{
    private:
        double data[MAX_DATA];
        int data_size;

public:
        dataSet();
        int size() { return data_size; };
        void clear(){ data_size = 0;  };
        bool setSize(int sz);
        double& operator[] (int i);
        dataSet& operator= (dataSet& dS);
        exType getFirstExpectedExType();
        bool getNext(extremum& ex);
        void init();
        void minMax(double& min, double& max, bool constrained);
};
```
⎬ 1710

```
using dataSetPtr = dataSet*;
```

FIG. 17A

```
class splines
{
   private:
        spline splineSet[MAX_SPLINES];
        int numKnots;
        bool splinesGenerated;

public:                                                        } 1712
        splines();
        void clear();
        void inputFirstKnot(extremum ex);
        bool inputNextKnot(extremum ex, bool lastKnot);
        bool generateSplines(dataSet& dS);
        bool generateDataSet(dataSet &dS, int numDataPoints, exType type);
};

class IMFs
{
   private:
        dataSet DS;
        splines upperEnv;
        splines lowerEnv;
        dataSet upper;
        dataSet lower;
        dataSet average;
        dataSet currentProtoIMF;
        dataSet previousProtoIMF;
        dataSetPtr IMF[MAX_IMFs];
        int numIMFs;
        bool compare(dataSet* dS1, dataSet* dS2);
        bool initializeEnvelopes(extremum& ex);               } 1714
        bool generateEnvelopes(extremum& ex);
        bool generateAverage();
        bool monotonic();

public:
        IMFs();
        bool generateIMFs(dataSet& dS);
        int getNum() { return numIMFs; }
        dataSetPtr getIMF(int i)
              { if (i >= 0 && i < numIMFs) return IMF[i]; else return NULL; };
        dataSetPtr getTrend() { return &DS; };
};
```

FIG. 17B

```
dataSet::dataSet()
{
   time_t t;

clear();
   time(&t);
   srand(t);
} bool dataSet::setSize(int sz)
{
   if (sz > MAX_DATA) return false;
   data_size = sz;
   return true;
} double& dataSet::operator[] (int i)
{
   if (i < 0 || i > data_size - 1) return data[0];
   else return data[i];
} dataSet& dataSet::operator= (dataSet& dS)
{
   int i;

data_size = dS.size();
   for (i = 0; i < data_size; i++) data[i] = dS[i];
   return *this;
} exType dataSet::getFirstExpectedExType()
{
   double initV;
   int i = 1;

if (data_size < 2) return NONE;
   initV = data[0];
   do
   {
      if (data[i] != initV)
      {
         if (data[i] < initV) return MIN;
         else return MAX;
      }
      i++;
   } while (i < (data_size));
   return NONE;
}
```

FIG. 17C

```
void dataSet::minMax(double& min, double& max, bool constrained)
{
    int i, start, end;

min = 5000000;
    max = -5000000;

if (constrained && data_size > MIN_DATA_SIZE)
    {
        start = IGNORE;
        end = data_size - IGNORE;
    }
    else
    {
        start = 0;
        end = data_size;
    } for (i = start; i < end; i++)
    {
        if (data[i] < min) min = data[i];
        if (data[i] > max) max = data[i];
    }
} splines::splines()
{
    clear();
} void splines::clear()
{
    numKnots = 0;
    splinesGenerated = false;
} void splines::inputFirstKnot(extremum ex)
{
    numKnots = 1;
    splineSet[0].knot = ex;
} bool splines::inputNextKnot(extremum ex, bool lastKnot)
{ if (numKnots >= MAX_SPLINES) return false;
    splineSet[numKnots].knot = ex;
    return true;
}
```

FIG. 17D

```
bool dataSet::getNext(extremum& ex)
{
    int i = ex.x + 1;
    int j, lastU, pW, back;
    exType newType;

if ((i < 1) || (i >= data_size)) return false;
    while (true)
    {
        if (data[i] != ex.y) break;
        i++;
        if (i == data_size) return false;
    }
    lastU = i;
    if (ex.type == MIN) newType = MAX;
    else newType = MIN;

while (true)
    {
        if (i == (data_size - 1)) return false;
        else
        {
            i++;
            if ((ex.type == MIN && (data[i] < data[i - 1])) || (ex.type == MAX && (data[i] > data[i - 1])))
            {
                pW = i - lastU;
                if (pW > 1)
                {
                    if (pW % 2) back = (pW / 2) + 1;
                    else
                    {
                        j = (rand() % 8) >> 3;
                        back = (pW / 2) + j;
                    }
                }
                else back = 1;
                ex.x = i - back;
                ex.y = data[ex.x];
                ex.type = newType;
                return true;
            }
            else if ((ex.type == MIN && data[i] > data[i - 1]) ||
                    (ex.type == MAX && data[i] < data[i - 1]))
                lastU = i;
        }
    }
}
```

FIG. 17E

```
bool splines::generateSplines()
{
    int i;
    int n = numKnots - 1;

if (numKnots < 2) return false;
    splineSet[0].m = (splineSet[1].knot.y - splineSet[0].knot.y) /
                     (splineSet[1].knot.x - splineSet[0].knot.x);
    splineSet[n].m = (splineSet[n].knot.y - splineSet[n - 1].knot.y) /
                     (splineSet[n].knot.x - splineSet[n - 1].knot.x);
    for (i = 1; i < n; i++)
    {
        splineSet[i].m = 0.5 *
                        (
                            ((splineSet[i].knot.y - splineSet[i - 1].knot.y) /
                            (splineSet[i].knot.x - splineSet[i - 1].knot.x)) +
                            ((splineSet[i + 1].knot.y - splineSet[i].knot.y) /
                            (splineSet[i + 1].knot.x - splineSet[i].knot.x))
                        );
    }
    splinesGenerated = true;
    return true;
} bool splines::generateDataSet(dataSet& dS, int numDataPoints, exType type)
{
    int i, iPlus, j, k;
    double t, tp, coeff_1, coeff_2, coeff_3;
    double nextVal, inc;

if (!splinesGenerated) return false;
    dS.clear();
    if (!dS.setSize(numDataPoints)) return false;
    for (i = 0; i < numKnots; i++)
    {
        iPlus = i + 1;
        j = splineSet[i].knot.x;
        dS[j] = splineSet[i].knot.y;
        k = splineSet[iPlus].knot.x;
        inc = 1 / (double)(k - j + 1);
        t = inc;
        coeff_1 = splineSet[i].m;
        coeff_2 = ((3 * splineSet[iPlus].knot.y) -
                  (3 * splineSet[i].knot.y) -
                  (2 * splineSet[i].m) -
                  splineSet[iPlus].m);
        coeff_3 = ((2 * splineSet[i].knot.y) -
                  (2 * splineSet[iPlus].knot.y) +
                  splineSet[i].m +
                  splineSet[iPlus].m);
```

FIG. 17F

```
        for (j = j + 1; j < k; j++)
        {
            nextVal = splineSet[i].knot.y + (t * coeff_1);
            tp = t * t;
            nextVal += coeff_2 * tp;
            tp *= t;
            nextVal += coeff_3 * tp;
            dS[j] = nextVal;
            t += inc;
        }
    }
    return true;
}

IMFs::IMFs()
{
    numIMFs = 0;
    for (int i = 0; i < MAX_IMFs; i++) IMF[i] = NULL;
} bool IMFs::compare(dataset& dS1, dataset& dS2)
{
    int i, start, end;
    double diff2 = 0;
    double ds12 = 0;
    double sum = 0;

if (dS1.size() != dS2.size()) return false;
    if (dS1.size() > MIN_DATA_SIZE)
    {
        start = IGNORE;
        end = dS1.size() - IGNORE;
    }
    else
    {
        start = 0;
        end = dS1.size();
    }
    for (i = 0; i < dS1.size(); i++)
    {
        diff2 += (dS1[i] - dS2[i]) * (dS1[i] - dS2[i]);
        ds12 += dS1[i] * dS1[i];
        if (ds12 == 0.0) ds12 = 1;
        sum += diff2 / ds12;
    }
    if (sum < COMPARE_THRESHOLD) return true;
    else return false;
}
```

FIG. 17G

```
bool IMFs::initializeEnvelopes(extremum &ex)
{
    exType typ;
    extremum min, max;
    int sz = currentProtoIMF.size() - 1;

lowerEnv.clear();
    upperEnv.clear();
    max.type = MAX;
    max.x = 0;
    max.y = currentProtoIMF[0];
    min.type = MIN;
    min.x = 0;
    min.y = max.y;
    upperEnv.inputFirstKnot(max);
    lowerEnv.inputFirstKnot(min);
    typ = currentProtoIMF.getFirstExpectedExType();

if (typ == MAX)
    {
        ex = min;
        if (!currentProtoIMF.getNext(ex))
        {
            max.x = sz;
            max.y = currentProtoIMF[sz];
            upperEnv.inputNextKnot(ex, true);
            min.x = sz;
            min.y = max.y;
            lowerEnv.inputNextKnot(ex, true);
            return true;
        }
        else if (ex.type == MIN) return false;
        else
        {
            upperEnv.inputNextKnot(ex, false);
            return true;
        }
    }
    else
    {
        ex = max;
        if (!currentProtoIMF.getNext(ex))
        {
            max.x = sz;
            max.y = currentProtoIMF[sz];
            upperEnv.inputNextKnot(ex, true);
            min.x = sz;
            min.y = max.y;
            lowerEnv.inputNextKnot(ex, true);
            return true;
```

FIG. 17H

```
        }
        else if (ex.type == MAX) return false;
        else
        {
            lowerEnv.inputNextKnot(ex, false);
            return true;
        }
    }
}
} bool IMFs::generateAverage()
{
    int i;
    if (!average.setSize(DS.size())) return false;
    for (i = 0; i < DS.size(); i++) average[i] = ((upper[i] - lower[i]) / 2) + lower[i];
    return true;
} bool IMFs::generateEnvelopes(extremum &ex)
{
    exType exT;
    extremum min, max;
    int sz = currentProtoIMF.size() - 1;

while (true)
    {
        exT = ex.type;
        if (!currentProtoIMF.getNext(ex))
        {
            max.type = MAX;
            max.x = sz;
            max.y = currentProtoIMF[sz];
            min.type = MIN;
            min.x = sz;
            min.y = currentProtoIMF[sz];
            upperEnv.inputNextKnot(max, true);
            lowerEnv.inputNextKnot(min, true);
            return true;
        }
        if (ex.type == exT) return false;
        if (exT == MIN) upperEnv.inputNextKnot(ex, false);
        else lowerEnv.inputNextKnot(ex, false);
    }
}
```

FIG. 17I

```
bool IMFs::monotonic()
{
    int i;
    double current = DS[0];
    double dir = 0;
    double diff = 0;

for (i = 1; i < DS.size(); i++)
    {
        diff = DS[i] - DS[i-1];
        if (diff > MONOTONIC_HIGH_THRESHOLD ||
            diff < MONOTONIC_LOW_THRESHOLD)
        {
            dir = DS[i] - current;
            break;
        }
    }
    if (dir == 0) return true;
    for (; i < DS.size(); i++)
    {
        diff = DS[i] - DS[i-1];
        if (diff > MONOTONIC_HIGH_THRESHOLD ||
            diff < MONOTONIC_LOW_THRESHOLD)
        {
            if ((dir < 0) && (diff > 0)) return false;
            else if ((dir > 0) && (diff < 0)) return false;
        }
    }
    return true;
} int main()
{
        dataSet d;
        IMFs im;
        dataSetPtr dsp;

d.init();
        if (im.generateIMFs(d))
        {

```
bool IMFs::generateIMFs(dataSet& dS)
{
    extremum ex;
    int i, j = 0;
    double min, max, range, initial_range = -1;
    bool firstIter, done;

DS = dS;
    currentProtoIMF = dS;
    DS.minMax(min, max, true);
    initial_range = max - min;
    range = initial_range;

while (j < MAX_IMFs)                              —— 1720
    {
        firstIter = true;
        for (i = 0; i < MAX_K; i++)                   —— 1724
        {
            if (!initializeEnvelopes(ex)) return false;
            if (!generateEnvelopes(ex)) return false;
            if (!upperEnv.generateSplines(currentProtoIMF)) return false;
            if (!lowerEnv.generateSplines(currentProtoIMF)) return false;
            upperEnv.generateDataSet(upper, DS.size(), MAX);
            lowerEnv.generateDataSet(lower, DS.size(), MIN);
            if (!generateAverage()) return false;
            for (int k = 0; k < DS.size(); k++) currentProtoIMF[k] = currentProtoIMF[k] - average[k];
            if (firstIter)
            {
                done = compare(currentProtoIMF, DS);
                firstIter = false;
            }
            else done = compare(currentProtoIMF, previousProtoIMF);
            if (done) break;
            else previousProtoIMF = currentProtoIMF;
        }                                             —— 1726
        currentProtoIMF.minMax(min, max, true);
        range = max - min;
        if (range / initial_range >= RANGE_THRESHOLD)
        {
            IMF[j] = new dataSet;
            *(IMF[j++]) = currentProtoIMF;
            numIMFs++;
        }
        for (i = 0; i < DS.size(); i++) DS[i] = DS[i] – currentProtoIMF[i];
        DS.minMax(min, max, true);
        range = max - min;
        if (range / initial_range < NEW_DS_RANGE_THRESHOLD || monotonic()) break;
        else currentProtoIMF = DS;
    }                                                 —— 1722
    return true;
}
```

FIG. 17K $$y = A\cos(\omega t + \Phi) = A\sin(\omega t + \Phi + \pi/2) \quad \text{—— 1810}$$

$$y = \text{Real}[Ae^{i\theta}] \quad \text{—— 1812}$$

$$= \text{Real}[A(\cos\theta + i * \sin\theta)] \quad \text{—— 1814}$$
$$\left.\begin{array}{l} = A\cos\theta \\ \text{where } \theta = \omega t + \Phi \end{array}\right\} 1816$$

$$\left.\begin{array}{l} y(t) = u(t) + iv(t) = a(t)\, e^{i\theta(t)} \\ \text{where } u(t) = a(t)\cos(\theta(t)) \end{array}\right\} 1818$$

$$H(u)(t) = \frac{1}{\pi}\left(P.V. \int_{-\infty}^{\infty} \frac{u(\tau)}{t-\tau}\, d\tau\right) \quad \text{—— 1820}$$

P.V. mean "principle value," where, if f(z) is multi-valued, then
P.V. f is the principle branch of f, with P.V. f(z) single-valued
for z ∈ domain of f 1822 ——— $H(\cos)(t) = \sin(t)$, i.e. $H(u)(t)$ shifts u by -90° or -π/2
but leaves A unchanged $$\left.\begin{array}{l} H(u)(t) = \frac{1}{\pi}\left(P.V. \int_{-\infty}^{\infty} \frac{u(\tau)}{t-\tau}\, d\tau\right) \\ \qquad = f(t) * g(t) \text{ where } f = u \text{ and } g(t) = \frac{1}{\pi \cdot t} \end{array}\right\} 1840$$

$$v(t) = \frac{1}{\pi}\left(P.V. \int_{-\infty}^{\infty} \frac{u(\tau)}{t-\tau}\, d\tau\right) = \sin\theta(t) \quad \text{—— 1842}$$

$$y(t) = u(t) + iv(t) = a(t)\, e^{i\theta(t)} \quad \text{—— 1844}$$

$$a(t) = \sqrt{u^2(t) + v^2(t)} \quad \text{—— 1846}$$

$$\theta(t) = \arctan\left|\frac{v(t)}{u(t)}\right| \quad \text{—— 1848}$$

$$\omega(t) = \frac{d\theta(t)}{dt} = \frac{d}{dt}\arctan\left|\frac{v(t)}{u(t)}\right| \quad \text{—— 1850}$$

FIG. 18B $$C_j(\theta_{1,j}(t), \theta_{2,j}(t))_{[0,T]} = \frac{1}{T}\left|\int_0^T e^{i\theta_{\Delta,j}(t)}dt\right| \quad\text{—— 2030}$$

$$a_j = \frac{1}{2}\left(\max_t a_{1,j}(t) + \max_t a_{2,j}(t)\right) \quad\text{—— 2032}$$

$$\omega_j = \frac{a_j}{\sum_{i=0}^{n-1} a_i}$$

$$\tilde{C}_j(\theta_{1,j}(t), \theta_{2,j}(t))_{[0,T]} = \frac{\omega_j}{T}\left|\int_0^T e^{i\theta_{\Delta,j}(t)}dt\right| \quad\text{—— 2034}$$

$$\tilde{C}(\theta_{1,0}, \theta_{1,1}, ..., \theta_{1,n-1}, \theta_{2,0}, \theta_{2,1}, ..., \theta_{2,n-1})_{[0,T]} = \sum_{i=0}^{n-1} \tilde{C}_i(\theta_1,j(t), \theta_2,i(t))_{[0,T]} \quad\text{—— 2036}$$

$$\tilde{C}(\theta_{1,0}, \theta_{1,1}, ..., \theta_{1,n-1}, \theta_{2,0}, \theta_{2,1}, ..., \theta_{2,n-1})_{[0,T]} = \frac{1}{n}\sum_{i=0}^{n-1} \tilde{C}_i(\theta_1,j(t), \theta_2,i(t))_{[0,T]}$$

AUTOMATED METHODS AND SYSTEMS THAT INFER, TRACK, STORE, AND REPORT EMOTIONAL STATES AND EMOTIONAL DYNAMICS TO RENDER COMPUTATIONAL SYSTEMS EMOTIONALLY AWARE

CROSS-REFERENCE TO RELATED APPLICATION

This application is a continuation of application Ser. No. 18/544,055, filed Dec. 18, 2023.

TECHNICAL FIELD

The current document is directed to automated systems and methods that monitor interactions between human beings and between automated systems and human beings and that track, store, and report emotional states and emotional dynamics of participants in the interactions, providing emotional awareness to automated systems.

BACKGROUND

During the past 50 years, the development and evolution of processor-controlled electronic systems, electronic communications, and electronic sensors and recorders have provided a foundation for the development and commercialization of a wide variety of different types of new technologies, products, and technological fields, including large distributed computer systems and cloud-computing facilities, a wide variety of personal computing systems and devices, smart phones, and many other types of devices and systems. Many of the new technologies are related to human social interactions and activities. These include many different types of social-networking systems and applications, Internet-enabled commerce and transactions, a wide variety of interactive systems and methods providing extensive human-to-computer and computer-to-human information-exchange interfaces, automated counseling services, automated advisors and agents, and many other technologies based on, or incorporating, interactions between humans and computers and monitoring and analysis of human interactions by monitoring-and-analysis systems. Initially, these technologies employed relatively straightforward, text-based human-to-computer and computer-to-human interfaces. However, as the types of desired interfaces and the desired capabilities of such interfaces have expanded, it has become increasingly evident that further progression in human-to-computer and computer-to-human interfaces need to incorporate methods and systems for inferring emotional states of interacting human beings and tracking the emotional states and emotional dynamics over time. Human behaviors and actions are generally driven, at least in part, by human emotional states. A significant portion of the information exchanged between humans during social interactions and humans is related to their emotional states, and humans have developed sophisticated mechanisms for inferring and responding to others' emotional states. Human-to-computer and computer-to-human interfaces, by contrast, generally fail to take into account emotional states and associated emotion-driven behaviors. Current automated technologies fall far short of the capabilities needed for emotionally competent human-to-computer and computer-to-interfaces and current human-interaction-monitoring-and-analysis systems often fail to accurately determine and track emotional states of human participants in various types of interactions, including conversations.

SUMMARY

The current document is directed to methods and systems that provide an emotional compass that reflects the emotional states of human beings, dynamics of the emotional states over time periods, emotional synchronization between humans and between humans and automated interactive systems, and the degree to which the emotional state of one human is influenced or affected by the emotional state of another human or by an automated interactive system. The emotional compass can be used for continuous or intermittent emotional orientation by both automated systems and human analysts. The emotional awareness provided by the emotional compass facilitates continuous or intermittent strategy selection for achieving various different types of emotion-related results. An automated call-center system, for example, can use the emotional compass, during an interaction with a human caller, to detect frustration or anger and to continuously select responses and proposals to increase the productivity of the interaction.

BRIEF DESCRIPTION OF THE DRAWINGS

FIGS. 5A-D illustrate two types of virtual machine and virtual-machine execution environments.

FIGS. 10A-C illustrate synchronization of two identical mechanically connected oscillators and provide various different definitions of synchronization.

FIGS. 12A-C illustrate nonstationary timeseries data and advantages associated with characterizing timeseries data using statistical metrics computed over time periods rather than metrics based on a single time point.

FIGS. 17A-K show a simple implementation of the above-described EMD analysis method in C++.

FIGS. 18A-C illustrate the meaning of the frequency and phase values incorporated into arguments to the trigonometric functions sine and cosine and illustrate the Hilbert transform and use of the Hilbert transform to generate instantaneous amplitudes, phases, and frequencies.

FIGS. 20A-B illustrate computation of the phase-coherence ("PC") metric value mentioned above with respect to FIG. 14.

DETAILED DESCRIPTION

Figure 1:
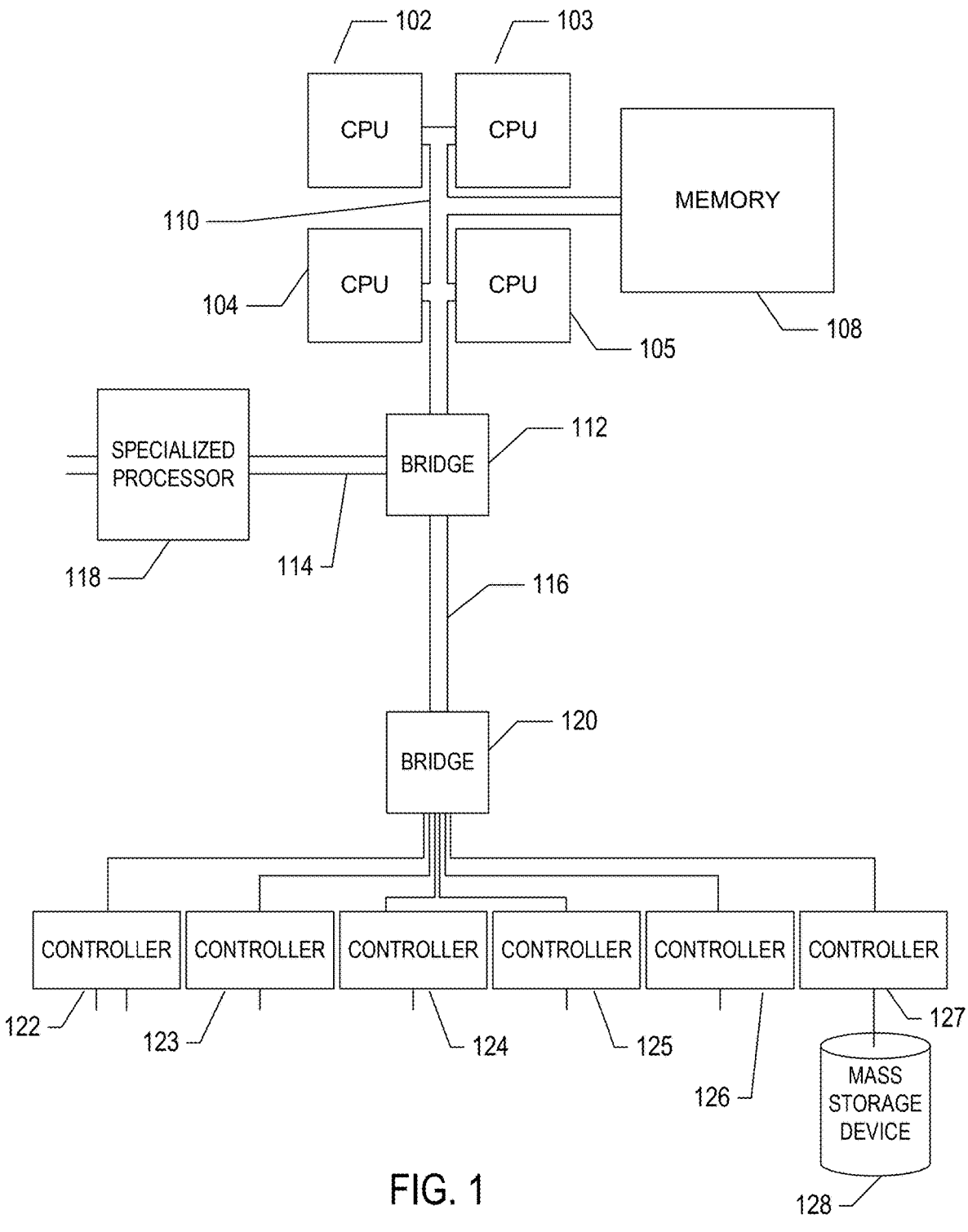
FIG. 1 provides a general architectural diagram for various types of computers.

The current application is directed to methods and systems that provide an emotional compass that reflects the emotional states of human beings, dynamics of the emotional states over time periods, emotional synchronization between humans and between humans and automated interactive systems, and a degree to which the emotional state of one human is influenced or affected by the emotional state of another human or by an automated interactive system. In a first subsection, below, a detailed description of computer hardware, complex computational systems, and virtualization is provided with reference to FIGS. 1-5D. In a second subsection, the currently disclosed methods and systems are discussed with reference to FIGS. 6A-24B.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers, including computers that implement the currently disclosed emotional compass. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
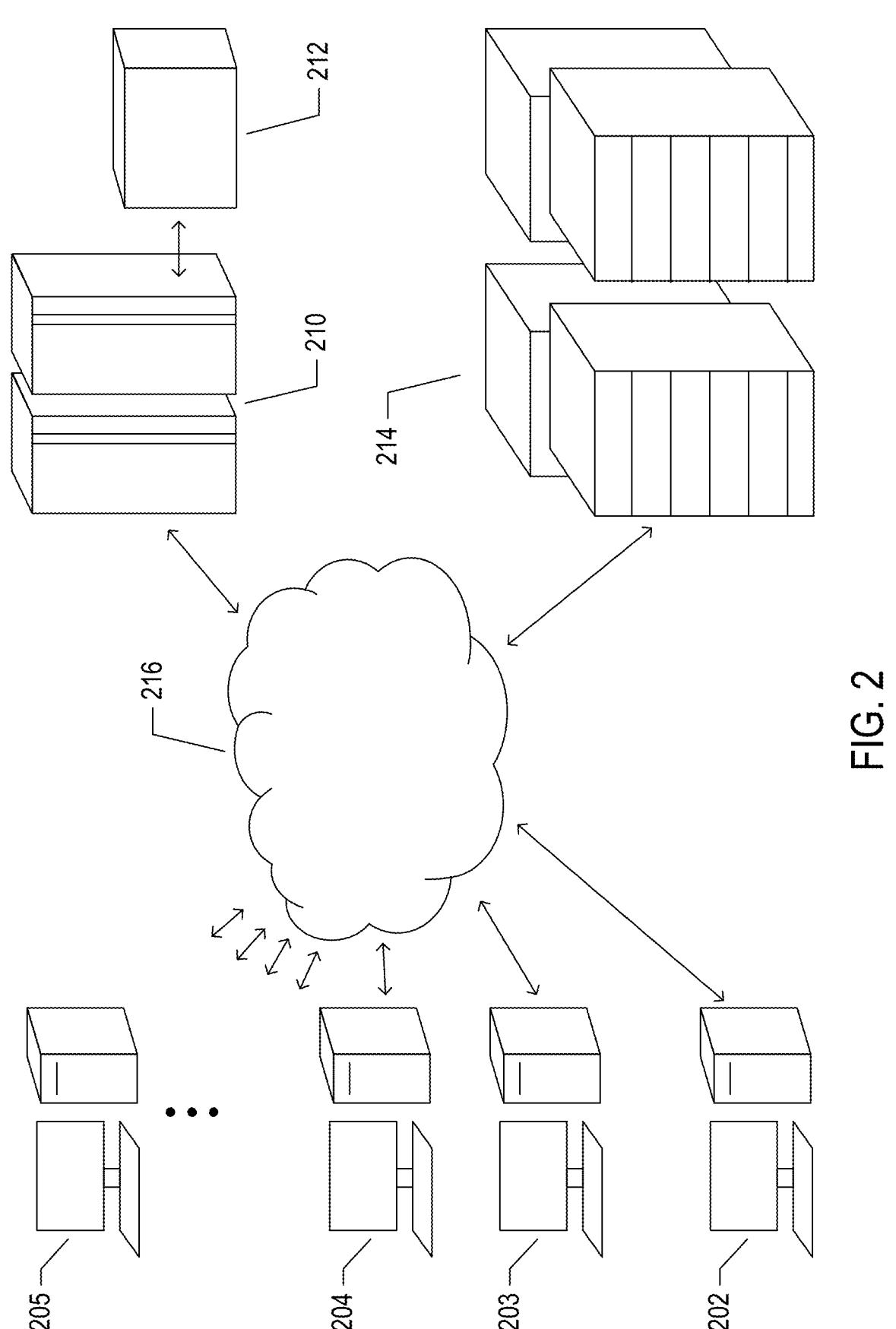
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
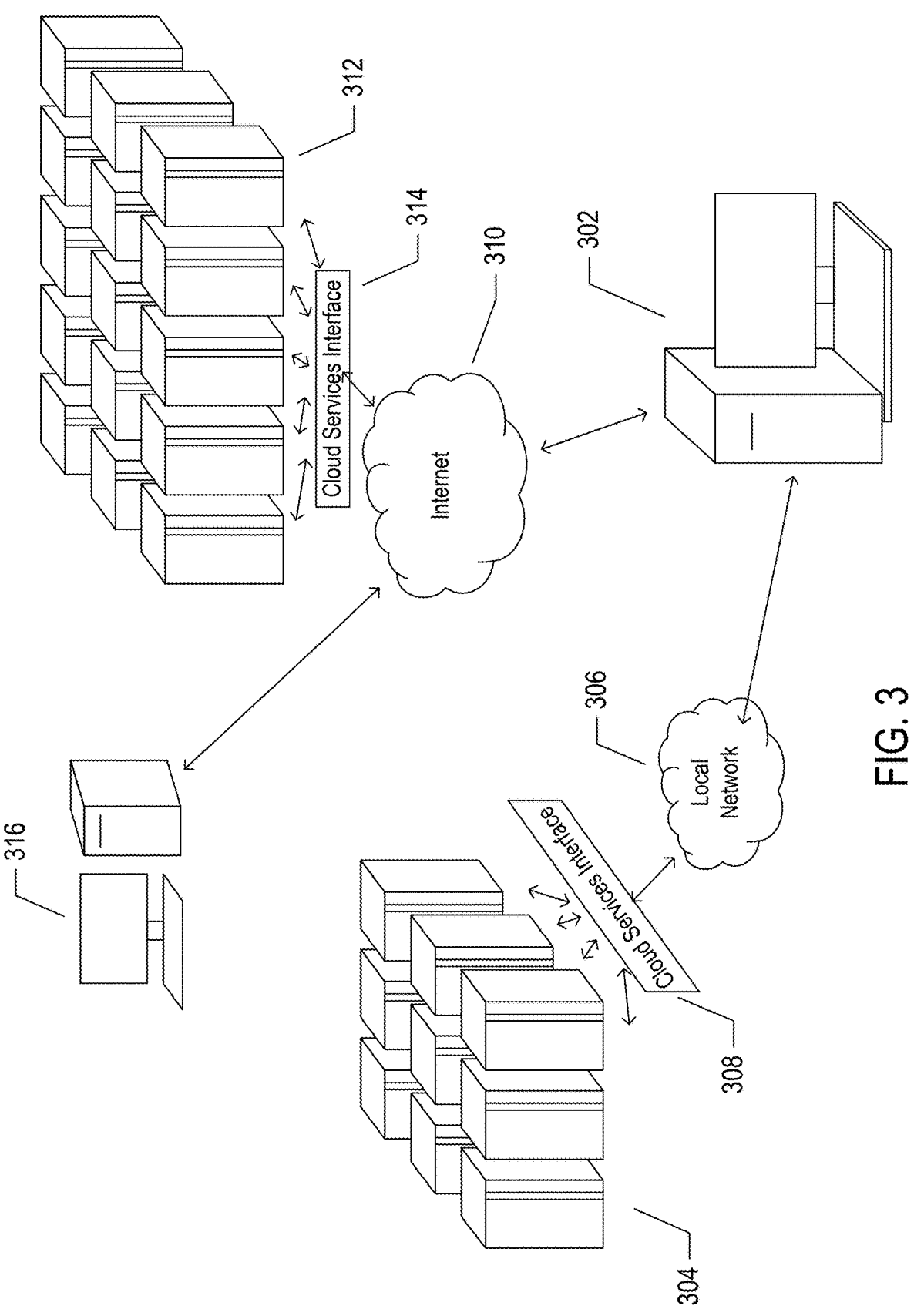
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
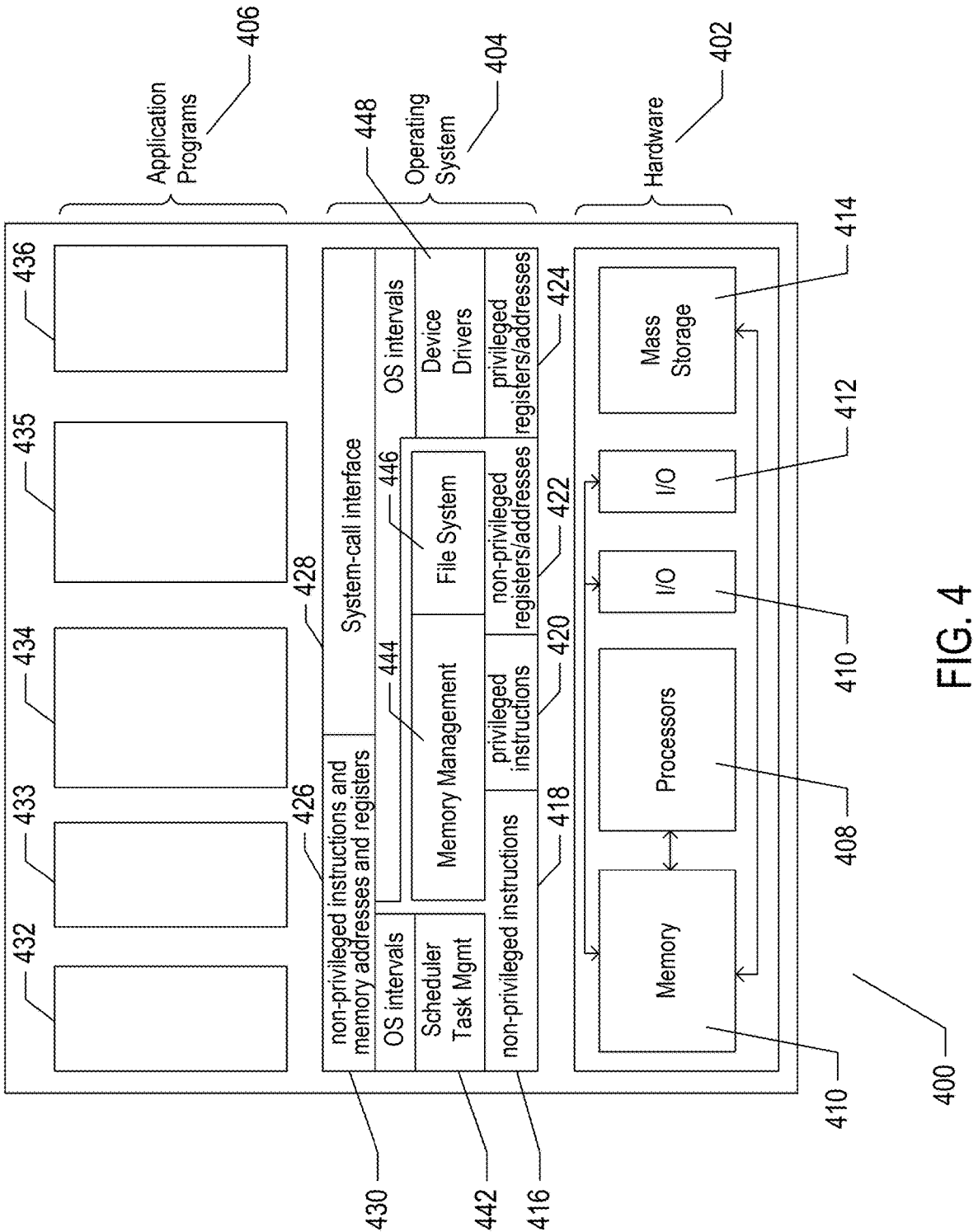
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
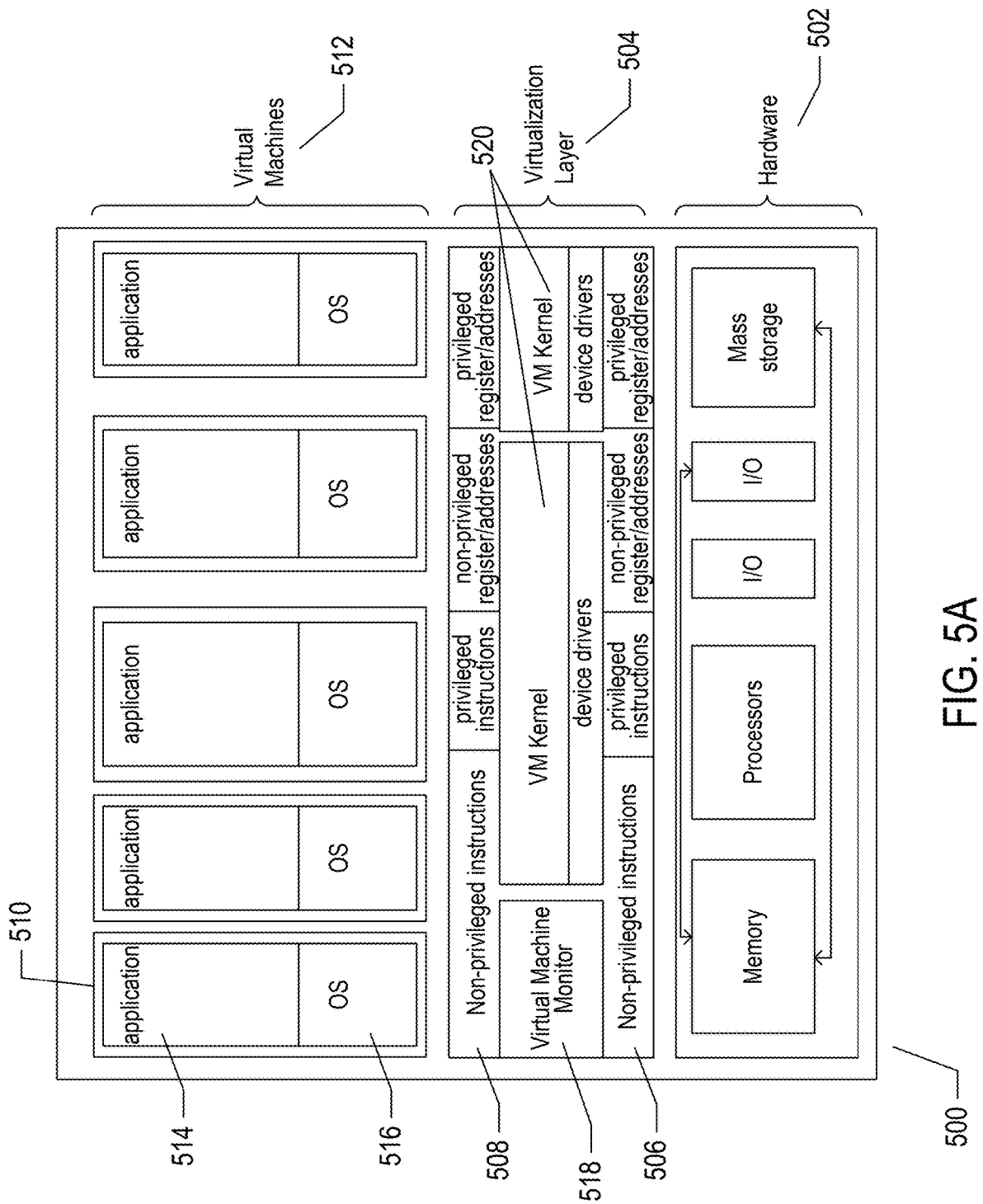
Figure 5B:
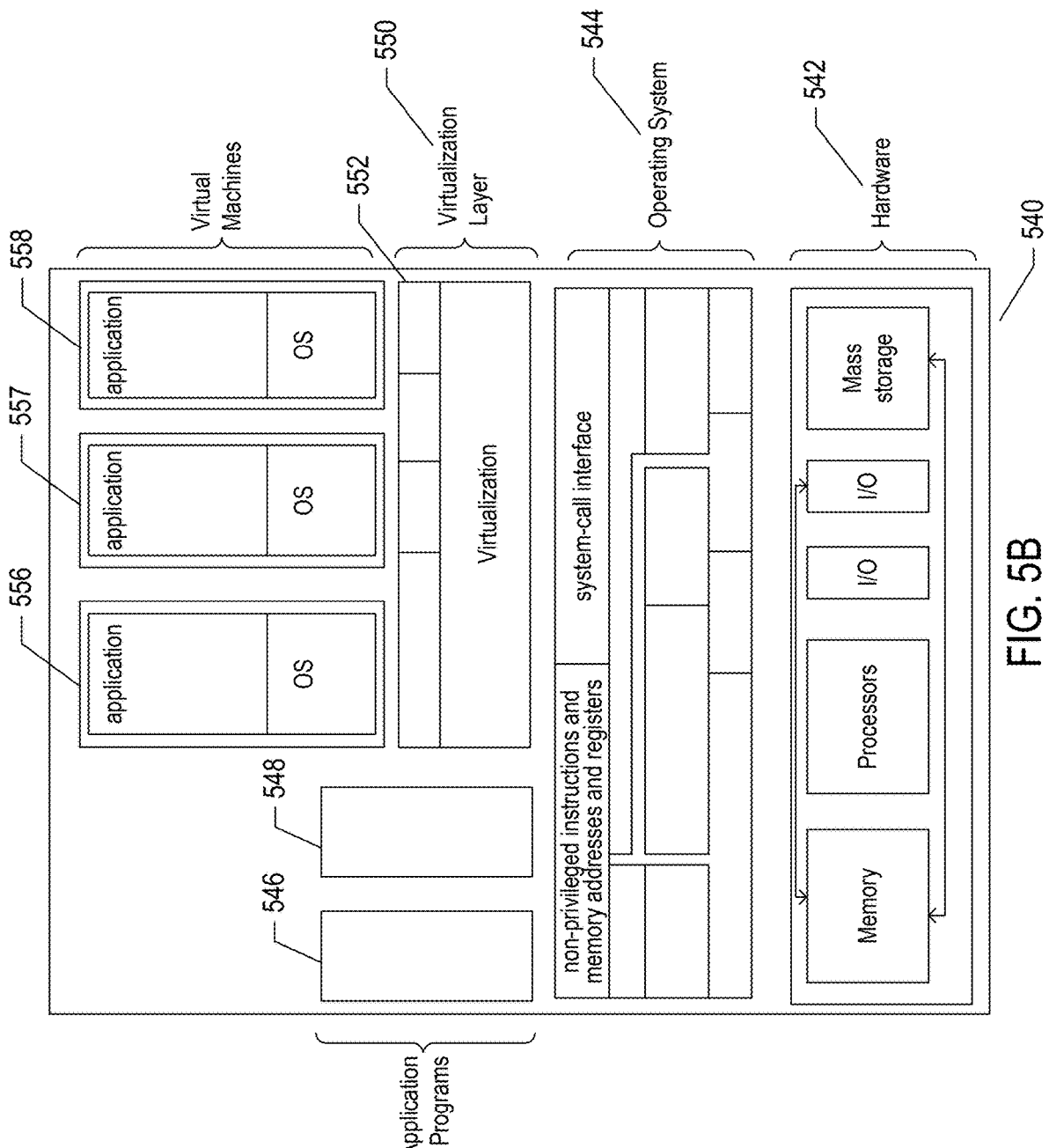

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
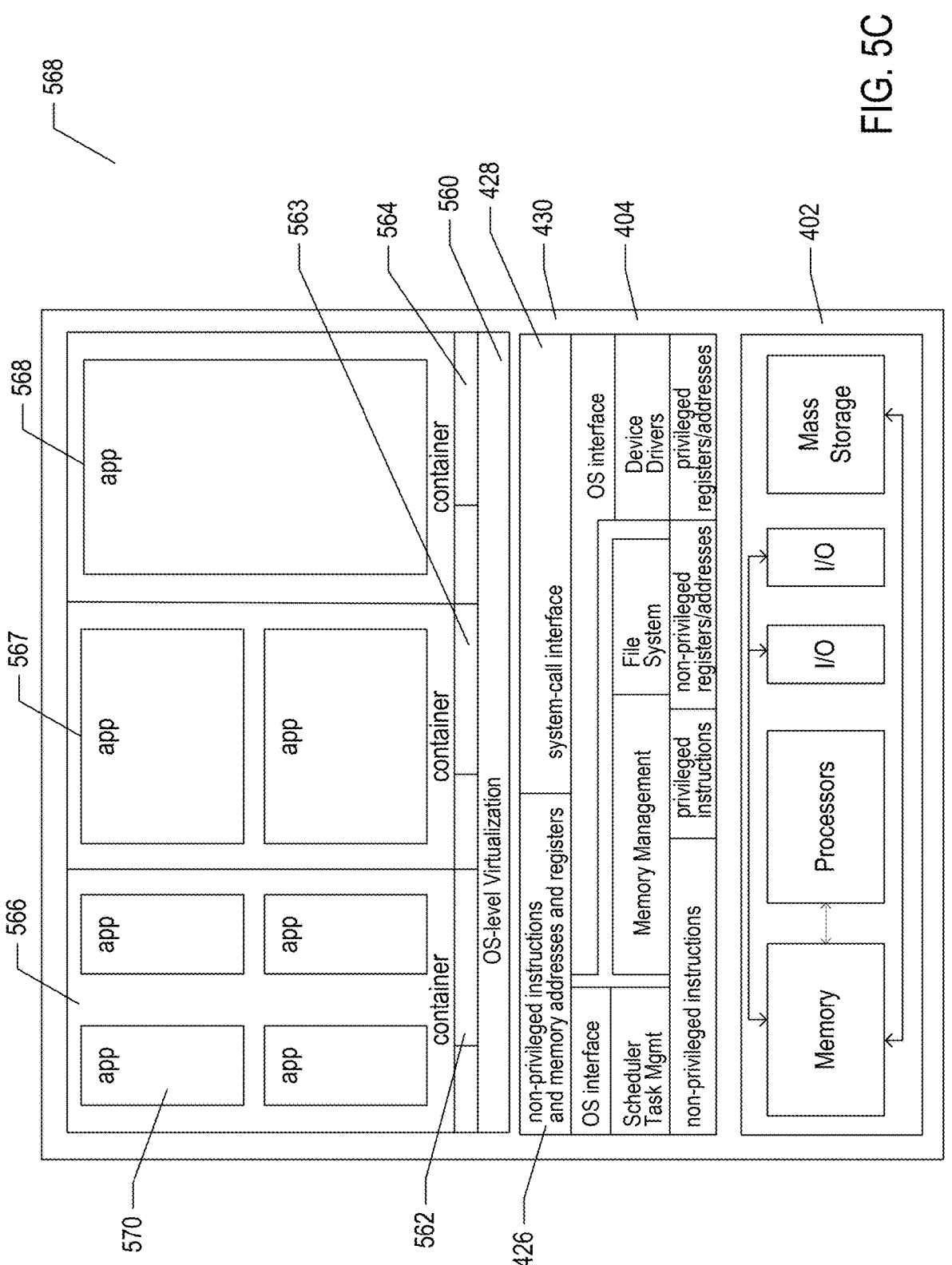

While the traditional virtual-machine-based virtualization layers, described with reference to FIGS. 5A-B, have enjoyed widespread adoption and use in a variety of different environments, from personal computers to enormous, distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as namespace support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Currently Disclosed Methods and Systems

The currently disclosed methods and systems may be implemented in a variety of different types of automated systems, from standalone personal computers and workstations to distributed applications running within large distributed-computer systems or cloud-computing facilities. The currently disclosed methods and systems may employ a wide range of different types of monitoring devices, communication devices, and sensors for conducting interactions with humans and observing interactions between humans. In general, monitoring devices include processors and output complex signals, such as video streams, while sensors may or may not include processors and generally produce simpler signals, such as numerical values corresponding to physical measurements. The currently disclosed methods and systems may be incorporated into a wide variety of different types of applications and systems, including call centers, automated-instruction systems, automated medical-diagnosis systems, automated relationship-analysis systems, and many additional types of applications and systems that are related to inferring the emotional states of human beings, monitoring the emotional states of human beings, and/or selecting actions, strategies, and approaches based on emotional states and the dynamics of emotional states of one or more human beings.

Figure 6A:
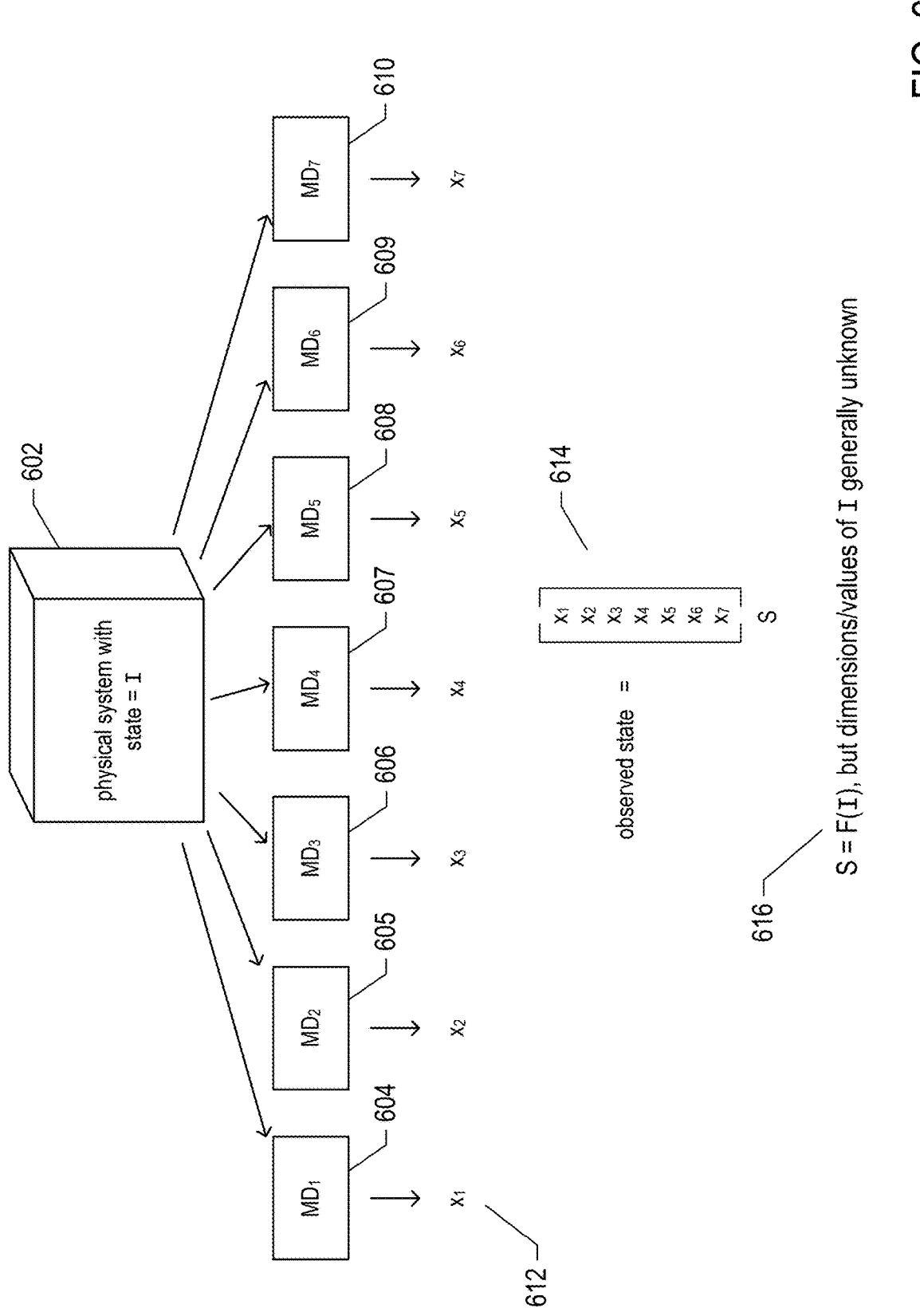
FIGS. 6A-B illustrate collection of observations of a physical system.
Figure 6B:
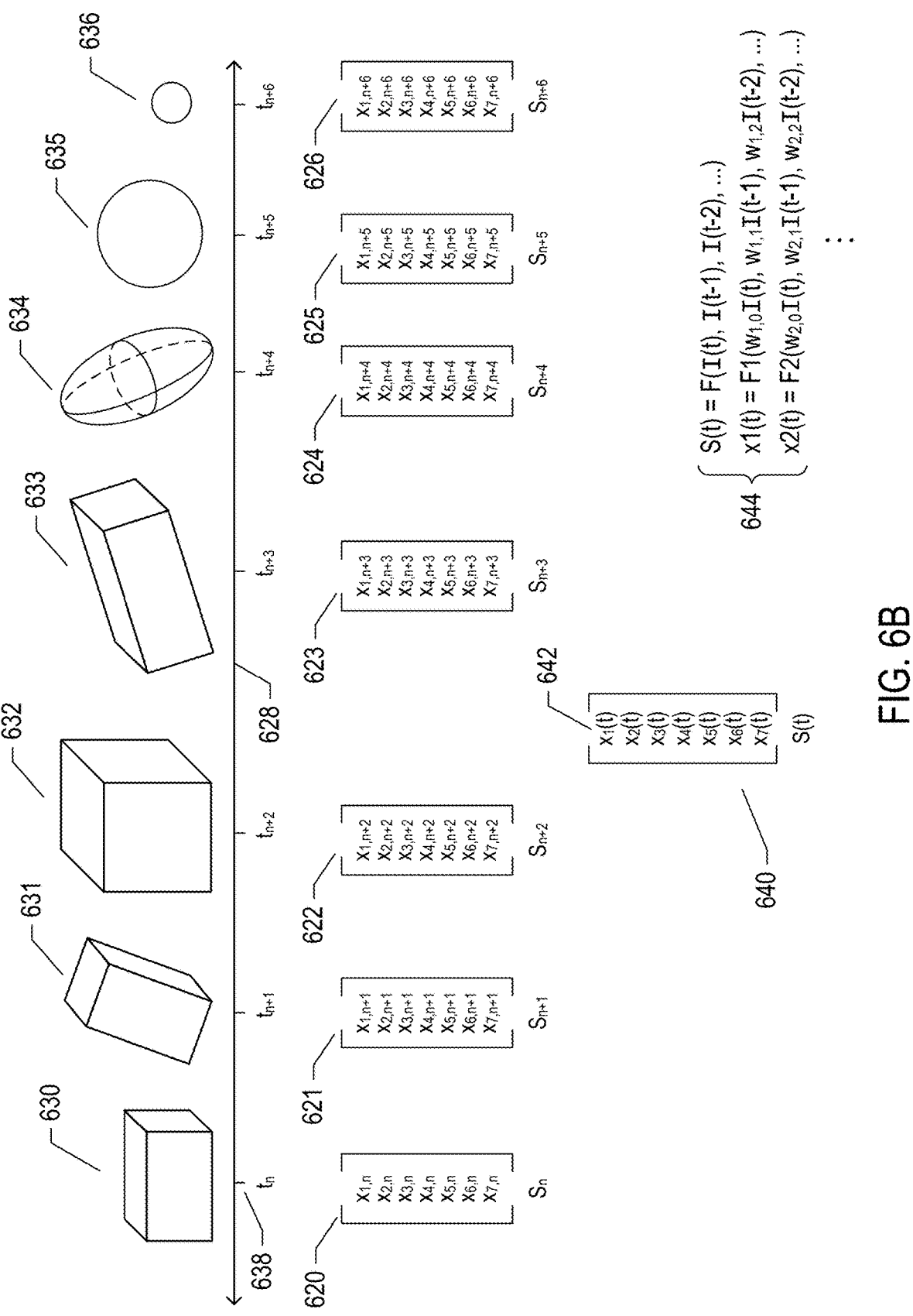

FIGS. 6A-B illustrate collection of observations of a physical system. The physical system 602 has an internal state/which changes over time. In the current example, which is representative of the types of observations discussed below, the nature of the internal state I is either completely unknown or only partially known and portions of the internal state can generally only be inferred from observations. Observations are made via a number of different monitoring devices 604-610. In this example, each monitoring device emits a numerical observation value, such as a numerical observation value for the dynamical variable $x_1$ (612), at a given point in time. These observation values may be emitted by monitoring devices continuously, intermittently, or when requested through a device interface. In many cases, a particular monitoring device may emit more than one type of observation value for more than one dynamical variable, but, for simplicity, in the current example, each monitoring device is associated with a single dynamical variable.

Monitoring devices include sensors, such as temperature sensors, which may emit integer or floating-point valued temperature indications, chemical sensors, which emit numerical representations of the concentrations of particular types or classes of chemical compounds, weight sensors, which emit floating-point indications of the weight of the physical system, and other such sensors. Monitoring devices may also include microphones, which emit a stream of numerical values comprising an audio signal, and video signals, which emit a stream of numerical values that together comprise an ordered series of frames of a video signal. Thus the observation value for a dynamical variable at a particular point in time may be a single integer or floating-point value, in certain cases, or may be a set of numerical values, in the case of microphones and video cameras.

The observed state S 614 of the physical system can be represented as a vector of observation values corresponding to each of multiple dynamical variables. The observed state S is a function of the internal state I 616, but since even the dimensions of the internal state are generally unknown, the internal state cannot itself be observed or measured but can only instead be inferred from the observed state S. Monitoring of the physical system, as shown in FIG. 6B, involves collecting monitoring-device outputs, over time, and representing the observed state of the physical system by a series of observed-state vectors 620-626. A timeline 628 represents a time period over which observations are collected. The observed system 602 changes in orientation, dimensions, and shape over time, as indicated by the various different physical manifestations of this system 630-636 arranged along the timeline to indicate the observed state of the physical system at particular points in time, such as an initial time point $t_n$ 638. The instantaneous observed state of the physical system is represented by the vector function S(t) 640, which returns the particular observed-state vector for a particular time t input to the function as an argument. The state-vector function can be thought of as a collection of parametric functions, such as the parametric function $x_1(t)$ 642, each returning an observation value for the particular time t input to the state-vector function. As indicated by expressions 644, the state-vector function and the parametric state-vector-element functions are functions of the current and previous internal states of the observed physical system. However, again, little or nothing may be known about the internal state, which can only be inferred from the observed states represented by the observed-state vectors returned by the state-vector function.

As discussed below, the current methods and systems collect observations, from various different types of monitoring devices and sensors, of one or more human participants in an interaction. These monitoring devices and sensors generally collected information about the appearance and surface characteristics of the human participants. It is assumed that a portion of the internal states of the human participants corresponds to what is commonly referred to as the emotional state of a human. However, the internal state of a human is extremely complex and only a fraction of the internal state is currently known and even a smaller fraction of the internal state is, in any way, accessible to observation. Thus, the currently disclosed methods and systems generate a timeseries of observed-state vectors, or accumulated monitor and sensor data, from which the currently disclosed methods and systems infer the emotional states of human participants in an interaction. The currently disclosed methods and systems may also generate a timeseries of emotional-state vectors for an automated system interacting with one or more human participants, where the emotional-state vectors are based on emotional-states that the automated system chooses to emulate at particular points in time during an interaction. The emotional-state vectors may be continuously, periodically, intermittently generated or may be generated on-demand.

Figure 7A:
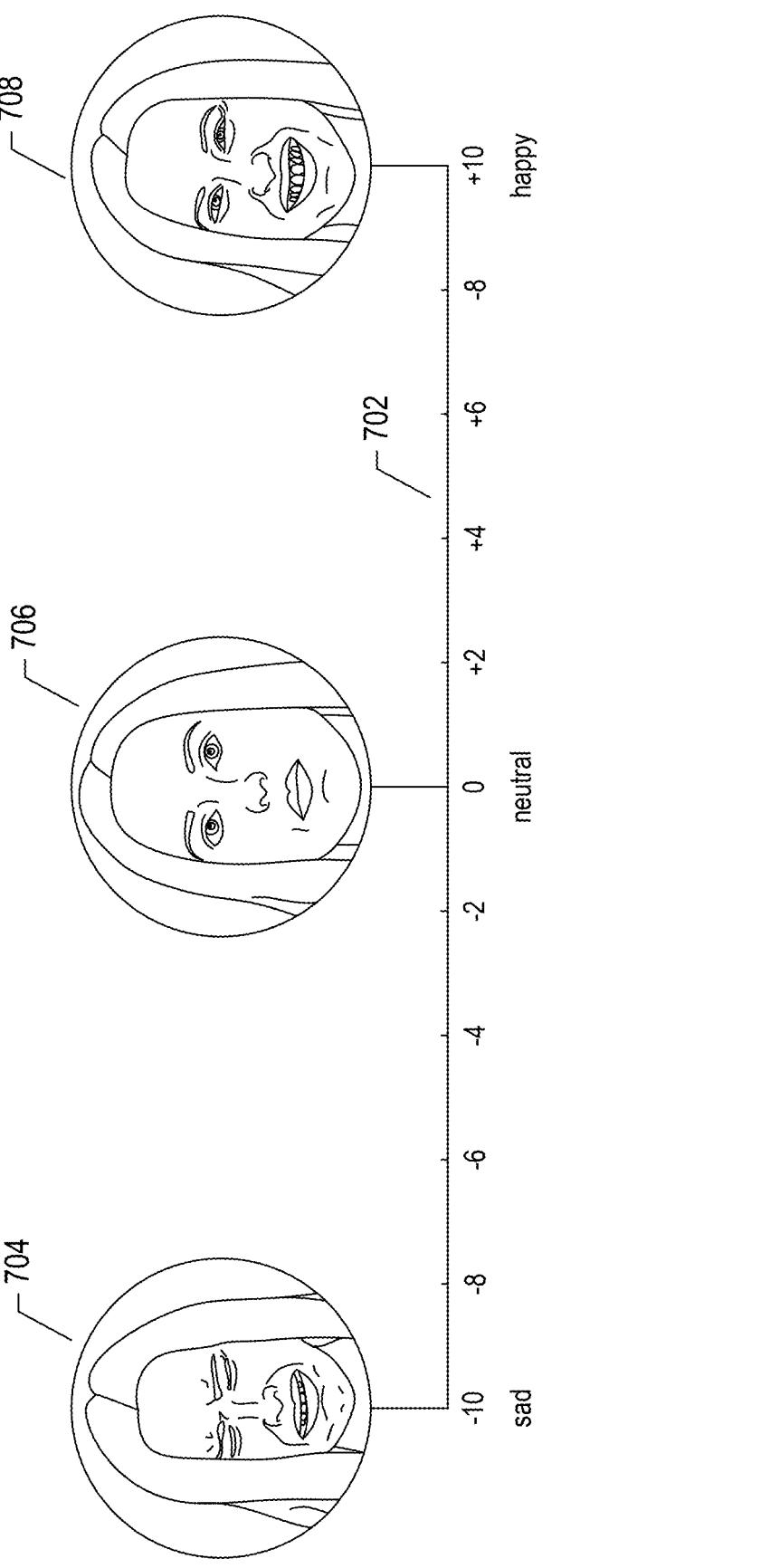
FIGS. 7A-B illustrate an example of a human-emotion classification method that can be used by the currently disclosed methods and systems.
Figure 7B:
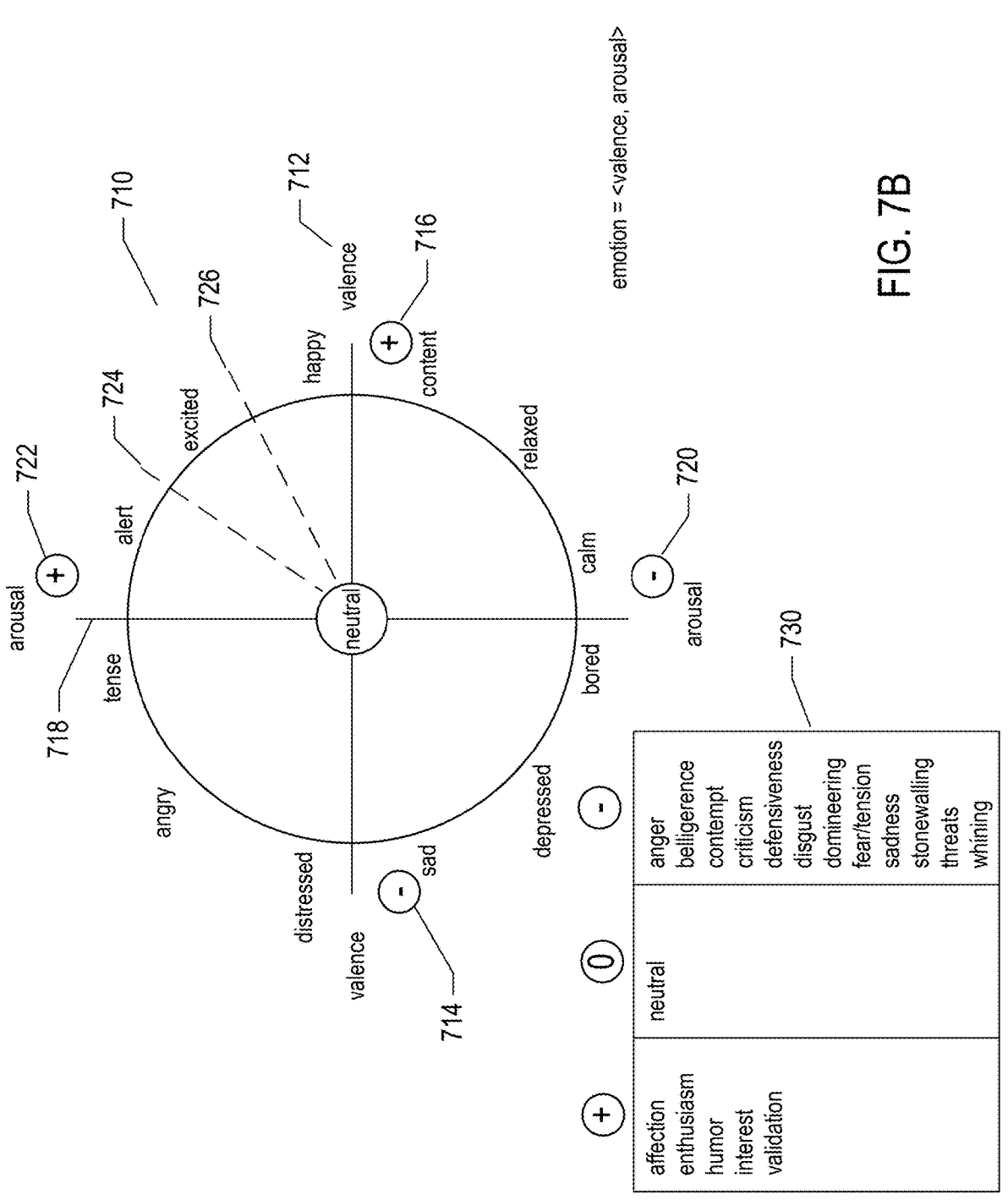

FIGS. 7A-B illustrate an example of a human-emotion classification method that can be used by the currently disclosed methods and systems. FIG. 7A shows a valence scale 702 that encodes a degree of positive/negative feeling on the scale of −10 to 10. A valence value of −10 represents a very negative, sad emotional state 704, a valence value of 0 represents neutral emotional state 706 that is neither positive nor negative, and a valence value of 10 represents a very positive, happy emotional state 708. Intermediate valence values between 10 and −10 represent increasingly positive emotional states. In certain emotional-state monitoring systems, valence values may be acquired directly from ratings provided by human participants in interactive sessions. More commonly, automated emotional-state-monitoring systems may determine or estimate valence values based on a variety of data produced by various monitoring devices and sensors. As one example, audio recordings and video recordings of a conversation between two human participants may be analyzed to determine voice tones, word selection, facial expressions, and other such intermediate results and then determine, based on the intermediate results, a valence value representative of the current emotional state or the emotional state at a particular time point of each human participants.

As shown in FIG. 7B, the currently described emotional-state classification is two-dimensional 710, with a valence axis 712 representing one of two different coordinate axes that index a two-dimensional emotional plane or surface. As in FIG. 7A, valence values range from a maximally negative valence value 714 to a maximally positive valence value 716. A second coordinate axis 718 represents arousal. One method for determining an arousal value for a human participant, in which the arousal value is determined from the valence values, is discussed below. In general, the arousal value represents a degree of interest, enthusiasm, or participation in a human interaction. Arousal values range from a maximally negative arousal value 720, representing indifference and inattention, to a maximally positive arousal value 722 that represents a high level of interest, enthusiasm, and engagement. A combination of a valence value and an arousal value can be considered to be a vector or a pair of coordinates that represents a point on the two-dimensional emotional plane or surface 710 indexed by the valence and arousal coordinate axes. Each different point, or location, on the two-dimensional emotional-state plane or surface represents a distinct emotional state. Radial wedge-shaped areas, such as the wedge-shaped area defined by dashed lines 724 and 726, correspond to generalized emotional-state classes. For example, the wedge-shaped area defined by dashed lines 724 and 726 corresponds to an excited emotional state, with the radial distance of a point within this wedge-shaped area from the origin corresponding to an intensity of the emotion. These various generalized emotional-state classes are labeled in FIG. 7B, and include the emotional-state classes "alert," "excited," "happy," "content," "relaxed," "calm," "bored," "depressed," "sad," "distressed," "angry," and "tense." A slightly different emotional-state classification system is represented by table 730 in the lower left-hand portion of FIG. 7B, in which the three columns represent positive-valence, neutral-valence, and negative-valence emotional states and the table entries represent the different particular emotional-state classes or types within the positive-valence, neutral-valence, and negative-valence categories. Various different emotional-state classification systems can be used by the currently disclosed methods and systems, but the following discussion is based on the use of a two-dimensional emotional-state classification system in which each emotional state represents a point in a two-dimensional emotional-state plane or surface indexed by a valence coordinate axis and an arousal coordinate axis, as shown in FIG. 7B.

Figure 8A:
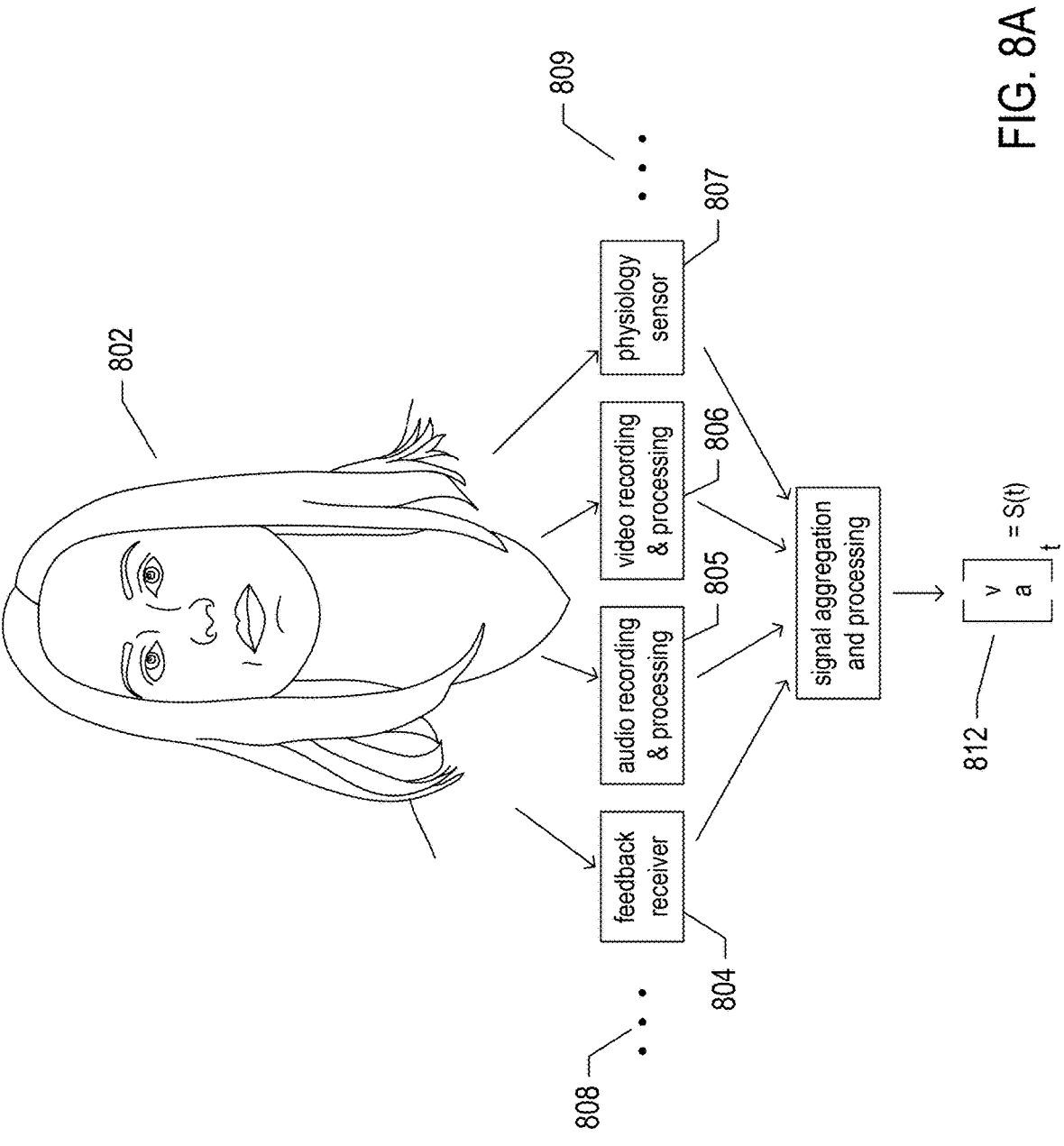
FIGS. 8A-B illustrate a data-collection component used in certain implementations of the currently disclosed methods and systems.
Figure 8B:
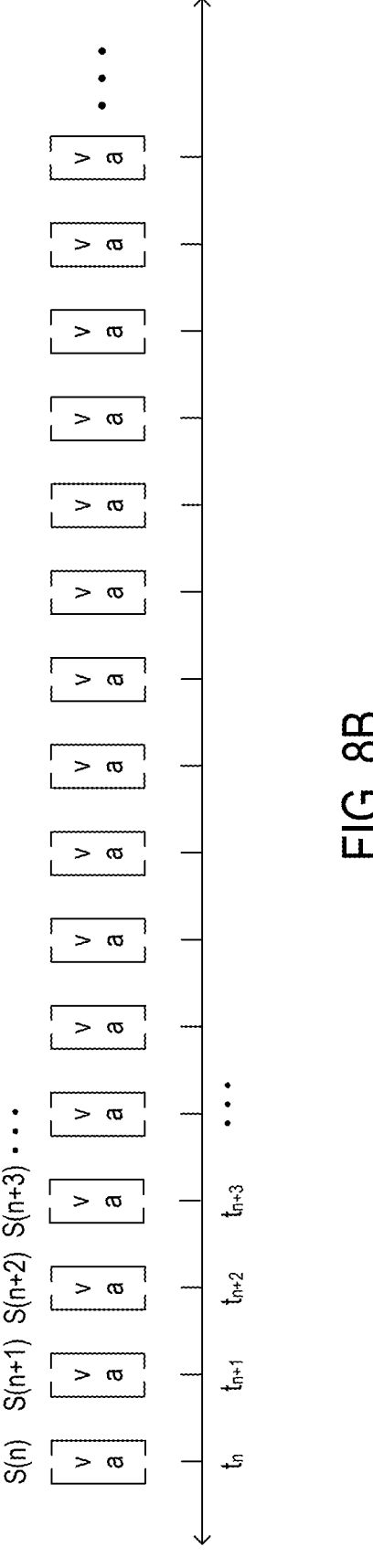

FIGS. 8A-B illustrate a data-collection component used in certain implementations of the currently disclosed methods and systems. For each human participant 802 in a monitored or analyzed interaction, data is continuously or intermittently generated by generally multiple different monitoring devices and sensors 804-807. Ellipses 808 and 809 indicate that additional monitoring devices and sensors may be used to generate observation data. The data is input to a signal-aggregation-and-processing component 810 which generates a two-dimensional emotional-state vector 812 for successive points in time during a human interaction, as shown in FIG. 8B. As discussed above, the two-dimensional emotional-state vector includes valence ("v") and arousal ("a") elements. The monitoring devices and sensors and the signal-aggregation-and-processing component are not further discussed in the current document, but have been discussed, in detail, in previous patent applications and research papers. The signal-aggregation-and-processing component is generally implemented as a complex distributed application running within a distributed computer system and involves sophisticated temporal synchronization and data-processing components. When interactions between multiple human participants are monitored and analyzed, a series of emotional-state vectors, each associated with a particular time point, is generated for each of the multiple human participants. As discussed, below, in the described implementation of the currently disclosed methods and systems, the arousal values are derived from the valence values and additional metrics and characterizations are derived from the emotional-state vectors.

Figure 9A:
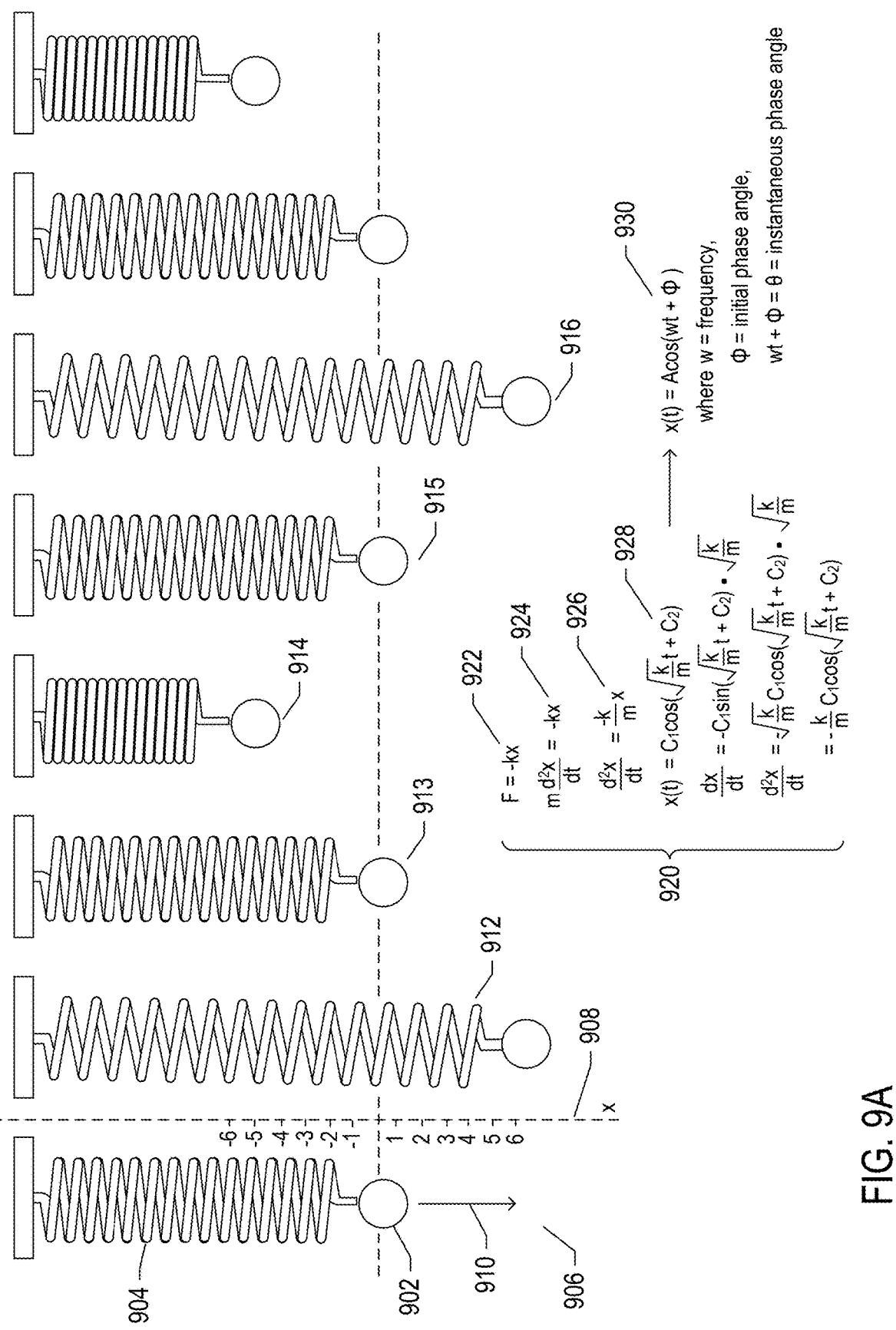
FIGS. 9A-B illustrate an example of what is meant by the term "oscillation."
Figure 9B:
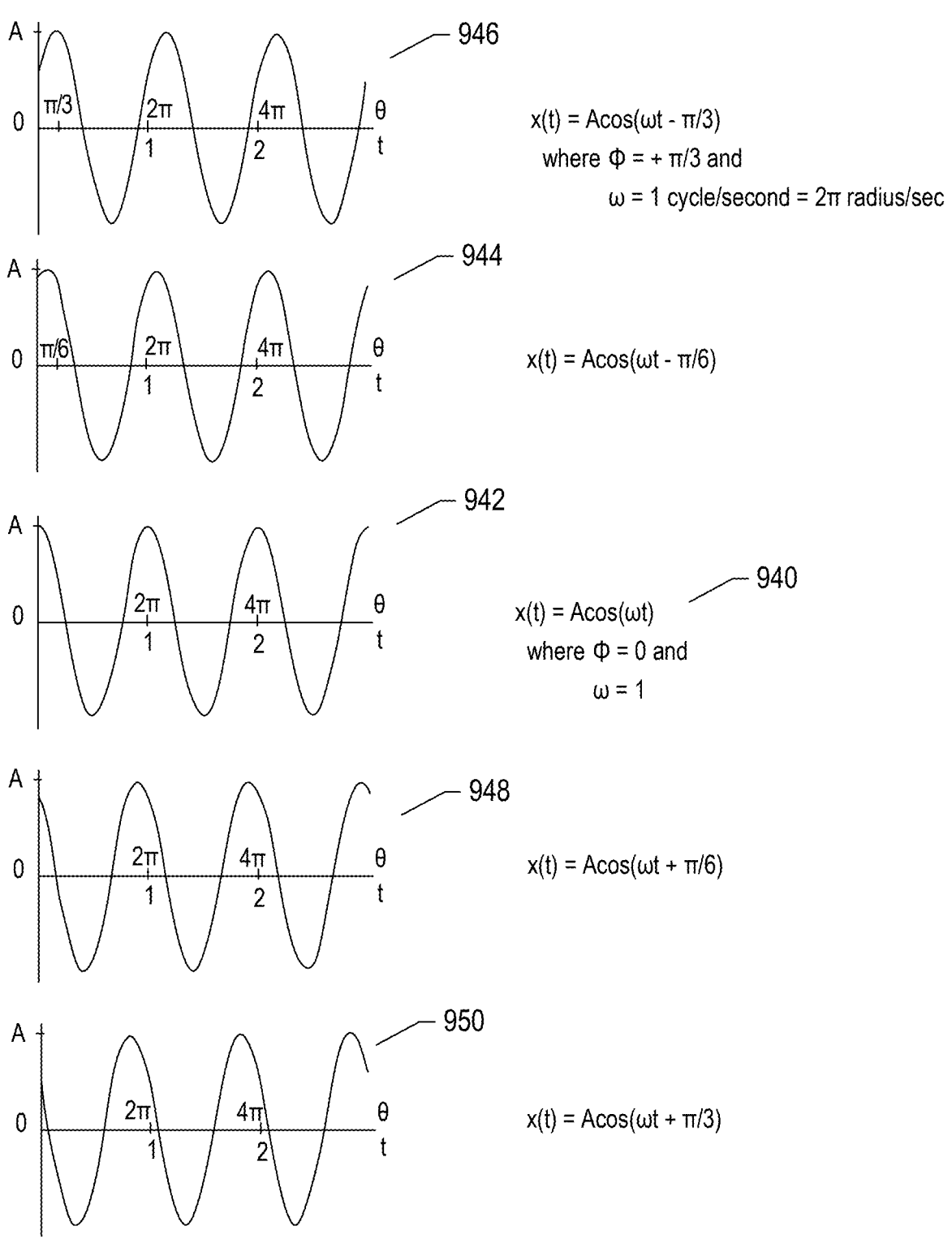

FIGS. 9A-B illustrate an example of what is meant by the term "oscillation." A canonical, simple example of an oscillator is provided by a weight attached to a spring, such as the weight 902 attached to the spring 904 at the left-hand side of FIG. 9A. In this first depiction of the weight attached to a spring 906, the weight is motionless and positioned at a neutral or equilibrium position of 0 on a vertical position coordinate axis 908. This is an example of a one-dimensional oscillator in which the position of the weight or oscillating entity can be represented by a single coordinate relative to a linear coordinate axis. When the weight is pulled down in the vertical direction, indicated by arrow 910, and then released, the weight moves upward, as shown in the series of depictions 912-914, and then moves downward as indicated in the series of depictions 914-916. This process continues over time and represents a periodic position change, or oscillation, of the weight along the coordinate axis 908. The canonical example of a one-dimensional oscillation assumes a frictionless spring without damping forces that continues to oscillate forever. Of course, as with all mathematical models, an actual real-world spring is associated with various additional forces and factors that result in the oscillation diminishing over time and eventually ending.

A derivation of a mathematical model for the oscillation is shown in a set of expressions 920 in the lower portion of FIG. 9A. The basic assumption is represented by expression 922. This assumption is that the force acting on the weight is equal to the negative of a spring constant k times the current position x of the weight with respect to the vertical coordinate axis 908. Substituting the mass of the weight times the second derivative of the position with respect to time, according to Newton's second law, for the force in equation 922 produces equation 924. This equation is rearranged to produce the simple, second-order ordinary differential equation 926 that can be easily solved by two integrations to produce expression 928, for which expression 930 is a more general form. This expression indicates that the position of the weight at a particular point in time t is equal to a maximum amplitude A times the cosine of the time-dependent phase angle. The time-dependent phase angle $\theta(t)$ is computable as the product of a frequency $\omega$ and the time t added to an initial phase angle $\varphi$.

FIG. 9B illustrates the meaning of expression 930 in FIG. 9A. When the initial phase angle φ is 0 (940), a plot of x(t) with respect to time 942 is a familiar cosine function with maximum peak heights equal to the amplitude A. The period of the function x(t) is 2*π since the frequency ω is 1 and the period of cos(x) is 2*π. Plots 944 and 946 show the function x(t) when the initial phase angle φ is decreased from 0 to −π/6 and −π3, respectively. Plots 948 and 950 show the function x(t) when the initial phase angle φ is increased from 0 to π/6 and π/3, respectively. A positive change to the initial phase angle shifts the function to the left and a negative change to the initial phase angle shifts the function to the right.

Figure 10A:
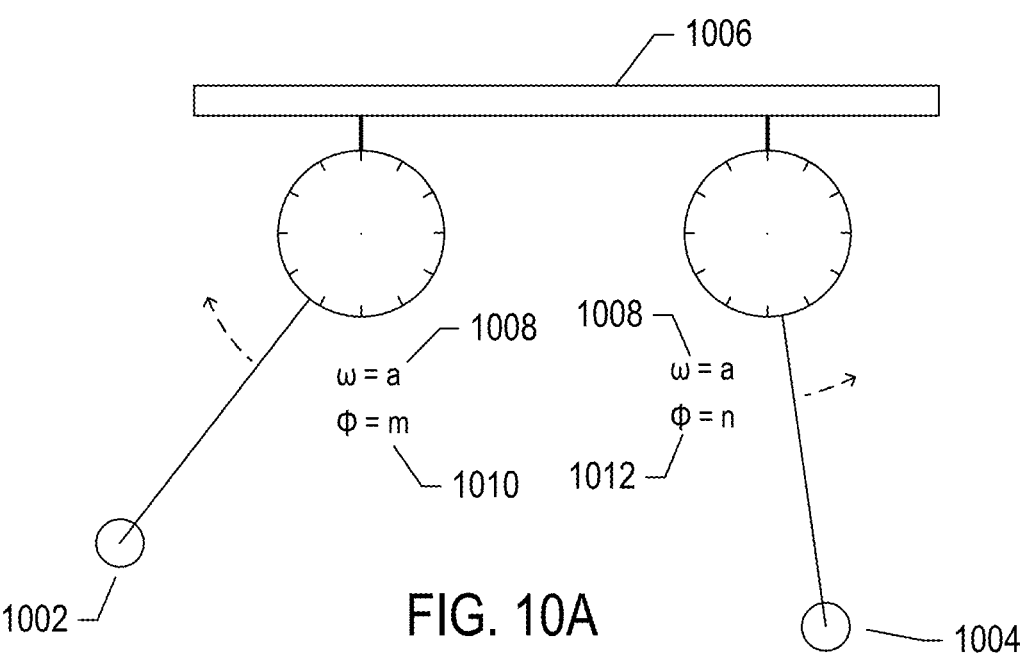
Figure 10B:
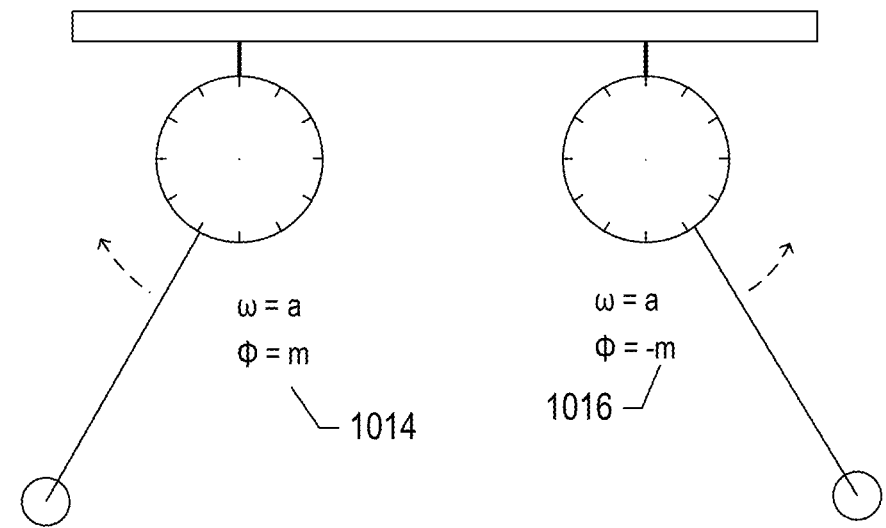

There is a very interesting known phenomenon in which two identical mechanically connected oscillators that initially oscillate with arbitrary initial phase angles quickly become synchronized in their oscillations. FIGS. 10A-C illustrate synchronization of two identical mechanically connected oscillators and provide various different definitions of synchronization. As shown in FIG. 10A, two identical or nearly identical pendular oscillators 1002 and 1004 are mounted to a horizontal support 1006 and are both oscillating with the same natural frequency 1008 but with different initial phase angles 1010 and 1012. After a relatively short period of time, the oscillation of the two pendular oscillators synchronizes so that the φ phases of the two oscillators have opposite values and 1014 and 1016 and the two oscillators oscillate at a relative constant phase angle of 180°. This synchronization of oscillation occurs because physical systems at a higher energy level tend to seek an optimal path to dissipating energy in order to reach an equilibrium energy state with their environments. The optimal path for energy dissipation by the two connected oscillators is for the oscillations to synchronize at a relative phase angle of 180°, which allows the oscillators to impart a maximum, aggregate force to the horizontal support, thereby most efficiently dissipating their energies. Synchronization is also observed for non-identical oscillators and for many additional types of oscillators in many different configurations within many different environments.

One mathematical model for this natural tendency for oscillators to synchronize is provided by expression 1020 in FIG. 10C. This expression indicates that the rate of change of the phase of a particular oscillator i is related to the sum of the sines of the phase differences between the particular oscillator i and the other of N oscillators with which the particular oscillator is mechanically coupled, where the constant K is referred to as the "coupling constant." When the coupling constant K is greater than a critical coupling-constant value $K_C$, synchronization among the oscillators occurs. There are numerous different definitions of synchronization between two oscillating systems. In one definition, represented by expressions 1022, two oscillating systems $O_1$ and $O_2$ are synchronized when the state of each of the two systems is functionally determined by the state of the other system. The state of the first system is a set of observed values 1024 and the state of the second system is also a set of observed values 1026, as discussed above with reference to FIG. 6A-B. Of course, the states of the systems vary with time, as do the observed values that together comprise the states, as is also discussed above with reference to FIG. 6A-B. As indicated in expression 1028, the two systems are synchronized when the state of the first system is determined as a function F of the state of the second system and the state of the second system is determined as a function $F^{-1}$ of the first system, with the function $F^{-1}$ being the inverse function of the function F. A second definition of synchronization 1030 indicates that the two systems are synchronized when the parametric functions that represent the elements of the state vectors differ by only a time lag τ.

Synchronization of emotional states of two or more participants in interactions is also observed. As discussed further, below, detecting synchronization of the emotional states between human participants in interactions is one functional component of the currently disclosed methods and systems. There are many ways to view and characterize emotional synchronization. One way to view and characterize emotional synchronization is to compute the instantaneous phase coherence ("PC") from instantaneous phases and instantaneous amplitudes computed from the observed sequence of valence values, as discussed, in detail, below. A different way to view and characterize emotional synchronization between two human participants or between a human participant and an automated system is to compare the emotional-state trajectories of the participants. FIGS. 11A-F illustrate this second approach to determining the degree of emotional synchronization between two human participants or between a human participant and an automated system.

Figure 11A:
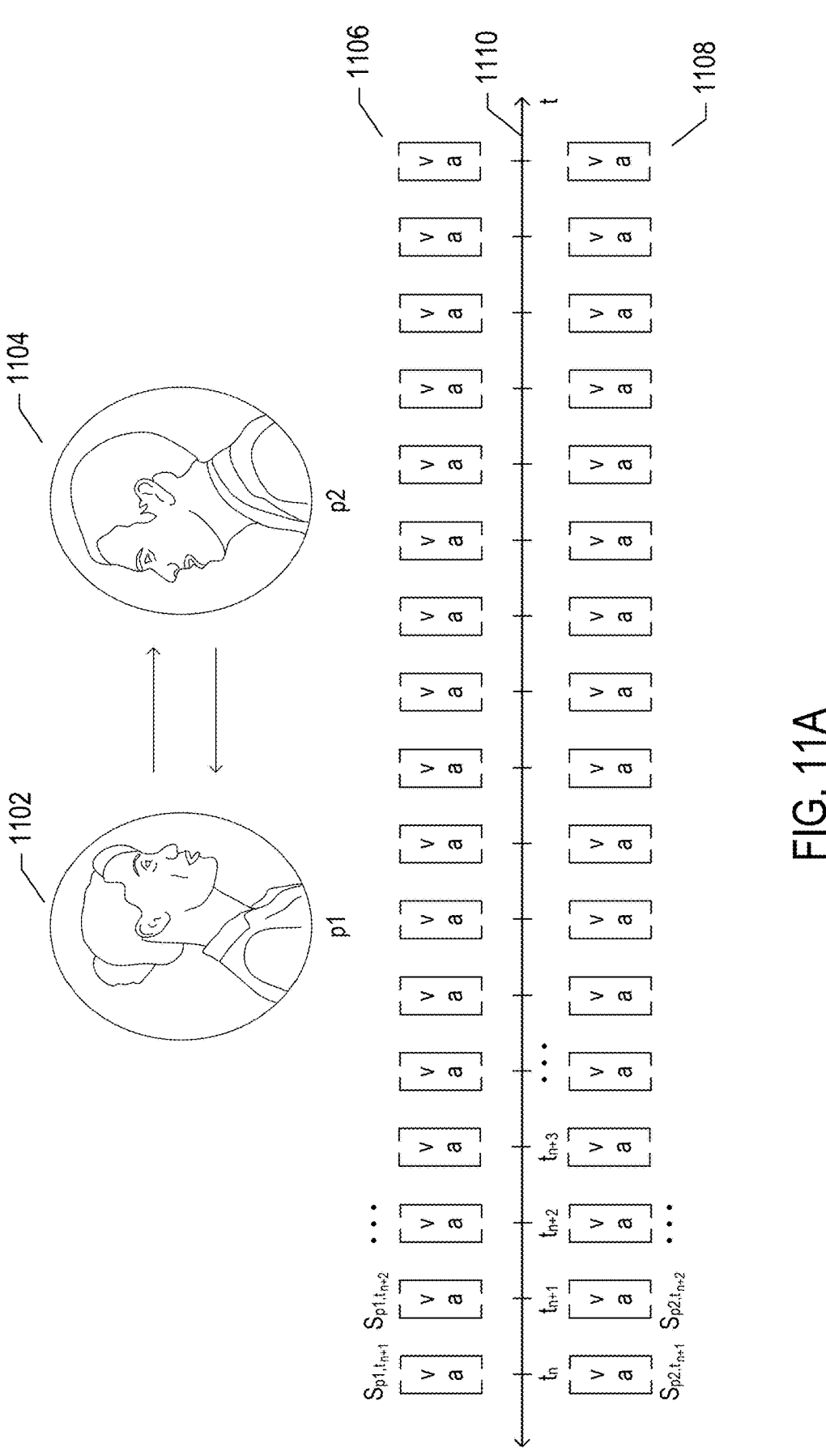
FIGS. 11A-F illustrate one approach to determining the degree of emotional synchronization between two human participants or between a human participant and an automated system.
Figure 11B:
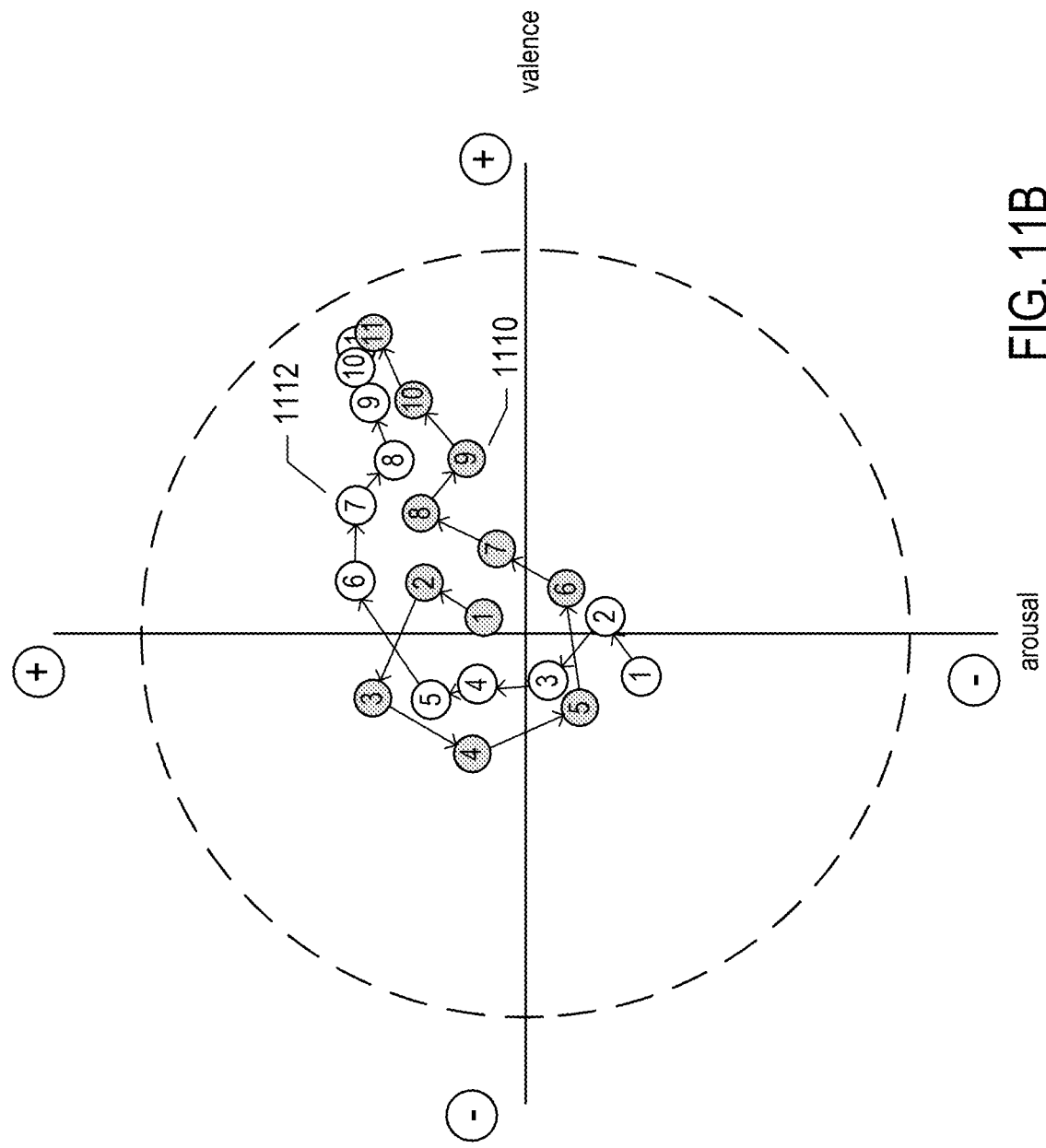
Figure 11C:
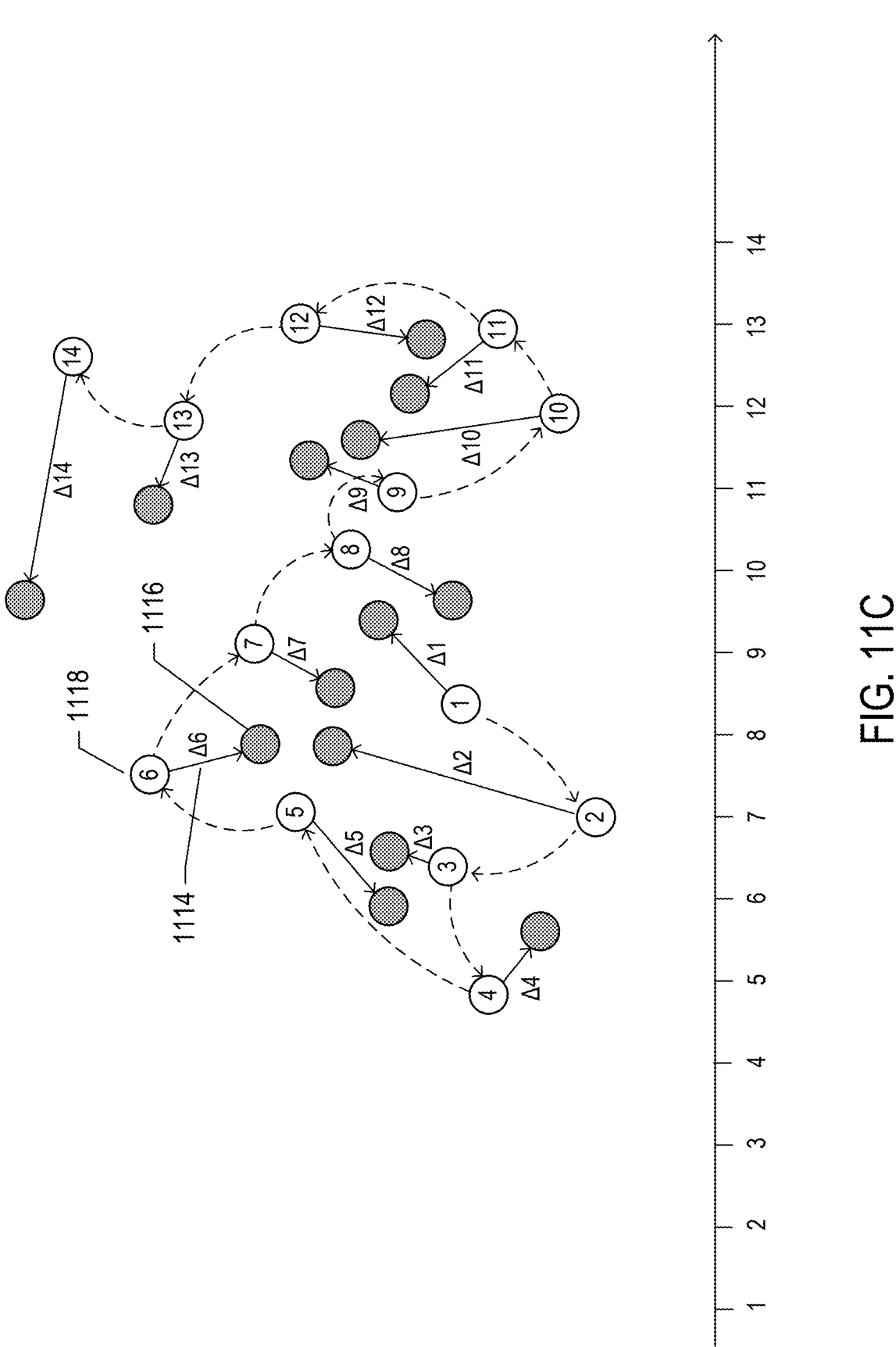
Figure 11D:
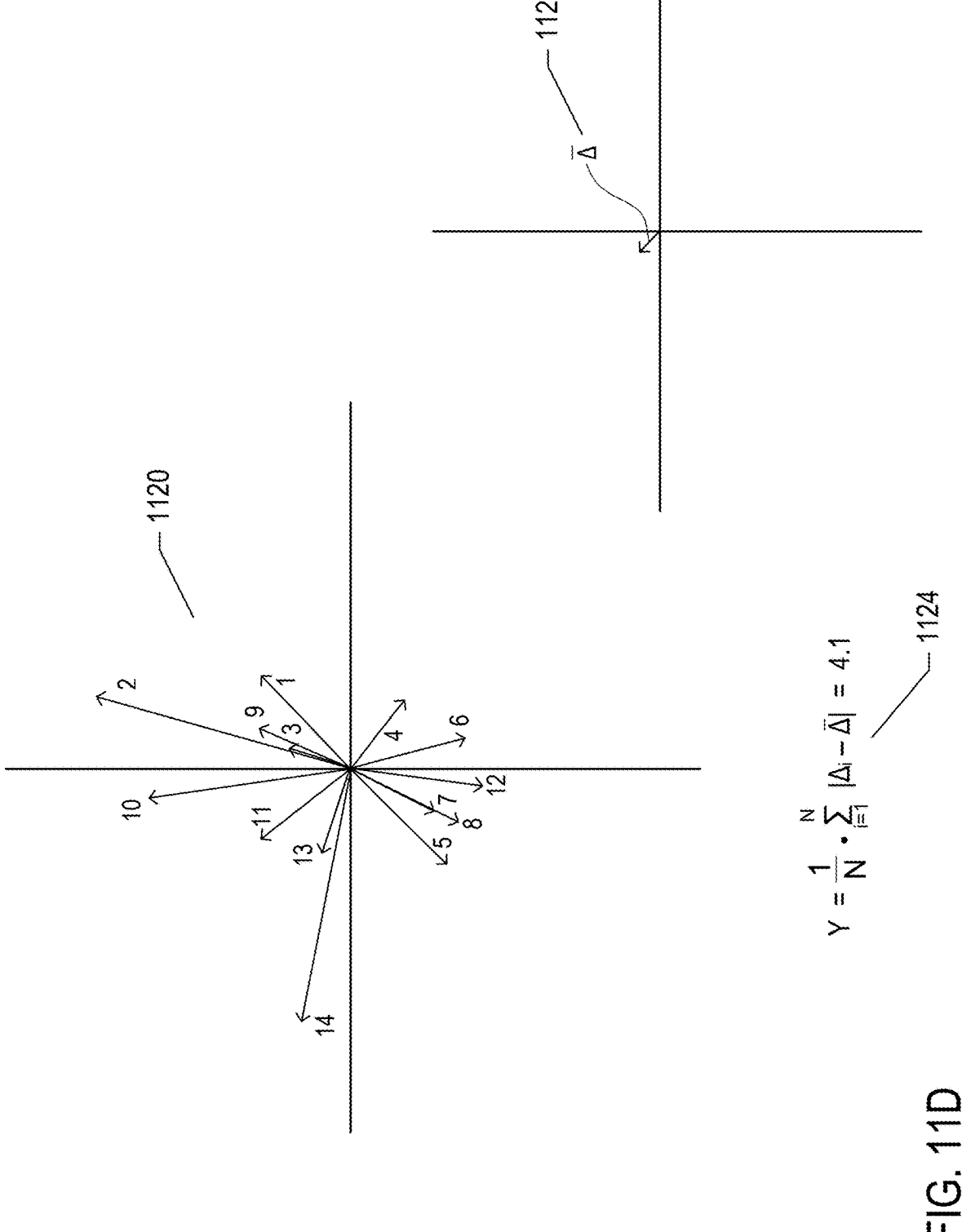
Figure 11E:
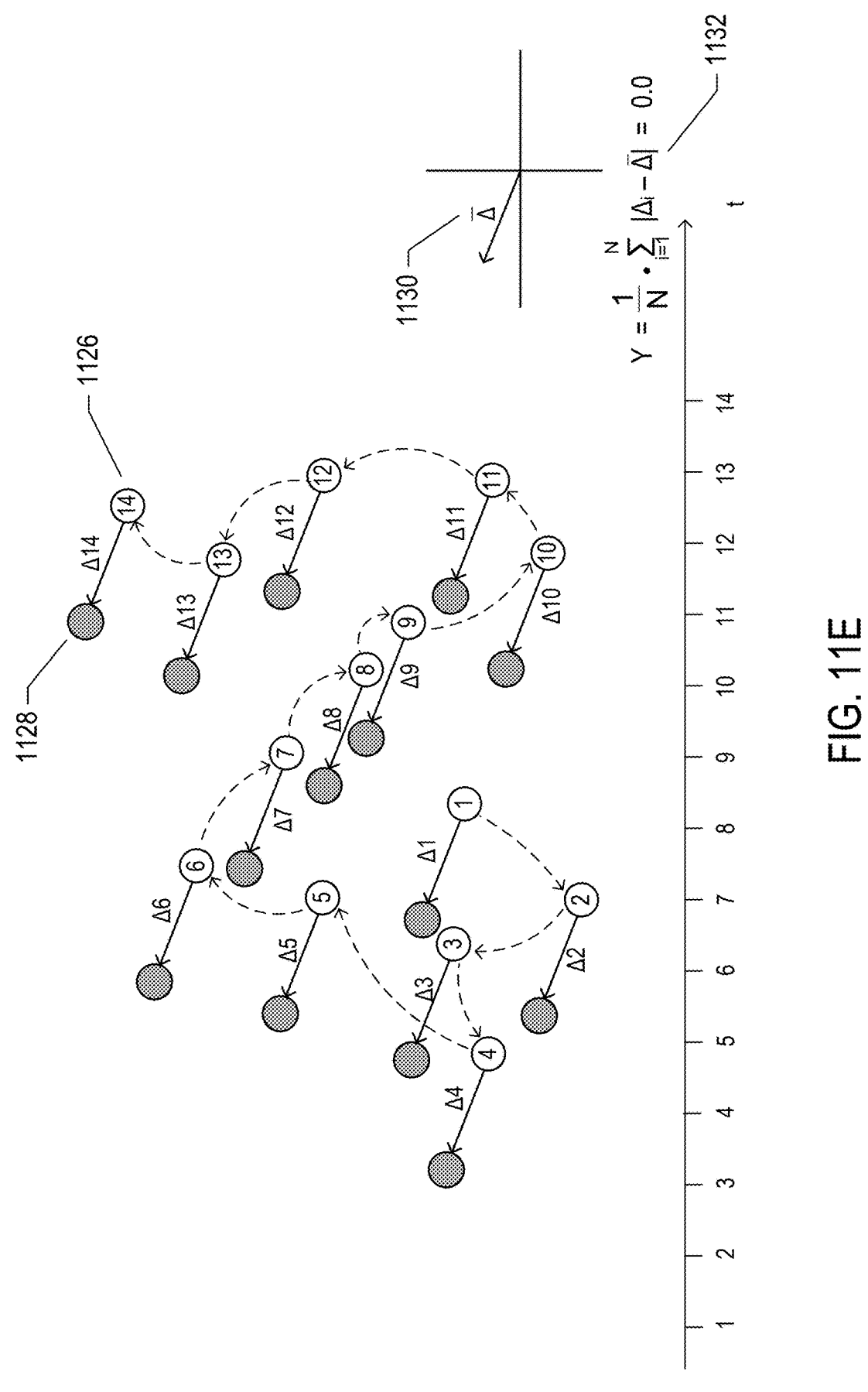
Figure 11F:
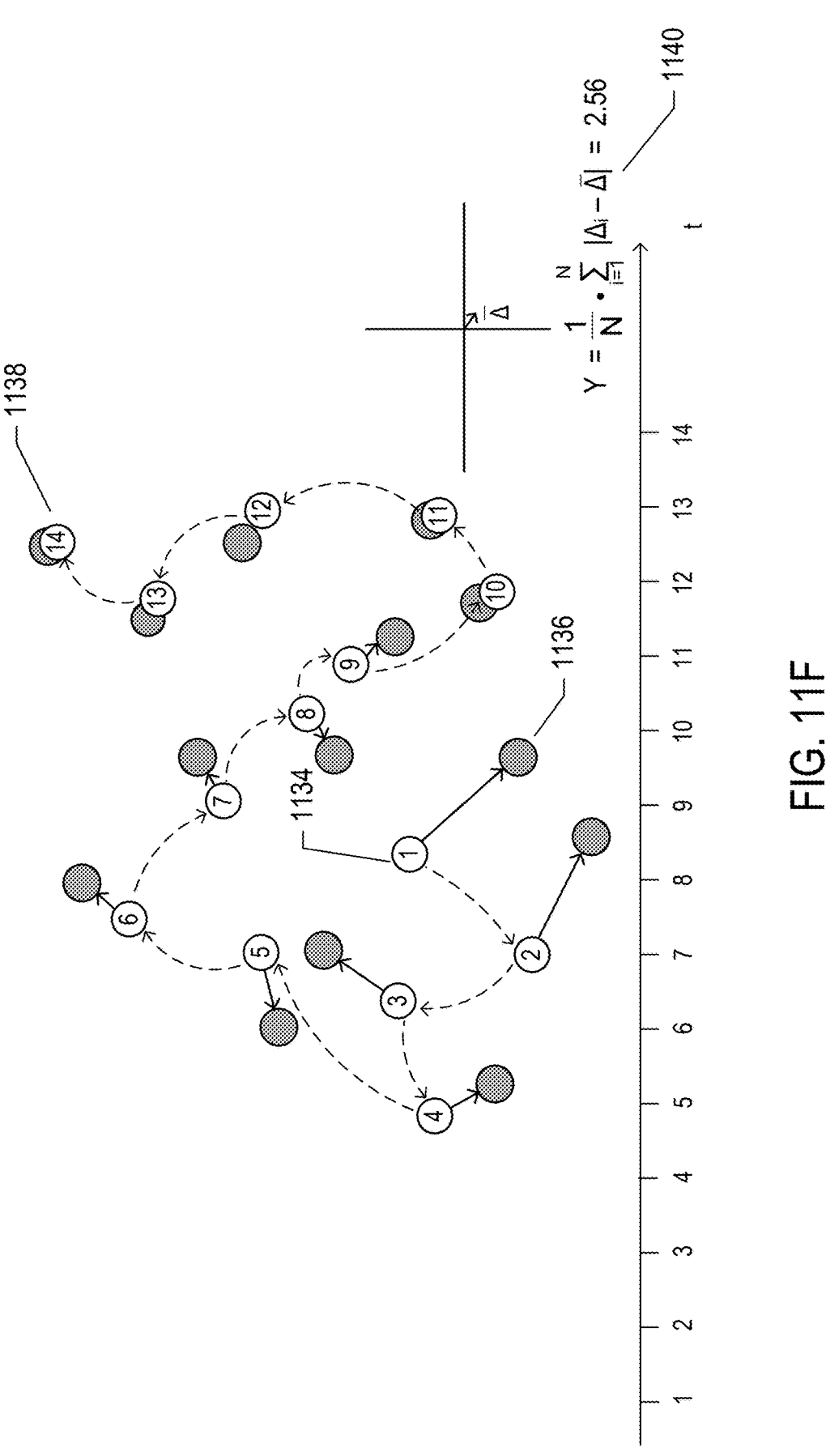

FIG. 11A illustrates the observed emotional states for two participants 1102 and 1104 involved in an interaction, such as a conversation. As discussed above with reference to FIG. 8A-B, a signal-aggregation-and-processing component of an automated interaction-monitoring system generates a sequence of observed-state vectors 1106 for the first participant and a sequence of observed-state vectors 1108 for the second participant over a period of time represented by a timeline 1110. Each state vector includes a valence-value element and an arousal-value element. As discussed above with reference to FIG. 7B, each state vector represents a point in a two-dimensional emotional-state surface or plane. Thus, as shown in FIG. 11B, the ordered sequence of state vectors for the two participants can be plotted as a path or trajectory in the two-dimensional emotional-state space. In FIG. 11B, the emotional states of a first participant are represented by numerically-labeled, shaded discs connected by arrows 1110 and the emotional states of a second participant are represented by numerically-labeled unshaded discs 1112. These two representations each comprises a path or trajectory through emotional-state space, with the numeric labels indicating the time sequence of the emotional states connected into the two different paths or trajectories. Considering each emotional state as a position vector in two-dimensional emotional-state space, a difference vector can be computed between each pair of identically-labeled emotional states selected from the two paths, as shown in FIG. 11C. For example, the difference vector 1114 represents the vector difference between emotional state 1116 and emotional state 1118. In FIG. 11D, the difference vectors between pairs of identically labeled emotional states are plotted with respect to the origin in plot 1120. These difference vectors can be added, by vector addition, and then divided by the number of difference vectors to compute a type of average difference vector 1122. Then, a synchronization value Y is computed 1124 by summing the magnitudes of the differences between the difference vectors and the average difference vector and dividing by the total number of different vectors. The two emotional-state-trajectory paths shown in FIG. 11C appear to be somewhat correlated, but at the same time, quite different. As a result, the difference vectors point in many different directions, in plot 1120, and therefore, when summed, tend to cancel one another out. Two different emotional-state trajectories 1126 and 1128 are shown in FIG. 11E, along with the computed difference vectors and the average difference vector 1130 computed and plotted as in FIG. 11D for the difference vectors shown in FIG. 11C. The computed synchronization value Y 1132 for these difference vectors is 0. In other words, all of the difference vectors are identical and all of the difference vectors are identical to the average difference vector, and thus the sum in the expression for Y is 0. As can be seen in FIG. 11E, the two emotional-state trajectories are identical in shape and size, but are translated horizontally with respect to one another. It is in that sense that the emotional states of the participants corresponding to the two emotional-state trajectories are synchronized. They are identical but for a time lag. One might infer that one of the two participants is strongly influencing the other of the two participants so that their emotional states are highly correlated. Yet another example of the synchronization between two emotional-state paths is shown in FIG. 11F. In this case, the emotional states of the two participants start out relatively far apart 1134 and 1136 but, over time, converge to nearly the same emotional state 1138. In this case, the computed synchronization value Y 1140 is intermediate between the synchronization of value Y (1132) in FIG. 11E and the synchronization value Y (1124) in FIG. 11D. Thus, the computed synchronization value Y is 0 for fully synchronized emotional states and increases with decreasing synchronization of emotional states. The synchronization value Y is but one example of many different possible ways of computing a numerical value indicative of the emotional synchronization between a pair of participants in an interaction. It is a type of synchronization related to emotional-state trajectories within emotional-state space. As mentioned above, a second type of synchronization is computed as the instantaneous phase coherence and will be discussed, in detail, below.

Figure 12B:
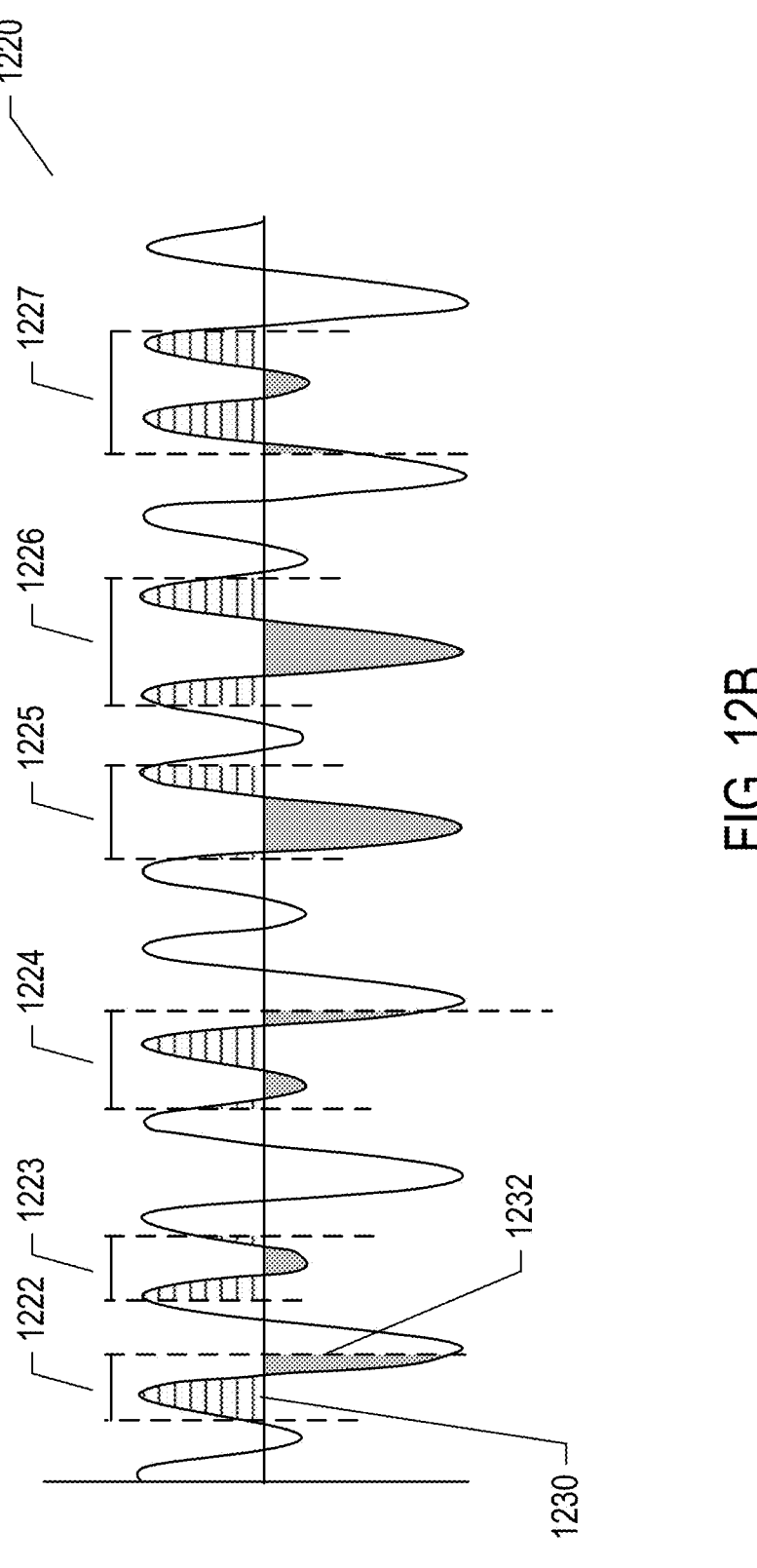
Figure 12C:
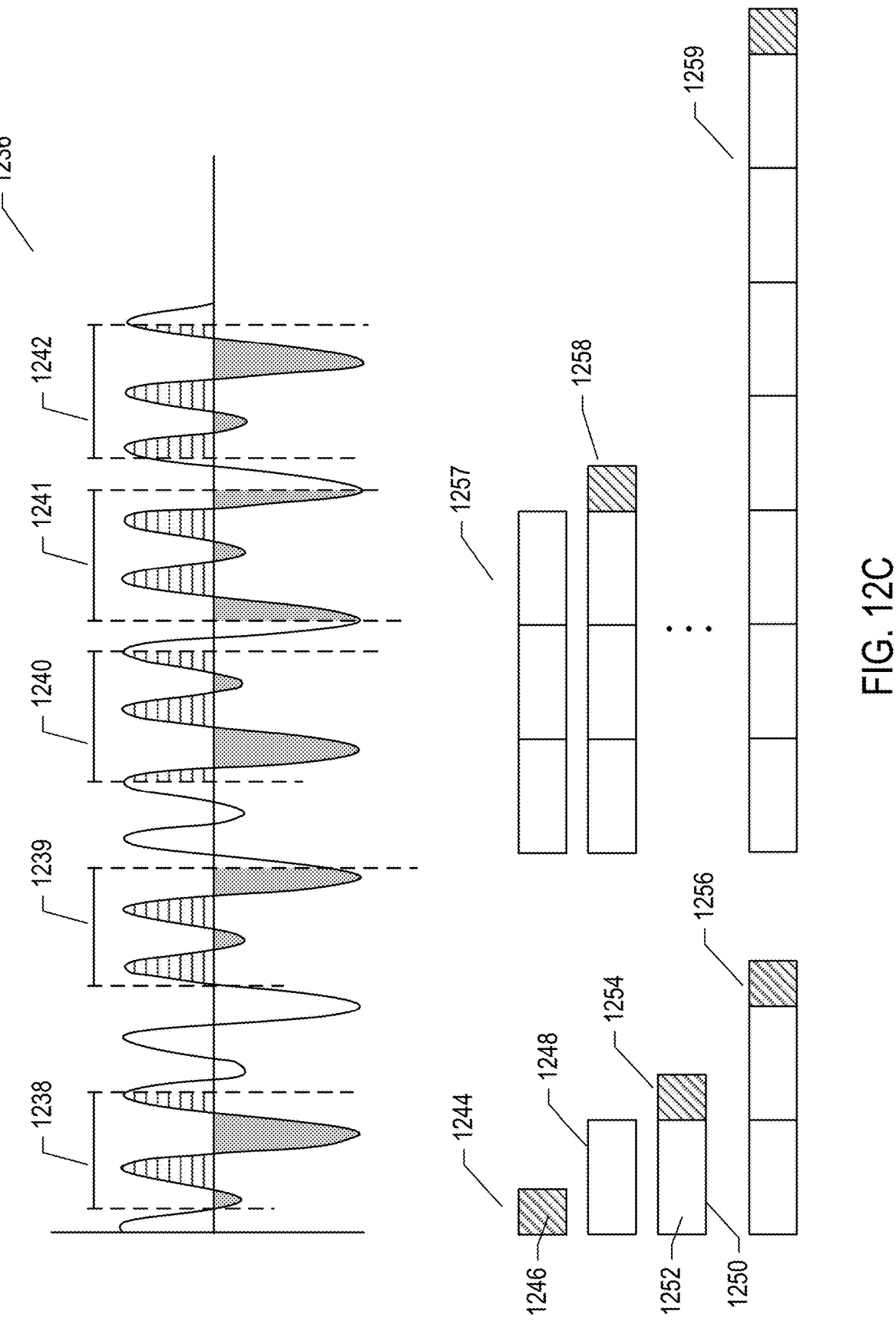

FIGS. 12A-C illustrate nonstationary timeseries data and advantages associated with characterizing timeseries data using statistical metrics computed over time periods rather than metrics based on a single time point. The mathematical model for the simple oscillator, discussed above with reference to FIG. 9A-B is a periodic function, meaning that the function can be shifted to the left or to the right by one period without changing the function. The sine and cosine functions are classical examples of periodic functions. For example, $\cos(x)=\cos(x+2\pi)=\cos(x+4\pi) \ldots \cos(x+n\pi)$, where n is an integer multiple of 2. However, the timeseries data comprising a time-ordered sequence of state vectors, or a time-ordered sequence of the values of one element of the state vectors in the time-ordered sequence of state vectors, is generally not periodic. A stationary timeseries may not be periodic, but statistical characteristics computed from sufficiently long time intervals selected from the timeseries are constant, or nearly constant, across the entire timeseries. As the length of the time intervals used to generate the statistical characteristics increases, the degree to which the statistical characteristics computed from two different time intervals are constant and non-varying also increases. For nonstationary timeseries, by contrast, statistical characteristics computed from timeseries data within two different time intervals of two different timeseries generally differ, and the difference does not approach 0 in the limit of infinite-length time intervals. FIG. 12A illustrates construction of a nonstationary timeseries by adding three different simple functions. The first function 1202 is linear. The second function 1204 is somewhat similar, in form, to a periodic sine function, but because the phase decreases with increasing x, the distance between extremal points, or peaks and valleys, steadily increases with increasing x values. The third function 1206 is also nonperiodic, but the distances between extremal points decrease with increasing values of x. Addition of the first, second, and third functions produces the nonstationary function 1208, which does not exhibit any hint of periodicity. Because a component of this function is the linear function 1202, the nonstationary timeseries 1208 does tend to increase over time, with this increase referred to as a "trend" and resulting from component function 1202. Complex seemingly non-periodic functions can be constructed by combining periodic functions, and the component functions can be identified from the nonperiodic functions by use of Fourier analysis, wavelets, or other types of complex-signal analytical approaches. However, for nonstationary functions, these types of analytical approaches are generally unsatisfactory. A different analytical approach used by the currently disclosed methods and systems to determine components of a nonstationary timeseries is discussed below.

FIGS. 12B-C illustrate the advantage of using longer time intervals within timeseries data for computing statistical characteristics for comparison. A periodic function is plotted in plot 1220 in FIG. 12B. A common statistical characteristic is the average value of a function within a particular time interval. FIG. 12B shows time intervals of increasing length, represented by line segments 1222-1227. The portion of the function within each time interval representing positive values is indicated by striping, such as striping 1230 within time interval 1222, and the portion of the function within each time interval representing negative values is indicated by shading, such as the shaded region 1232 within time interval 1222. By comparing the striped and shaded portions of the function for each time interval shown in FIG. 12B, it is evident that the average value computed for a given time interval of a particular length generally differs significantly from that computed for a different time interval of the same length. For example, it is evident that average value computed for time interval 1222 would be less than the average value computed from time interval 1223, since the positive and negative portions of the function within time interval 1222 appear to be closer in size than the positive and negative portions of the function within interval 1223. It is also clear that the computed average would be different for equal-length time intervals 1224 and 1225 and for equal-length of time intervals 1226 and 1227. However, as shown in plot 1236 in FIG. 12C, when the lengths of the selected time intervals 1238-1242 are identical and equal to the period of the periodic function, the average value in each of these identical time intervals, regardless of where they are located along the x axis, is also identical. Thus, when the length of the time intervals selected for comparison is less than the length of the period of the function, as represented by rectangle 1244, statistical characteristics of a selected time interval of that length may vary considerably from the statistical characteristics of a different time interval of the same length, indicated by striping 1246. However, when the length of the selected intervals for comparison is exactly equal to the length of a period of the function, as represented by rectangle 1248, statistical characteristics such as the average value will be identical for any two selected time intervals of that length, regardless of from what part of the function the time intervals are selected. When the length of the selected time intervals increases further, as represented by rectangle 1250, then the statistical characteristics of a portion of the time interval of a length equal to the length of the period of the function 1252 will be identical to the statistical characteristics of a similar portion of a different selected time interval of a length equal to that of the first selected time, while the statistical characteristics of the remaining portion of the time interval 1254 may vary from selected time interval to selected time interval. As a length of the selected time interval increases, as indicated by rectangles 1256-1259, the portion of the selected time interval that may differ, in statistical characteristics, from the statistical characteristics of a different time interval of the same length increasingly decreases and approaches 0 at the limit of infinite-length selected time intervals. Even in the case of nonstationary timeseries that may include various quasi-periodic components, such as repeated, similar patterns, it is generally beneficial to use statistical metrics computed over significant time periods when comparing nonstationary timeseries. Of course, there are statistical metrics which would not approach constant values for time periods of increasing length.

Figure 13A:
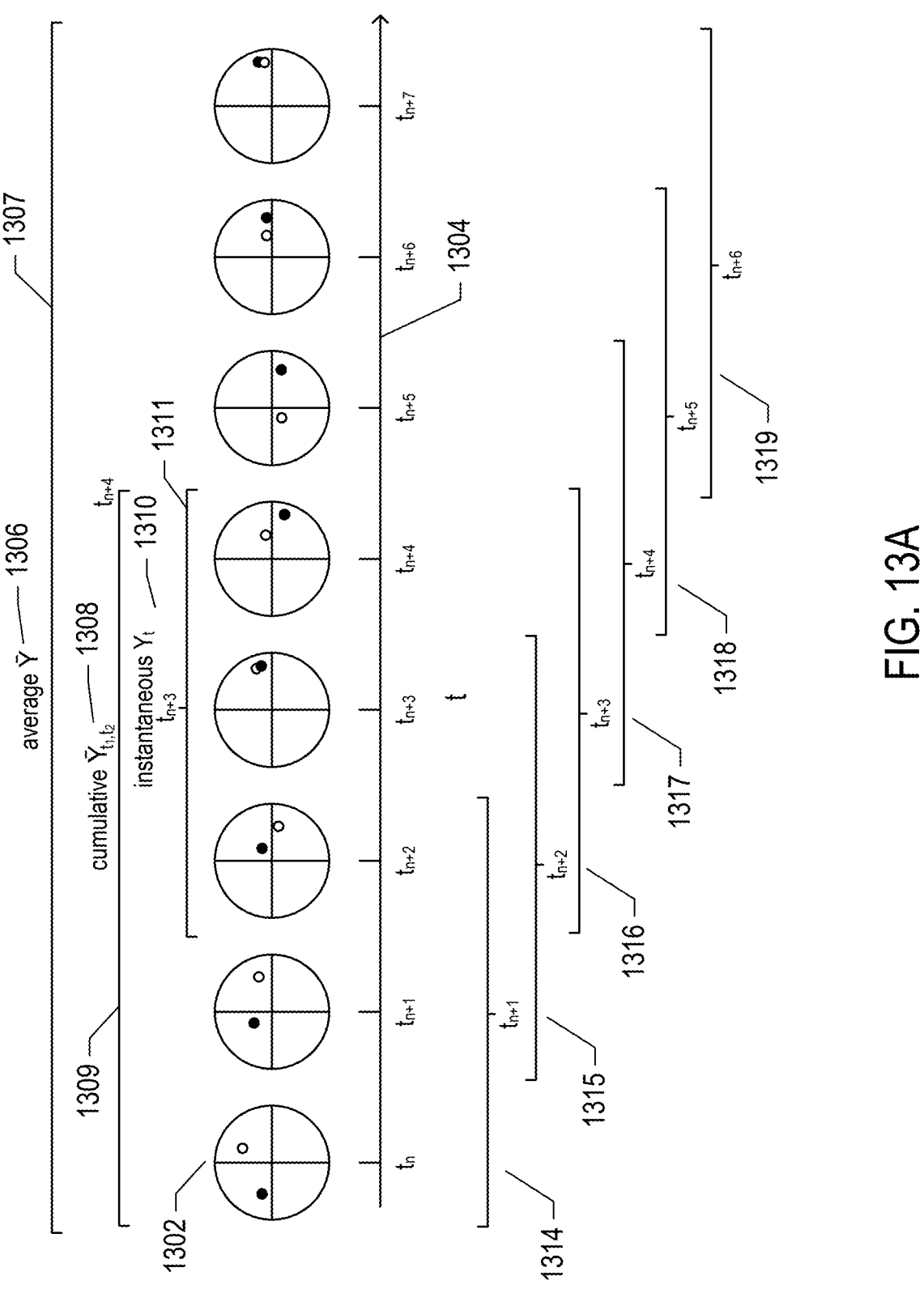
FIGS. 13A-B illustrate different types of synchronization metrics, based on the synchronization metric Y, that are computed from a timeseries of emotional-state vectors, referred to above as "emotional-state trajectories."
Figure 13B:
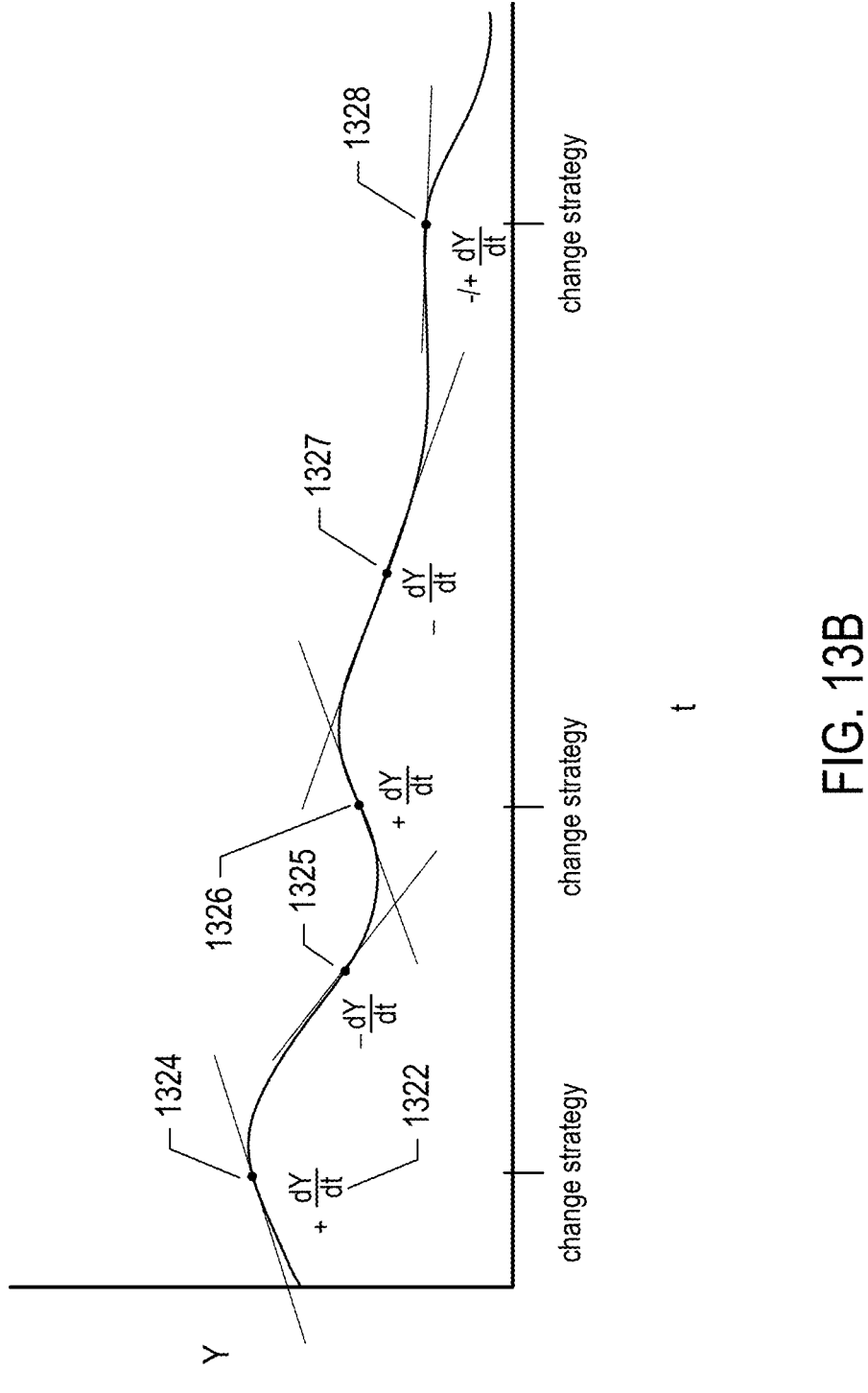

FIGS. 13A-B illustrate different types of synchronization metrics, based on the synchronization metric Y, that are computed from a timeseries of emotional-state vectors, referred to above as "emotional-state trajectories." The timeseries of emotional-state vectors for two participants is represented by the emotional-state-space representations, such as emotional-state representation 1302, ordered along with the time interval 1304. The participants may be either humans or both humans and an automated system. Of course, the time interval for computing and recording emotional-state vectors would generally include far more emotional-state vectors than shown in FIG. 13A, from hundreds to thousands to tens of thousands or more. An average synchronization metric 1306 might be computed over the entire length of the timeseries 1307. A cumulative synchronization metric 1308 may be computed, at each point in time, over the length of the timeseries up to a particular point in time 1309. An instantaneous synchronization metric 1310 may be computed from some relatively short time interval 1311 with respect to the total length of time of the timeseries. A series of instantaneous synchronization metrics may be computed from a series of overlapping short time intervals 1314-1319. This series of instantaneous synchronization metrics may be symbolically represented as "Y(t)." Another synchronization metric is the first derivative of Y(t) with respect to time), dY/dt. As shown in FIG. 13B, the sign of the value of the first derivative of Y(t) at various points 1324-1328 along a plot of Y(t) indicates whether or not synchronization is increasing or decreasing at those points. The magnitude of the first derivative of Y(t) indicates the rate of change of the synchronization at those points.

Figure 14:
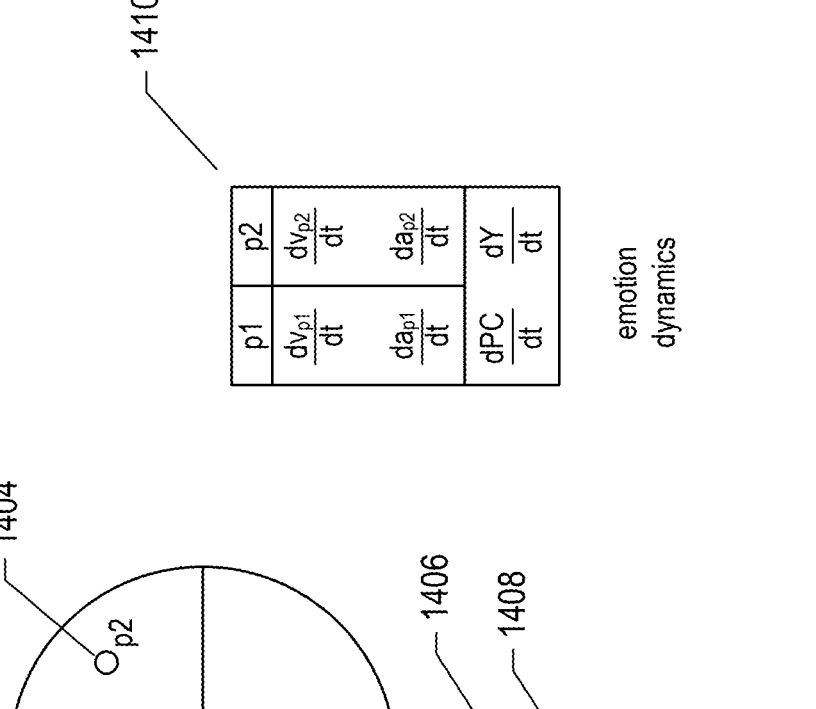
FIG. 14 illustrates a set of derived values and metric values that together represent an emotional compass that provides an indication of the emotional states and degree of synchronization between participants in an interaction.

FIG. 14 illustrates a set of derived values and metric values that together represent an emotional compass that provides an indication of the emotional states and degree of synchronization between participants in an interaction. The emotional compass illustrated in FIG. 14 indicates the emotional states of, and degree of synchronization between, two participants in an interaction, but a general emotional compass can indicate emotional states of a single participant and the emotional states of, and degree of synchronization between, three or more participants of an interaction. The emotional compass shown in FIG. 14 provides an indication of the emotional states 1402 and 1404 of two participants. These emotional states can be represented as a graph-like emotional-state plane or surface, as discussed above. However, the emotional states may also be represented by a pair of two-element state vectors or in other ways. The emotional compass may include an indication of the instantaneous phase coherence of the emotions of the two participants 1406 and may also include a synchronization metric, such as the above-discussed synchronization metric Y 1408 derived from the emotional-state trajectories of the two participants. The emotional compass may also include various emotion-dynamics metrics shown in table 1410, which may include the first derivatives, with respect to time, of the valence values and arousal values of the two participants as well as the first derivatives, with respect to time, of the instantaneous phase coherence and a synchronization metric derived from emotional-state trajectories. In various implementations, the emotional compass may include fewer derived values and metric values and/or additional derived values and metric values. Certain of the derived values and metric values included in an emotional compass may be specific for a particular point in time, often the current time, or may be computed from specific time intervals, as discussed above with reference to FIG. 13A.

The emotional compass displays results generated by complex computations, as discussed further below and as mentioned in the discussion of FIG. 8A, generally based on observed data values obtained by various different types of sensors and monitoring devices. The emotional compass represents a type of automated navigation tool that can be used both by human beings as well as by automated systems for many different purposes. As briefly mentioned above, an emotional compass may be used by a call-center application to periodically or continuously refine response strategies in order to helpfully and sensitively respond to caller requests during automated call answering. For example, the call-center application can use the emotional compass to detect when a caller is becoming frustrated or angry and to therefore alter the response strategy in order to better satisfy the caller's needs. As another example, an automated medical-information-provision application may use the emotional compass to detect when a user is embarrassed during a discussion and to then alter the discussion in ways that would likely alleviate user embarrassment. The emotional compass rather directly solves the current problem that automated systems are generally completely unaware of the emotional components of human interactions, unlike human beings, and therefore cannot competently conduct an interaction with human beings who expect those, with whom they interact, to be emotionally aware. The emotional compass is also useful for monitoring human interactions by counseling systems and diagnostic systems. The emotional compass may be extremely useful for automated teaching systems, as yet another example, to detect when there is a resonance or synchronization between an instructor using a current approach to provide information to a student or pupil and the student or pupil. The automated teaching system can use the emotional compass to detect when the student or pupil is bored or inattentive or when the student or pupil is becoming frustrated or angry because of the student's or pupil's inability to understand the information provided. Just as compasses and GPS systems allow users to efficiently and accurately traverse physical landscapes, the emotional compass allows users to efficiently and accurately navigate emotional landscapes in which human-to-human and human-to-computer interactions occur. An automated system can use the emotional compass to steer an interaction towards one or more desired outcomes, just as the user of a compass and GPS system can steer himself or herself towards a geographical destination. An automated system that monitors human interactions can use the emotional compass to annotate and analyze recorded human interactions.

The emotional compass is thus a collection of continuously, periodically, or intermittently generated emotional-state, metric, and derived data values or a collection of emotional-state, metric, and derived data values updated on demand. The emotional compass can be accessed through a graphical interface, an application programming interface, memory locations that store generated emotional-state vectors, one or more phase-coherence metrics, and one or more emotional-synchronization metrics, and/or a data stream transmitted through a communications medium.

The remaining portions of the current document are devoted to a detailed discussion of the computational methods that provide certain of the derived values and metric values that together comprise implementation of the above-discussed emotional compass. This detailed discussion employs mathematical expressions, control-flow diagrams of computational methods, and an exemplary computer program. These methods are incorporated into complex, real-world automated systems that monitor and analyze human interactions. The currently disclosed methods and systems which provide a foundation for the above-described emotional compass are neither abstract nor nonfunctional, but instead provide a greatly needed and useful improvement to the automated systems that interact with humans and the automated human-interaction-monitoring-and-analysis systems in which they are incorporated. The currently disclosed methods essentially provide automated systems with emotional awareness.

Figure 15A:
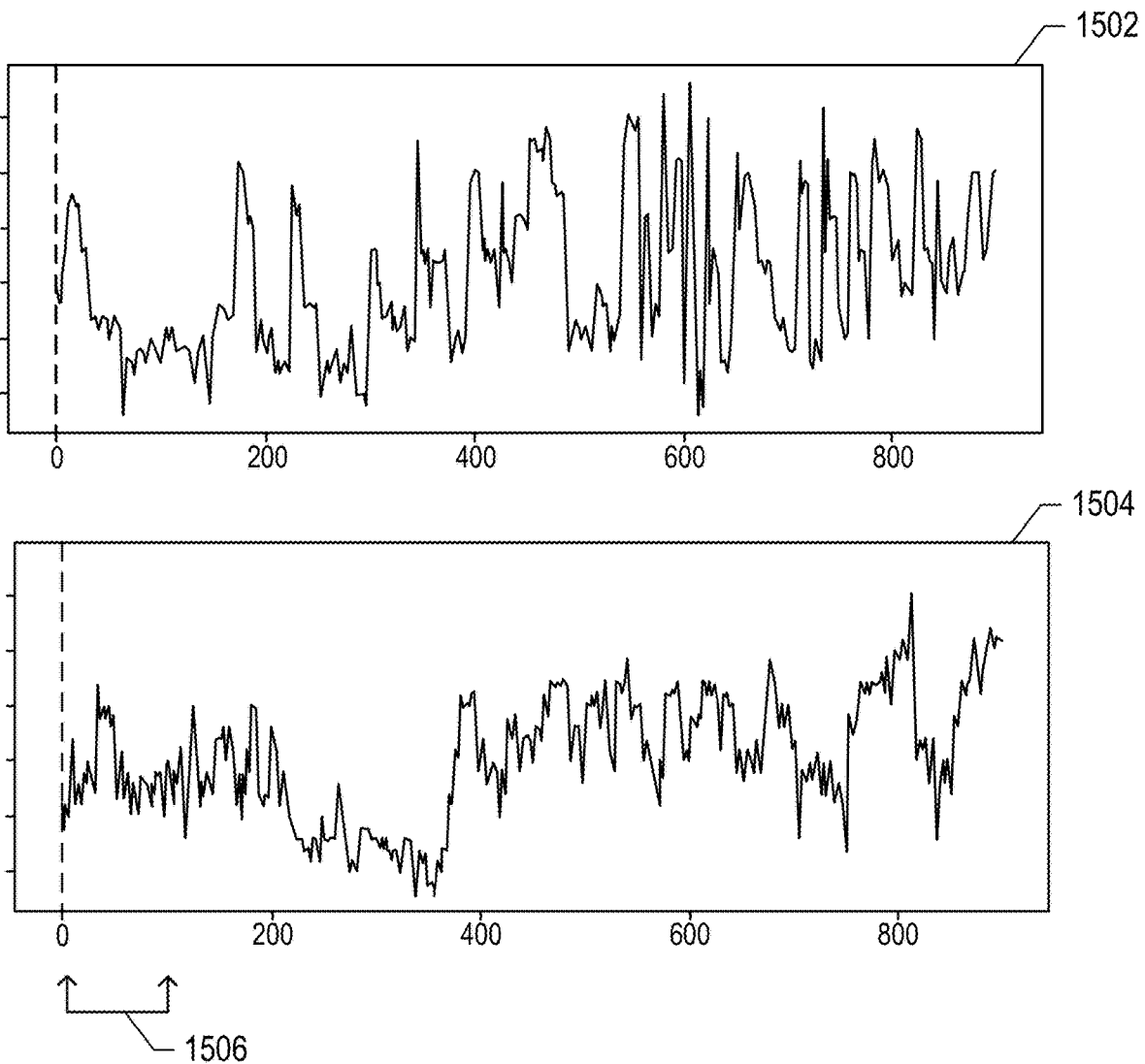
FIGS. 15A-D illustrates a valence timeseries input to the currently disclosed methods and systems and an empirical mode decomposition ("EMD") analysis method that generates a set of intrinsic mode functions ("IMFs") that represent components of the input timeseries.

FIGS. 15A-D illustrates a valence timeseries input to the currently disclosed methods and systems and an empirical mode decomposition ("EMD") analysis method that generates a set of intrinsic mode functions ("IMFs") that represent components of the input timeseries. FIG. 15A shows two timeseries plots 1502 and 1504 that represent the observed valence values for two participants in a monitored conversation. The vertical axes in the plots represent valence values and the horizontal axes represent time, in seconds. The timeseries are both nonperiodic and nonstationary. As mentioned above, traditional analysis methods, such as Fourier analysis and wavelets, are generally unsatisfactory for identifying components of such nonperiodic and nonstationary timeseries. However, despite being nonperiodic and nonstationary, the timeseries shown in FIG. 15A may, in fact, include underlying patterns and periodic or quasi-periodic components. In order to discover such patterns and components, the currently disclosed methods and systems employ EMD.

Figure 15B:
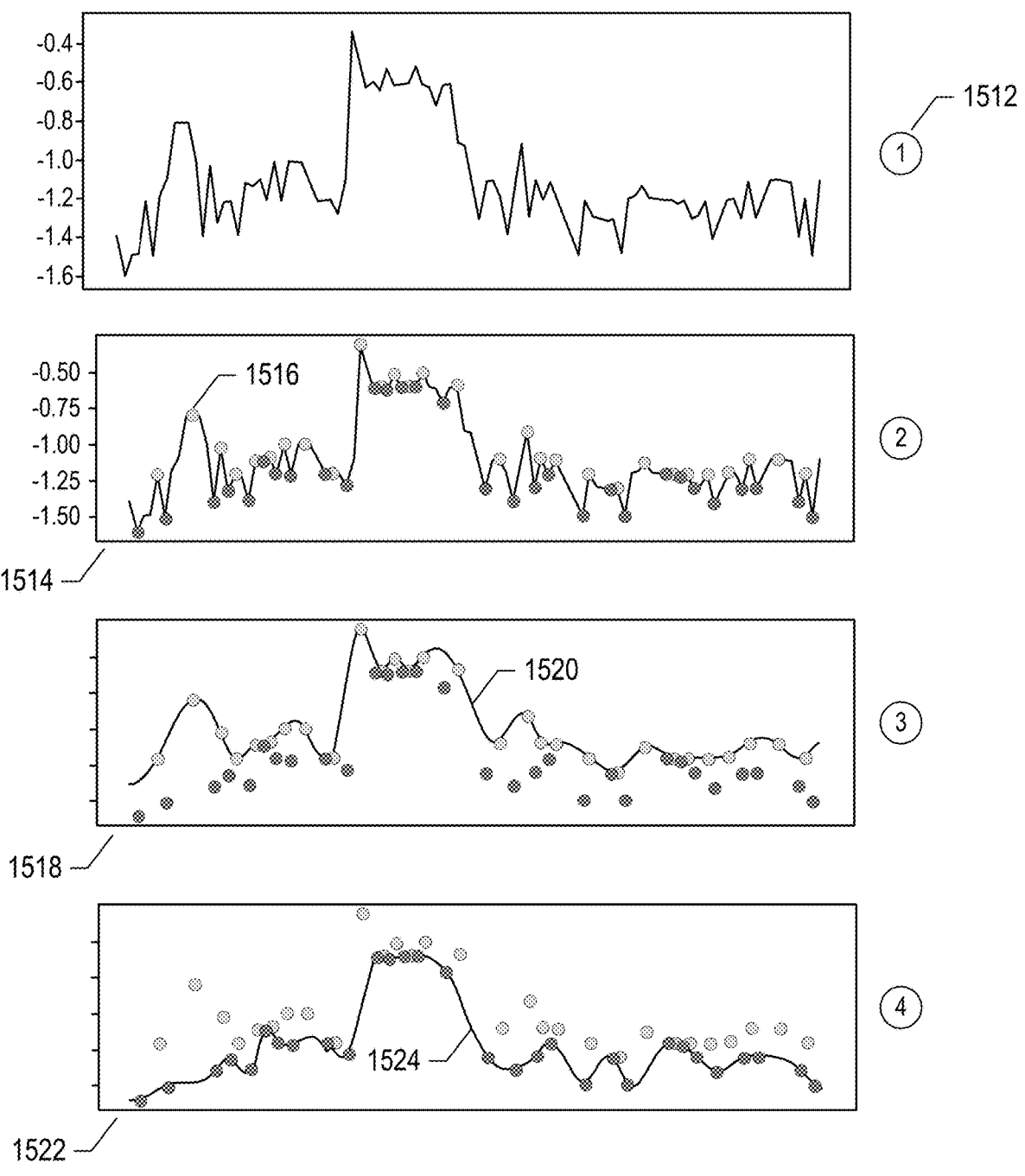
Figure 15C:
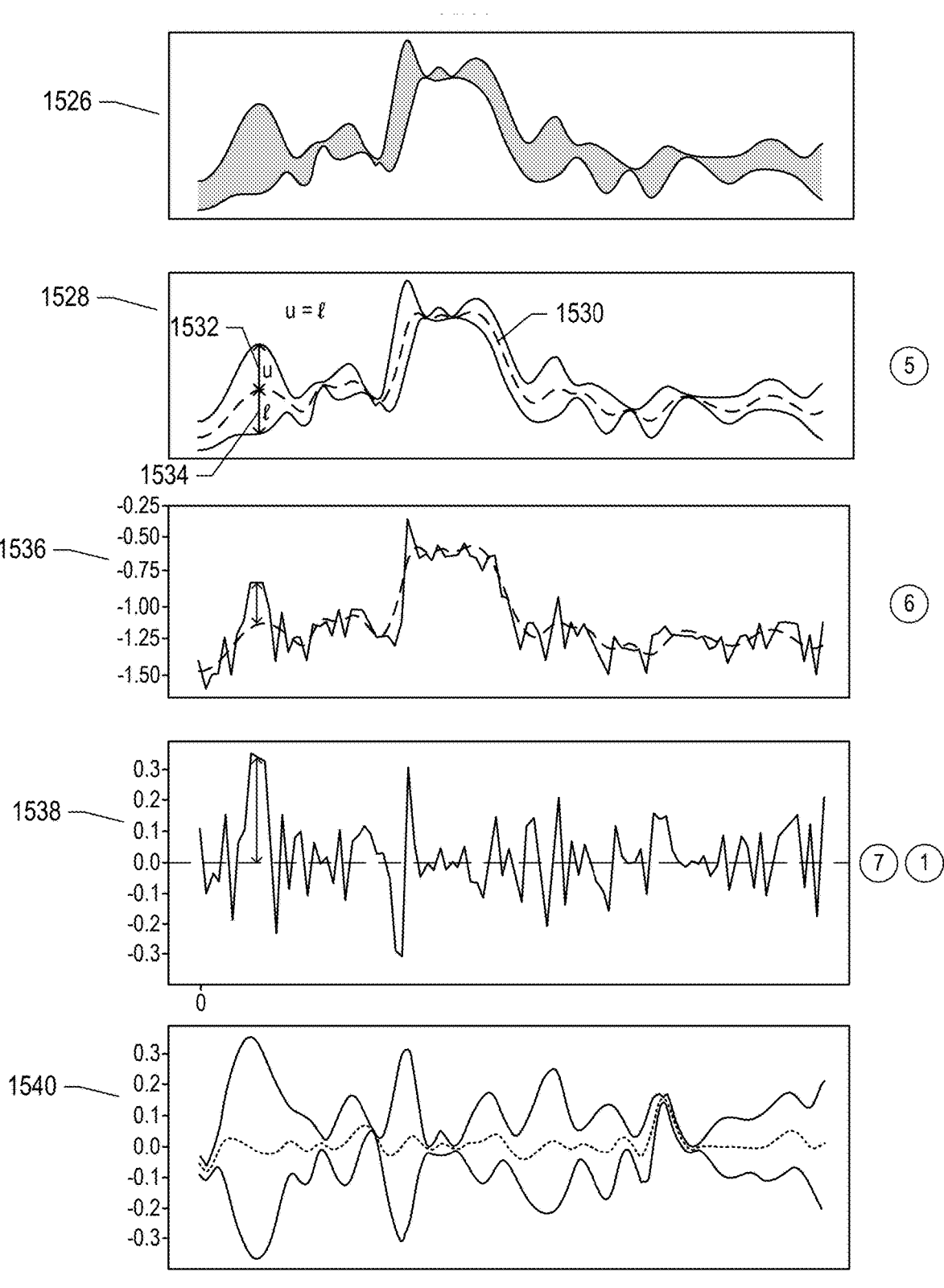

The EMD analysis method is illustrated in FIG. 15B-C. A small portion 1506 of the second timeseries 1504 shown in FIG. 15A is reproduced at a larger scale in plot 1510 of FIG. 15B. This timeseries represents the initial signal or function for a first iteration of the EMD analysis method. A circled "1" symbol 1512 indicates that this is the first step of an iteration of steps in the EMD analysis method. In a plot representing a second step of the EMD analysis method 1514, the extremal points in the timeseries are identified and represented by small filled-in disks, such as filled-in desk 1516. In a third step of the EMD analysis method, represented by plot 1518, the extremal points of the timeseries that represent local maxima are selected and an upper-envelope curve 1520 is constructed from the selected local-maximum points using a cubic-Hermite-spline method. In a fourth step of the EMD analysis method, represented by plot 1522, the extremal points of the timeseries that represent local minima are selected and a lower-envelope curve 1524 is constructed from the selected local-minimum points using the cubic-Hermite-spline method. Plot 1526 in FIG. 15C shows, using shading, the region in between the lower-envelope and upper-envelope curves. In a fifth step illustrated by plot 1528, an average curve, represented by dashed curve 1530 in plot 1528, is constructed within the region between the lower-envelope and upper-envelope curves. Each point of the average curve is located equidistant from the lower-envelope curve and the upper-envelope curve, as indicated by arrows 1532 and 1534. In a sixth step illustrated in plot 1536, the average curve is subtracted from the timeseries shown in plot 1510 in FIG. 15B to generate a proto-IMF. The proto-IMF is plotted in plot 1538. The proto-IMF then becomes a new timeseries for another iteration of steps 1 through 7. Plot 1540 shows the upper-envelope and lower-envelope curves and average curve generated from the proto-IMF in the fifth step of the next iteration of the EMD method. When the average curve generated in the fifth step of an iteration of steps 1-6 is within a threshold value of being a horizontal line, the proto-IMF is promoted to the next IMF identified by the EMD method and is subtracted from the current initial timeseries to generate a next initial timeseries that is the starting point for a next round of iterations that generate a next IMF.

Figure 15D:
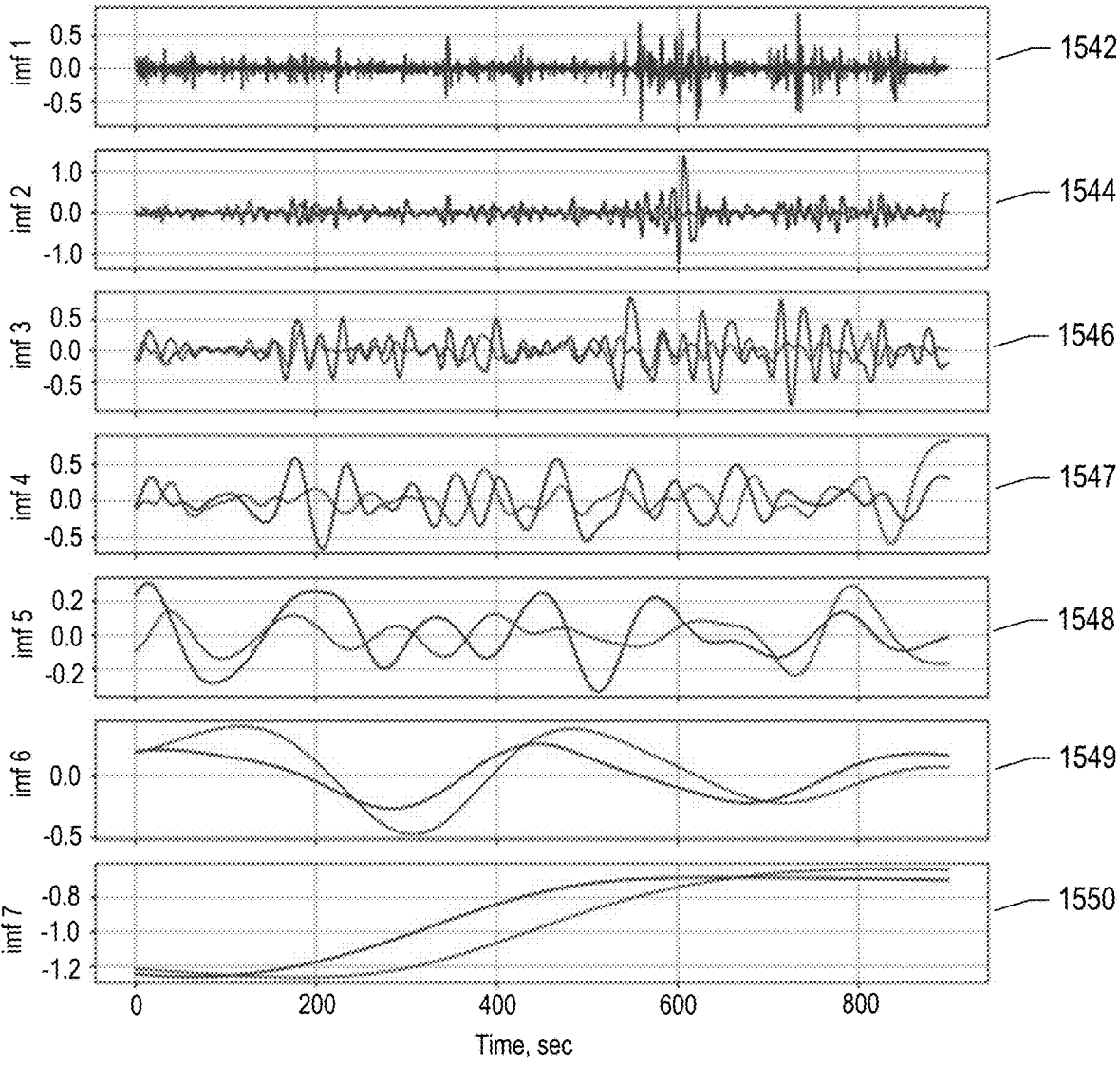

FIG. 15D shows the IMF components of the timeseries 1504 shown in FIG. 15A identified by the EMD method. The first few IMFs 1542 and 1544 are generally relatively high-frequency noise-dominated IMFs, and are usually discarded. The next four IMFs 1546-1549 represent generally meaningful timeseries components with decreasing frequencies. The final component 1550 is a remainder component that represents a remainder or trend component of the timeseries. When a first proto-IMF of a next iteration of the EMD method is monotonic, has a maximum amplitude less than a threshold value, or satisfies some other stopping-point criterion, it is regarded as a remainder or trend component.

Figure 16A:
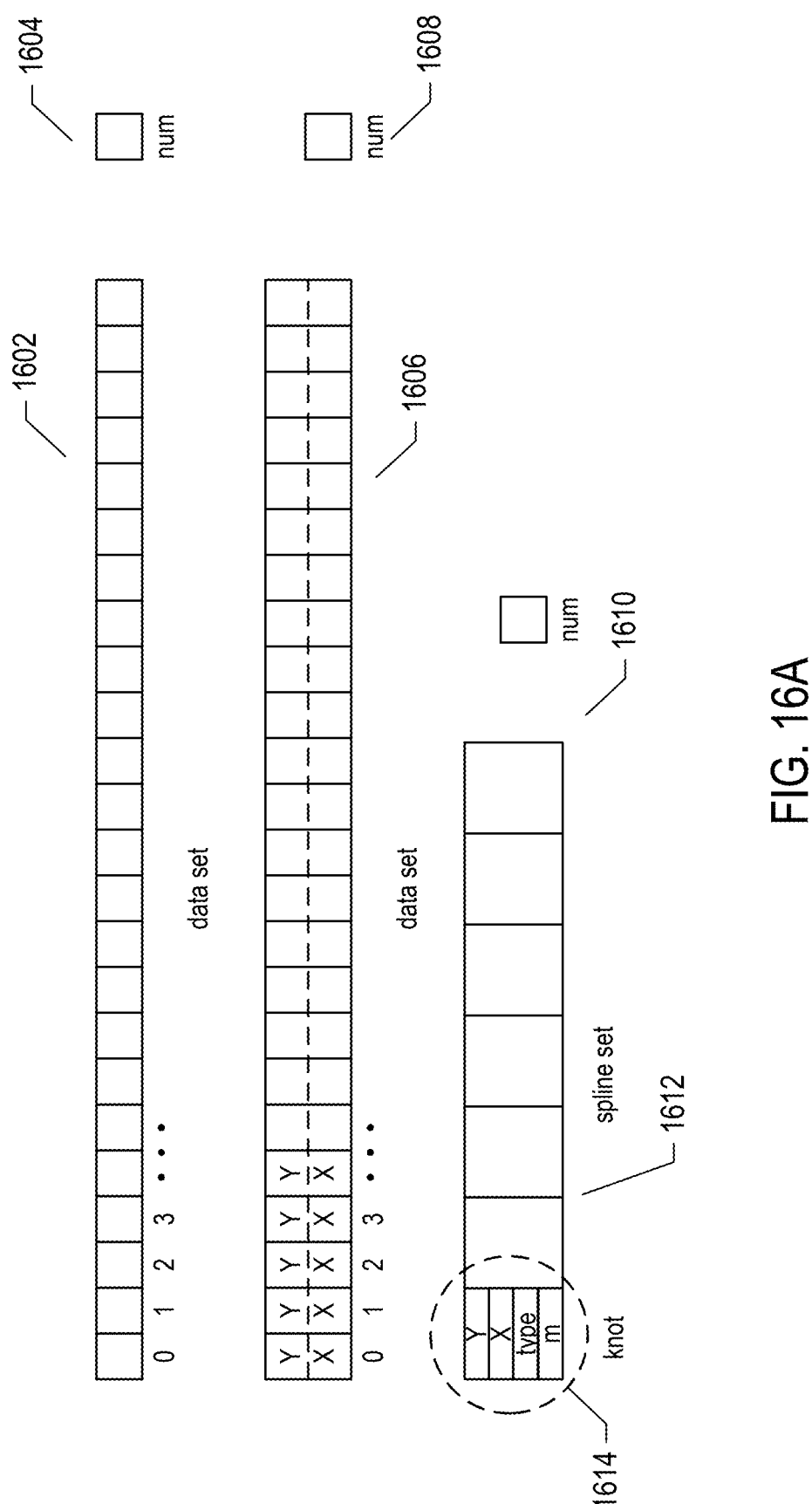
FIGS. 16A-B provide a control-flow diagram illustrating the EMD analysis method.
Figure 16B:
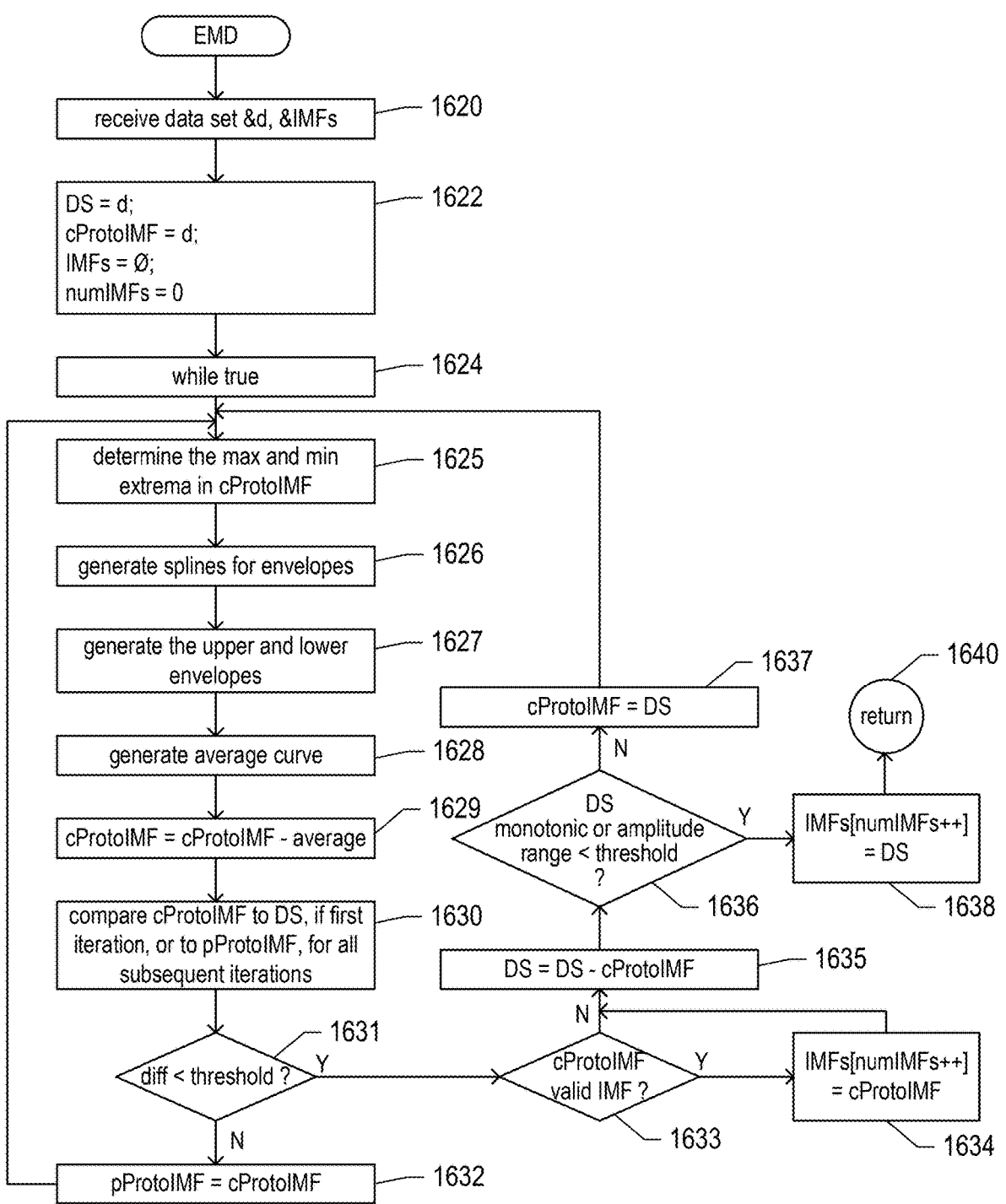

FIGS. 16A-B provide a control-flow diagram illustrating the EMD analysis method. FIG. 16A shows several different data structures used in the example implementation of the EMD analysis method illustrated in FIGS. 16A-B. A dataset 1602 implements a timeseries, which can also be considered to be a function or signal. The dataset is an array of numeric values, generally floating-point values, along with an integer 1604 indication of the number of entries or elements in the timeseries. Datasets can alternatively be represented by program constructs referred to as "vectors" and in other ways For simplicity, the example implementation uses arrays. The indices of the array 1602 represent time points in the timeseries. Thus, the timeseries is generated by periodic acquisition of timeseries values, with the period a fixed time interval. An alternative representation of a dataset 1606 includes (x,y) coordinates in each element, with the x coordinate representing a time point and the y coordinate representing the value of the timeseries or function at the time point represented by the x coordinate. This representation also includes an integer 1608 indication of the number of entries or elements in a dataset. This second implementation of a dataset allows for time intervals of varying length between successive data points, unlike the first implementation 1602. There are, of course, many alternative representations of timeseries that can be used in an implementation of the EMD analysis method. A final data structure 1610 is a spline set. Each element in the array 1612 that implements the spline set, such as the first element shown in inset 1614, includes a pair of coordinates (x, y) which represent a data point of the timeseries, and a slope m that is used in generating a smooth curve containing all of the data points represented by elements in the spline set. The (x, y) coordinates and slope m together comprise a knot. Each element in the array 1612 also includes a type indicating the type of extrema represented by the element, in one implementation.

FIG. 16B provides a control-flow diagram for a routine "EMD" that illustrates the EMD analysis method. In step 1620, the routine "EMD" receives a reference to a dataset d and a reference to a set of IMFs, IMFs, in which the IMFs generated by the routine "EMD" for the dataset d are stored. In step 1622, the routine "EMD" initializes a local variable DS to contain the dataset d, initializes a local variable cProtoIMF to contain the dataset d, initializes the set of IMFs to the empty set, and sets local variable numIMFs to 0. In the continuous loop of steps 1624-1637, the routine "EMD" iteratively generates IMFs and adds them to IMFs. In the inner loop of steps 1625-1632, the routine "EMD" generates a next IMF to add to the set of IMFs IMFs.

In step 1625 of the inner loop, the routine "EMD" determines the maximum and minimum extrema in the dataset cProtoIMF, as discussed above with reference to plot 1514 in FIG. 15B. In step 1626, the routine "EMD" generates a spline dataset for the maximum extrema and a spline dataset for the minimum extrema. Each spline dataset, as discussed above with reference to 16A, includes an ordered sequence of knots, each knot representing an extremal data point. The spline datasets are used to generate envelope curves by the cubic-Hermite-spline technique. In step 1627, the upper-envelope and lower-envelope curves are generated from the spline datasets, as discussed above with reference to plots 1518 and 1522 in FIG. 15B. In step 1628, the routine "EMD" generates an average curve, as discussed above with reference to plot 1528 in FIG. 15C. In step 1629, a new proto-IMF is generated as discussed above with reference to plots 1536 and 1538 in FIG. 15C. In step 1630, the new proto-IMF is compared, in the first iteration of the inner loop of steps 1625-1632, to the timeseries DS and, in subsequent iterations, to the previous proto-IMF pProtoIMF. In certain implementations, a sum of the difference, SD, is computed and compared to a threshold SD value. The following expression indicates how the SD is computed for a current proto-IMF k and a previous proto-IMF k−1:

$$SD_k = \sum_{t=0}^{T} \frac{|h_{k-1}(t) - h_k(t)|^2}{h_{k-1}^2(t)},$$

where $h_k(t)$ is the current proto-IMF;
$h_{k-1}(t)$ is the previous proto-IMF;
t is the temporal index of data points in the proto-IMFs; and
T is the final temporal index.
When SD is less than a threshold value, as determined in step 1631, the routine "EMD" breaks out of the inner loop of steps 1625-1632. Otherwise, in step 1632, the local dataset variable pProtoIMF is set to the contents of local variable cProtoIMF and control flows back to step 1625 for a next iteration of the inner loop of steps 1625-1632. When the routine "EMD" breaks out of the inner loop of steps 1625-1632, the routine "EMD" determines whether the current proto-IMF is a valid IMF. If so, the current proto-IMF is added to the set of IMFs IMIs, in step 1634. Criteria for a valid IMF include: (1) the number of local minima and the number of local maxima differ by at most 1; and (2) the mean value is less than a small threshold value. Other criteria are possible. In step 1635, the routine "EMD" updates the timeseries DS by subtracting the current proto-IMF from DS. When the updated timeseries DS meets a stopping criterion, as determined in step 1636, DS is added to the set of IMFs as the remainder or trend, and step 1638, and the routine "EMD" terminates, in step 1640. Otherwise, in step 1637, cProtoIMF is set to DS and control flows back to step 1625 to begin a new set of iterations of the inner loop of steps 1625-1632.

FIGS. 17A-K show a simple implementation of the above-described EMD analysis method in C++. This implementation is included in the current document to illustrate, in greater detail, the EMD analysis method illustrated in the control-flow diagram provided in FIG. 16B. Rather than describing, in text, each statement in this implementation, the following concise description highlights the general features of the implementation and their correspondence with the above characterization of the EMD analysis method. Beginning with FIG. 17A, a number of constants 1702 are declared. The enumeration exType 1704 includes constants that represent the type of an extremal data point: MIN or MAX. The structure extrema 1706 represents an extremal data point. The structure spline 1708 represents an entry or element in a dataset of splines, discussed above with reference to FIG. 16A. Instances of the class dataset 1710 are timeseries, as discussed above with reference to FIG. 16A. Turning to FIG. 17B, instances of the class splines 1712 represent a dataset of splines that are used to generate the upper-envelope and lower-envelope curves. An instance of the class IMFs 1714 contains the set of IMFs generated by the EMD analysis method for an input dataset or timeseries. FIGS. 17C-D include simple implementations of various member functions of the classes dataSet and splines. These include an implementation of the dataSet member function getFirstExpectedExType, at the bottom of FIG. 17C, which determines the type of the first extremal data point in the dataset. The dataSet member function getNext, shown in FIG. 17E, extracts a next extrema data point from an instance of the class dataSet. FIGS. 17F-G show implementations of the member functions of the class splines, which implement the cubic-Hermite-spline method. FIG. 17G additionally shows an implementation of the IMFs member function compare, which implements computation of the SD value discussed above with reference to FIG. 16B. FIGS. 17H-I show implementations of IMFs member functions that generate the upper-envelope and lower-envelope spline sets. FIG. 17K shows an implementation of the IMFs member function generateIMFs which generates a set of IMFs from an input dataSet dS. The while-loop that begins with statement 1720 and ends with bracket 1722 is equivalent to the continuous loop of steps 1624-1637 in FIG. 16B. The for-loop that begins the statement 1724 and ends with bracket 1726 is equivalent to the inner loop of steps 1625-1632 in FIG. 16B.

The C++ implementation shown in FIG. 17A-K omits include statements that include various C++ libraries, including the libraries cmath, stdlib, stdio, cstring, and time. The C++ implementation shown in FIG. 17A-K is a simple implementation of the EMD analysis method that uses only simple data structures, such as arrays. EMD implementations may include additional internal methods and features to handle a variety of known problems with simplistic EMD implementations, including deficiencies in envelope generation, problems with generating envelopes at the beginning and end of a timeseries, stability problems with certain types of timeseries, and other known problems. One set of implementations computes an ensemble of IMFs by introducing stochastic noise into the analyzed timeseries and by computing the final IMFs as ensemble averages. Various alternative types of stopping criterion and proto-IMF difference computations may be used in different implementations of the EMD analysis method.

Figure 18A:
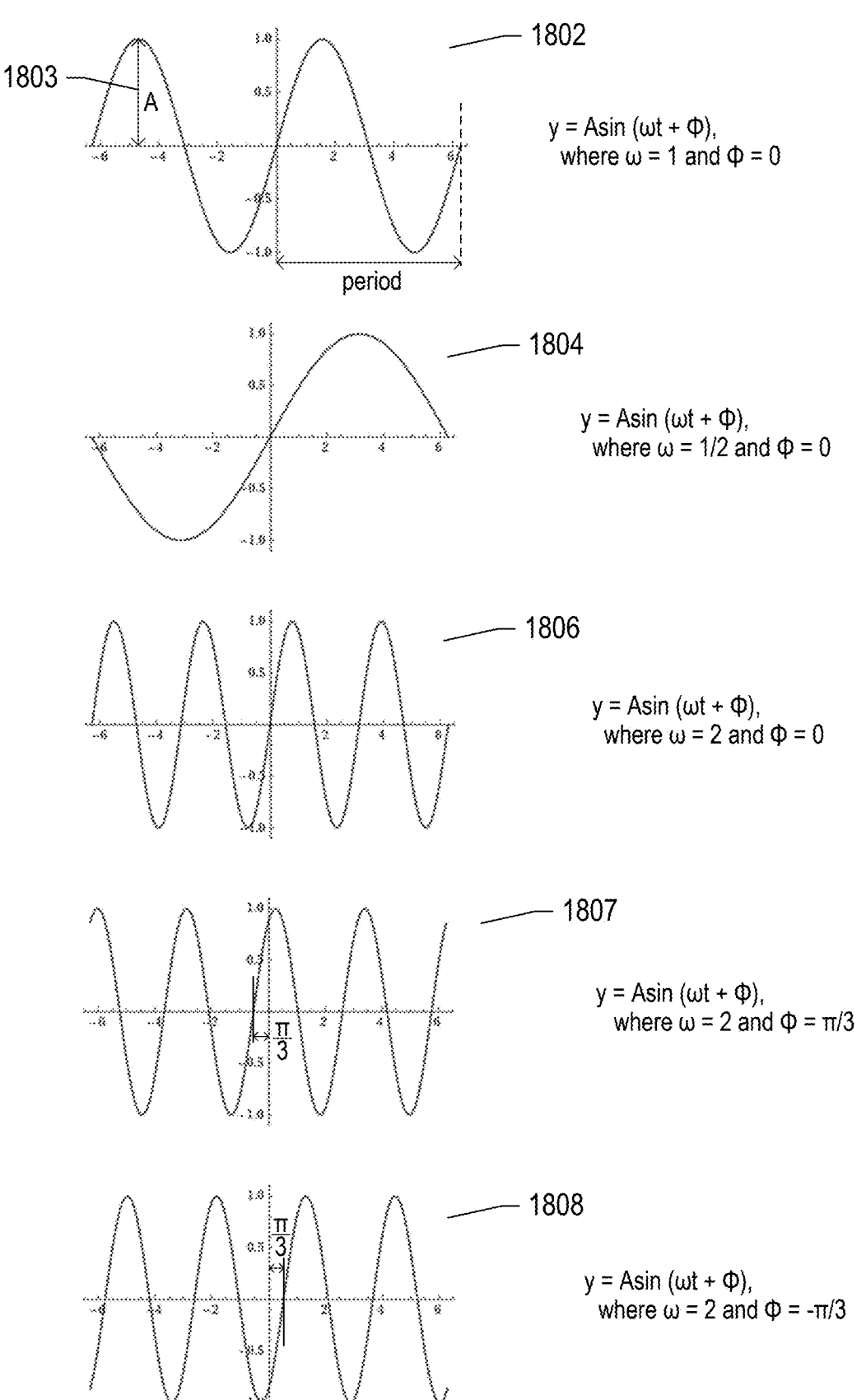
Figure 18C:
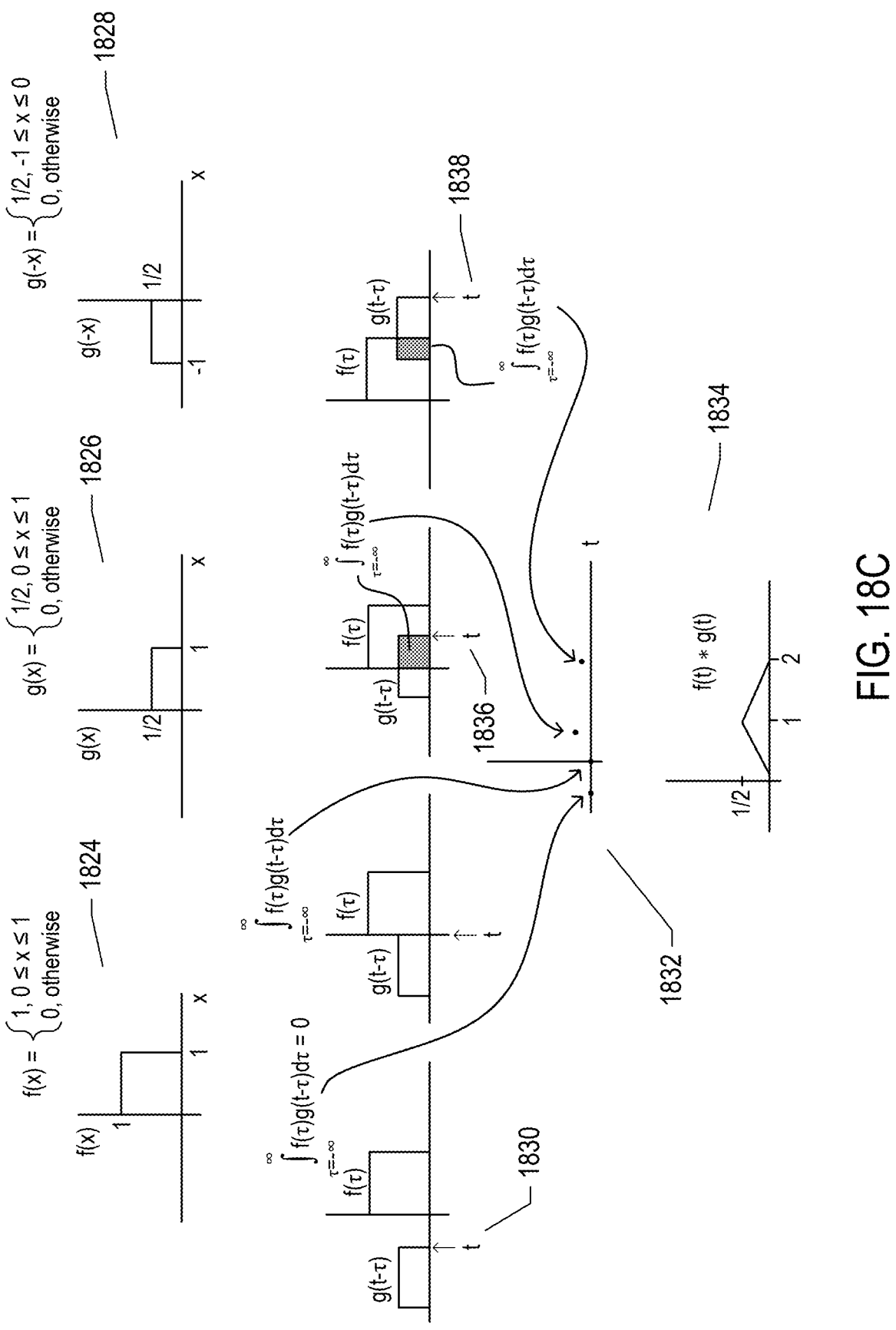

FIGS. 18A-C illustrate the meaning of the frequency and phase values incorporated into arguments to the trigonometric functions sine and cosine and illustrate the Hilbert transform and use of the Hilbert transform to generate instantaneous amplitudes, phases, and frequencies. As discussed above with reference to FIG. 9B, the cosine function is used in one solution to the second-order differential equation for the motion of the vertical spring. The sine function is essentially the cosine function shifted leftward by $\pi/2$ radians. A plot of the sine function 1802 is shown at the top of FIG. 18A. For this plot, the frequency $\omega$ is equal to 1 and the initial phase $\varphi$ is equal to 0 and thus the function $y=A \sin(x)$ is shown in plot 1802 where, as discussed above, A is the amplitude 1803. Plot 1804 shows a portion of a sine function with $\omega$ equal to $\frac{1}{2}$. Decreasing the numerical frequency value $\omega$ results in an increase in the period of the function. Whereas the period of the sine function plotted in plot 1802 is $2\pi$, the period of the sine function with frequency $\omega$ equal to $\frac{1}{2}$ is $4\pi$. Thus the length of the period of the function is inversely proportional to the frequency $\omega$. Plot 1806 shows a plot of a sine function with $\omega$ equal to 2. Here, the increase in the numerical value for the frequency $\omega$ results in a decrease in the period of the function. Plots 1807 and 1808 again indicate how the initial phase $\varphi$ shifts the function leftward, when positive, and rightward, when negative.

Expression 1810, at the top of FIG. 18B, shows that the cosine function is equivalent to shifting the sine function to the left by $\pi/2$ radians. While a cosine function can be used to model an oscillation, it is often more convenient to model an oscillation using the real portion of the expression $Ae^{i\theta}$, as indicated by expression 1812. This expression is equivalent to the expression $A(\cos \theta+i^*\sin \theta)$, as indicated in expression 1814. The real portion of this expression is $A \cos \theta$, as indicated in expression 1816, where $\theta=\omega t+\varphi$.

Figure 19:
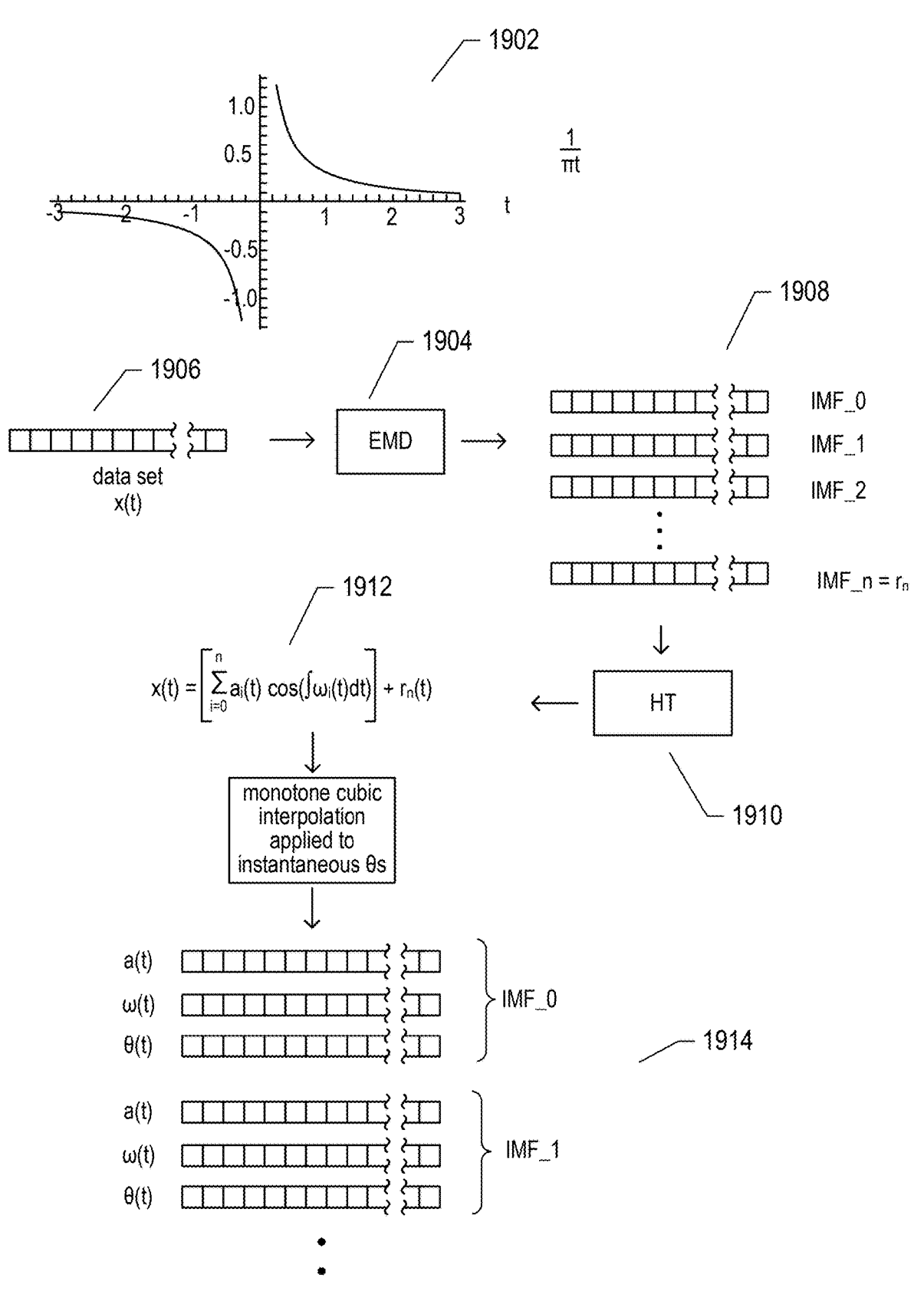
FIG. 19 illustrates a portion of the currently disclosed methods incorporated in the currently disclosed systems that generate the above-discussed emotional compass, which provides emotional awareness to automated systems that monitor human interactions and/or interact with humans.

When analyzing non-periodic and nonstationary timeseries, the simple trigonometric-function-based models that describe periodic oscillations are not suitable. However, the concepts of frequency, amplitude, phase are still useful characterizations for local, discrete portions of the nonperiodic and nonstationary timeseries, even though there is not a single frequency or amplitude for the entire timeseries, as in the case of periodic timeseries. Thus, rather than a global amplitude, phase, and frequency, analytic methods need to determine the instantaneous amplitude, phase, and frequency at specific time points within the timeseries. The timeseries is modeled as a function $y(t)$ defined by the expression 1818, which has a form similar to the form of the model for periodic oscillations in expressions 810-816. The function $y(t)$ models a general varying timeseries as a composition of component functions $u(t)$ and $v(t)$ or, equivalently, component functions $a(t)$ and $\theta(t)$ which are an instantaneous-amplitude function and an instantaneous-phase function, respectively. The function $u(t)=a(t)^*\cos(\theta(t))$ is essentially a function of two unknowns $a(t)$ and $\theta(t)$. However, the function $v(t)$ can be obtained from $u(t)$ via a Hilbert transform. The Hilbert transform is commonly defined by expression 1820. In this expression, "P.V." means "principal value," which essentially selects the principal branch of a multi-valued function. A simple example of a multi-valued function is the square-root function $y=\sqrt{x}$. The value of the square-root function for $x=4$ is either $-2$ or 2. The principal value for the square-root function is taken to be the positive value, rendering the principal branch of the square-root function single valued. As indicated by expression 1822, the Hilbert transform of the cosine function is the sine function. This indicates that the Hilbert transform shifts a function u by $-\pi/2$ radians while leaving the amplitude of the function unchanged. The integral in the expression for the Hilbert transform represents a convolution. FIG. 18C illustrates a convolution of the simple function $f(x)$, shown in plot 1824, with the simple function $g(x)$, shown in plot 1826. The function $g(-x)$ is plotted in plot 1828. Reversing the sign of the argument results in reflecting the function across the vertical axis. The convolution of the functions $f(x)$ and $g(x)$ involves reflecting the function $g(\tau)$ across the vertical axis, where the horizontal axis represents time $\tau$, by using the argument $t-\tau$, where t is a constant time value, moving the reflected function $g(t-\tau)$ to the left of the minimal time point at which the function $f(\tau)$ has a non-zero value, as shown in plot 1830, and then continuously moving the function $g(t-\tau)$ to the right, past the maximum time point at which the function $f(\tau)$ has a non-zero value, and computing, at each time point, the value of the integral:

$$\int_{\tau=-\infty}^{\infty} f(\tau)g(t-\tau)d\tau,$$

the computed value generating a point in the result of the convolution, as shown in a plot 1832. Plot 1834 shows the result of the convolution, denoted symbolically as $f(t)^*g(t)$, where the symbol "*" refers to convolution rather than multiplication. Note that $f(t)^*g(t)$ has nonzero values only when the functions $f(t)$ and $g(t-\tau)$ overlap, as at time points 1836 and 1838. Thus, as indicated by expressions 1840 in FIG. 18B, the Hilbert transform of a function u is a convolution $f(t)^*g(t)$ where $f=u$ and $g=1/\pi t$. A plot 1902 of the function $g=1/\pi t$ is shown at the top of FIG. 19. As shown in expression 1842, the function $v(t)$ is obtained as the Hilbert transform of the function $u(t)$, which is the observed nonperiodic and generally nonstationary timeseries or function u. Following use of the Hilbert transform, the analytic function $y(t)$ 1844 is obtained, allowing for the generation of the instantaneous-amplitude function 1846, the instantaneous-phase function 1848, and the instantaneous frequency function 1850.

FIG. 19 illustrates a portion of the currently disclosed methods incorporated in the currently disclosed systems that generate the above-discussed emotional compass, which provides emotional awareness to automated systems that monitor human interactions and/or interact with humans. The above-discussed EMD method 1904 is applied to a received dataset 1906, comprising valence values for a participant in an interaction, to produce a corresponding set of IMFs 1908. Recall that, in general, the first few IMFs produced by the EMD method are discarded, as they generally represent high-frequency noise. The currently disclosed methods and systems compute arousal-element values of the emotional-state vectors from analysis of valence values initially generated from the data received from the monitoring devices and sensors, as further discussed below. The analytical method 1910 based on the Hilbert transform, discussed above with reference to FIGS. 18B-C, is applied to each of the IMFs other than the trend or remainder $r_n$, to generate the composite analytical function 1912. Note that the instantaneous-phase function is obtained, as indicated in expression 1850 in FIG. 18B, by integrating the instantaneous frequency function $\omega(t)$. A monotone cubic interpolation is applied to the resulting instantaneous-phase function $\theta(t)$ to remove small negative-slope regions of the instantaneous-phase function $\theta(t)$ that are inconsistent with results obtained from interaction monitoring. The monotone cubic interpolation is similar to the above-described cubic-Hermite-spline method, involving modification to the slope values associated with knots in order to produce a monotonic curve. The result of this portion of the currently disclosed methods is to produce an instantaneous-amplitude, instantaneous-frequency, and instantaneous-phase functions for each IMF 1914.

Figure 20A:
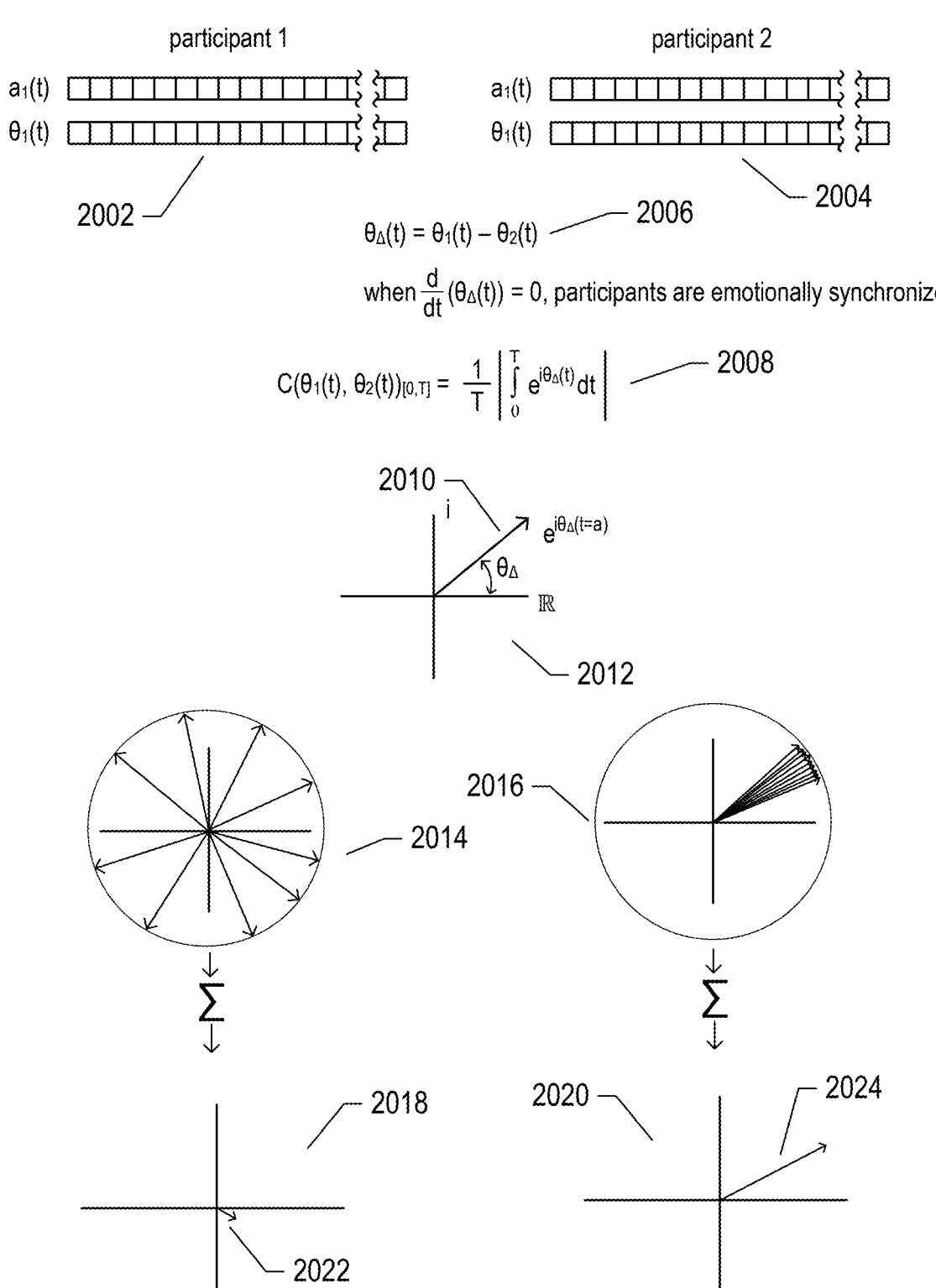

FIGS. 20A-B illustrate computation of the phase-coherence ("PC") metric value mentioned above with respect to FIG. 14. As discussed in the preceding paragraph, a time-series of valence values for each participant is processed using the EMD analysis method and the Hilbert-transform-based analysis method to produce instantaneous-amplitude, instantaneous-frequency, and instantaneous-phase functions or timeseries for each IMF produced by the EMD analysis method. The instantaneous-amplitude and instantaneous-phase functions for two participants 2002 and 2004 are shown at the top of FIG. 20A. A difference instantaneous-phase function $\theta_A$ is computed by subtracting the phase function of one of the participants from the phase function of the other participant, as indicated in expression 2006. When the rate of change of the difference instantaneous-phase function $\theta_A$ at a point in time is 0, or close to 0, the two participants are considered to be emotionally synchronized. This definition of emotional synchronization is consistent with the definitions of synchronization discussed above with reference to FIG. 10C. A phase-coherence value C can be computed, over an interval of T time points, for two participants according to expression 2008. The integrand in this expression is a vector 2010 in the complex plane 2012 with magnitude 1. Integrating such vectors over a time interval is equivalent to generating a vector sum over the time interval, as indicated by plots 2014 and 2016 showing the vectors in the complex plane and the corresponding plots 2018 and 2020, which show the results of vector addition of the vectors in plots 2014 and 2016. When the vectors have different directions, as in plot 2014, many of the vectors cancel one another out in the sum, as a result of which the resulting vector 2022 tends to have a rather small magnitude that is much less than T. By contrast, when all of the vectors all have similar directions, as in the case of the vector shown in plot 2016, the sum of the vectors 2024 generally has a magnitude close to T. Of course, all of the vectors have similar directions when the rate of change of the difference instantaneous-phase function $\theta_A$ is 0 or close to 0. Thus, the phase-covariance value computed for an interval of time points has a value equal or close to 0 when the two participants are emotionally synchronized and a value equal or close to 1 of the two participants are emotionally unsynchronized. Intermediate values represent intermediate degrees of emotional synchronization.

Turning to FIG. 20B, the phase-coherence value for a time interval within IMF j, $c_j$, is computed according to expression 2030. An amplitude for the same time interval in the same IMF j can be computed according to expression 2032. The phase coherence for two participants, $c_j$, for a particular time period within IMF j is computed in the same fashion as described by equation 2008 in FIG. 20A. The amplitude $a_j$ for the same particular time period within IMF j for two participants is computed as the average maximum amplitude in the time period within the instantaneous-amplitude functions for the two participants. The computed amplitude $a_j$ can then be used, along with the sum of the computed amplitudes $a_i$ for i ranging over the IMFs for the two participants to generate a weight $w_j$ for the jth IMF. This weight can then be used to generate a weighted phase-coherence value $\tilde{c}_j$ according to expression 2034, where $\tilde{c}_j = w_j * c_j$. Phase-coherence values for a particular time interval within all of the n IMFs for two participants can then be calculated as the sum of the phase-coherence values for each IMF, according to expression 2036, as the average of the individual-IMF coherence values, according to expression 2038, or by some other similar method for combining the individual-IMF coherence values to generate a phase-coherence value for a particular time interval within all of the n−1 IMFs for two participants. An instantaneous phase-coherence can be similarly computed for three or more participants as well as for multiple pairs of participants and other combinations of participants.

Figure 21A:
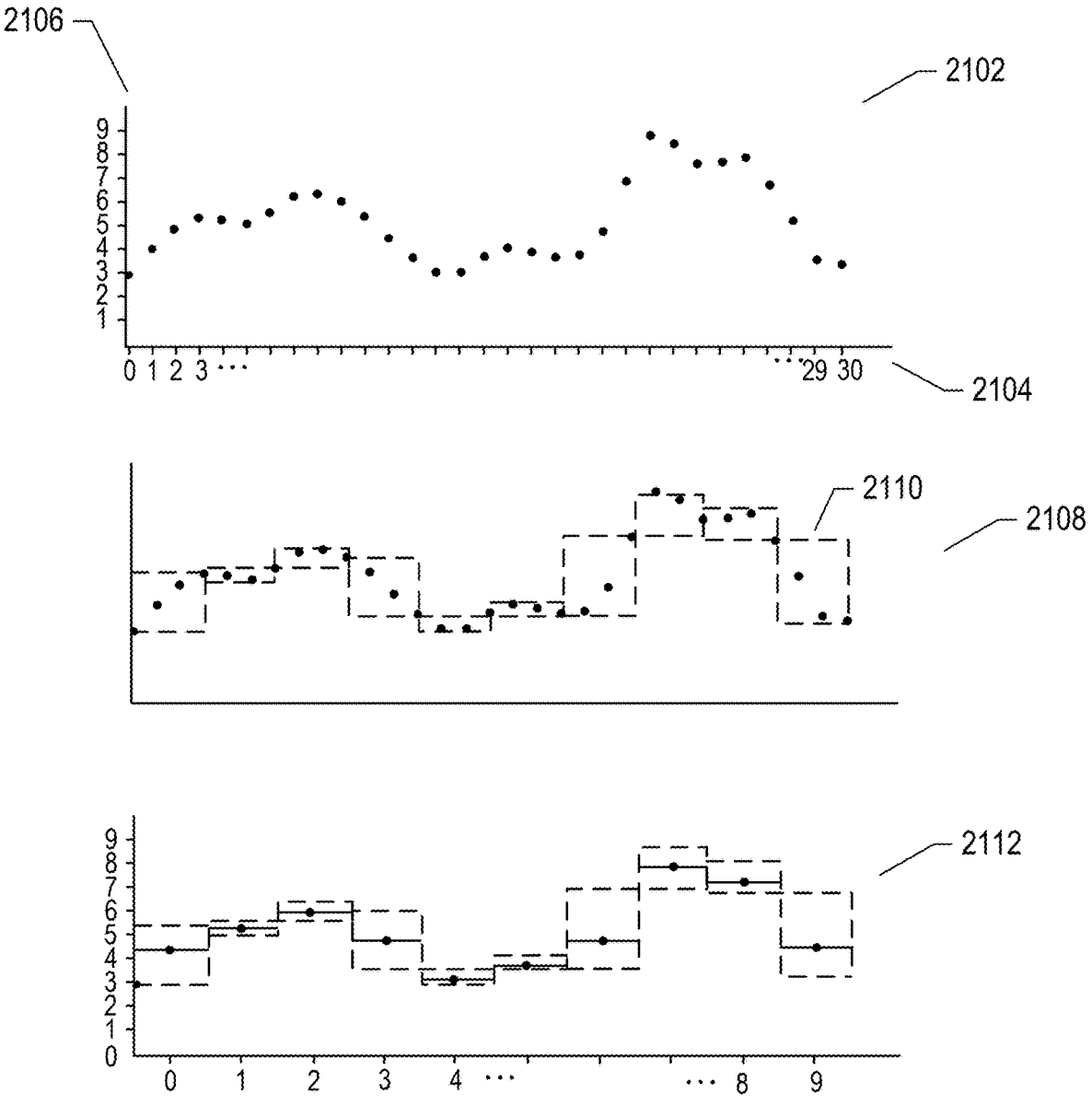
FIGS. 21A-B illustrate a method, used in the currently disclosed methods and systems, for quantizing and compressing a dataset, in particular a dataset corresponding to an instantaneous-amplitude or instantaneous-frequency function.
Figure 21B:
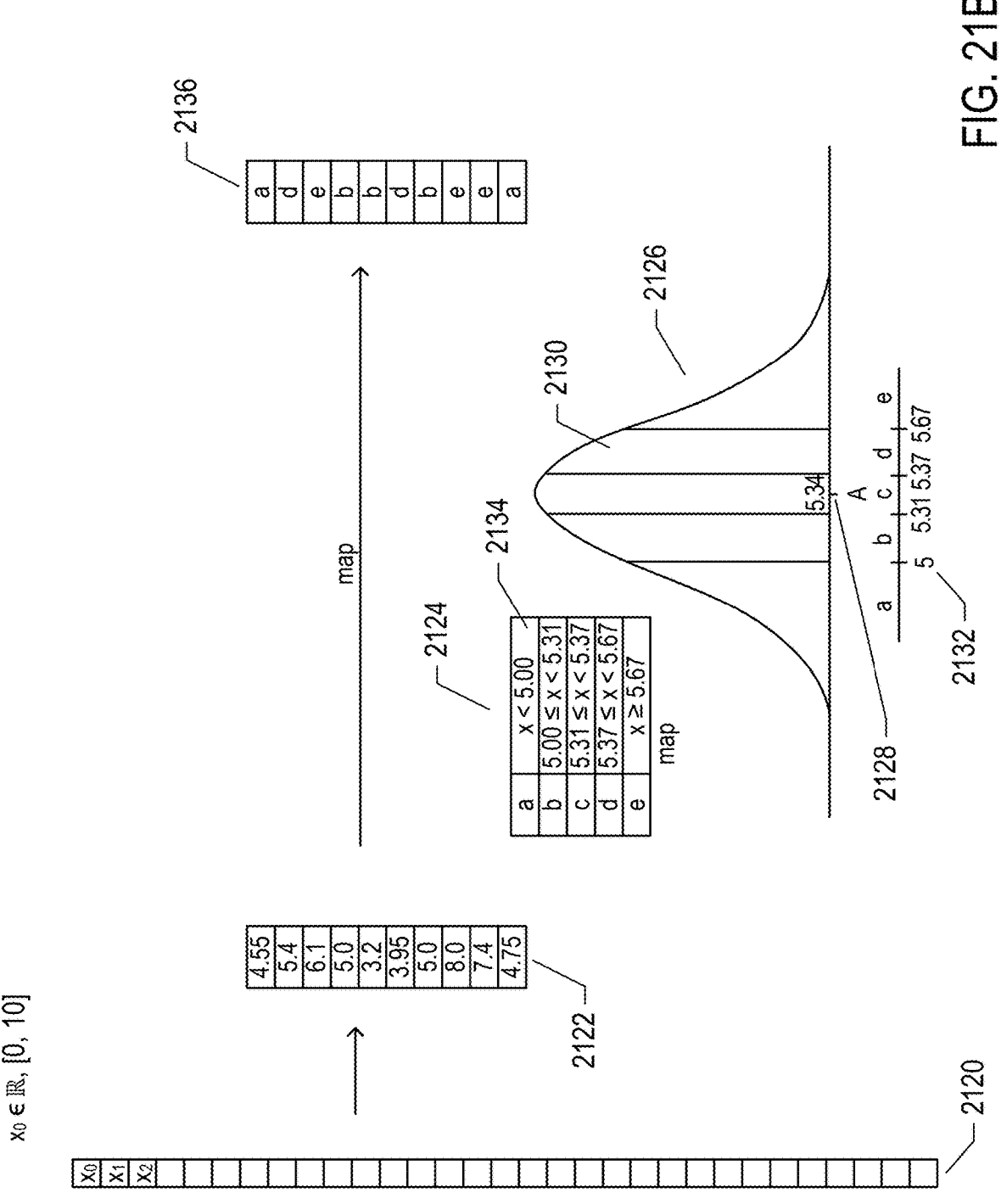

FIGS. 21A-B illustrate a method, used in the currently disclosed methods and systems, for quantizing and compressing a dataset, in particular a dataset corresponding to an instantaneous-amplitude or instantaneous-frequency function. Plot 2102 in FIG. 21A represents a timeseries. The horizontal axis 2104 represents time and the vertical axis 2106 represents an amplitude or frequency value. As shown by dashed rectangles in plot 2108, such as dashed rectangle 2110, the timeseries is partitioned into short, equal length of time intervals. As shown in plot 2112, an average value for each of the time intervals is computed to generate a step function. The step function represents a type of rescaling. In the example shown in FIG. 21A, each step of the step function spans four data points in the original timeseries shown in plot 2102, but the boundary points in each time interval are shared between two successive time intervals. Therefore, the scaling reduction is approximately 1:3. As shown in FIG. 21B, the original timeseries 2120 is rescaled to the quantized or step-function timeseries 2122 by the methods illustrated in FIG. 21A. Next, a map 2124 is generated to map floating-point timeseries values to discrete values represented by the characters "a," "b," "c," "d," and "c." The mapping uses a normal Gaussian distribution 2126 in order to attempt to map original timeseries floating-point values to the discrete values so that the number of timeseries floating-point values that map to each discrete value is equal. The normal Gaussian distribution 2126 is centered at the average floating-point value for timeseries values in the original timeseries 2128. The Gaussian distribution is divided into equal-probability sections, such as equal-probability section 2130, corresponding to each of the discrete values. The boundaries of the equal-probability sections therefore represent intervals for partitioning the floating-point values. For example, the boundary value 5 2132 is used in expression 2134 that indicates that all original timeseries values less than 5 are mapped to discrete value "a." The quantized step-function timeseries 2122 is then mapped, according to map 2124, to the final quantized and compressed timeseries 2136.

Figure 22:
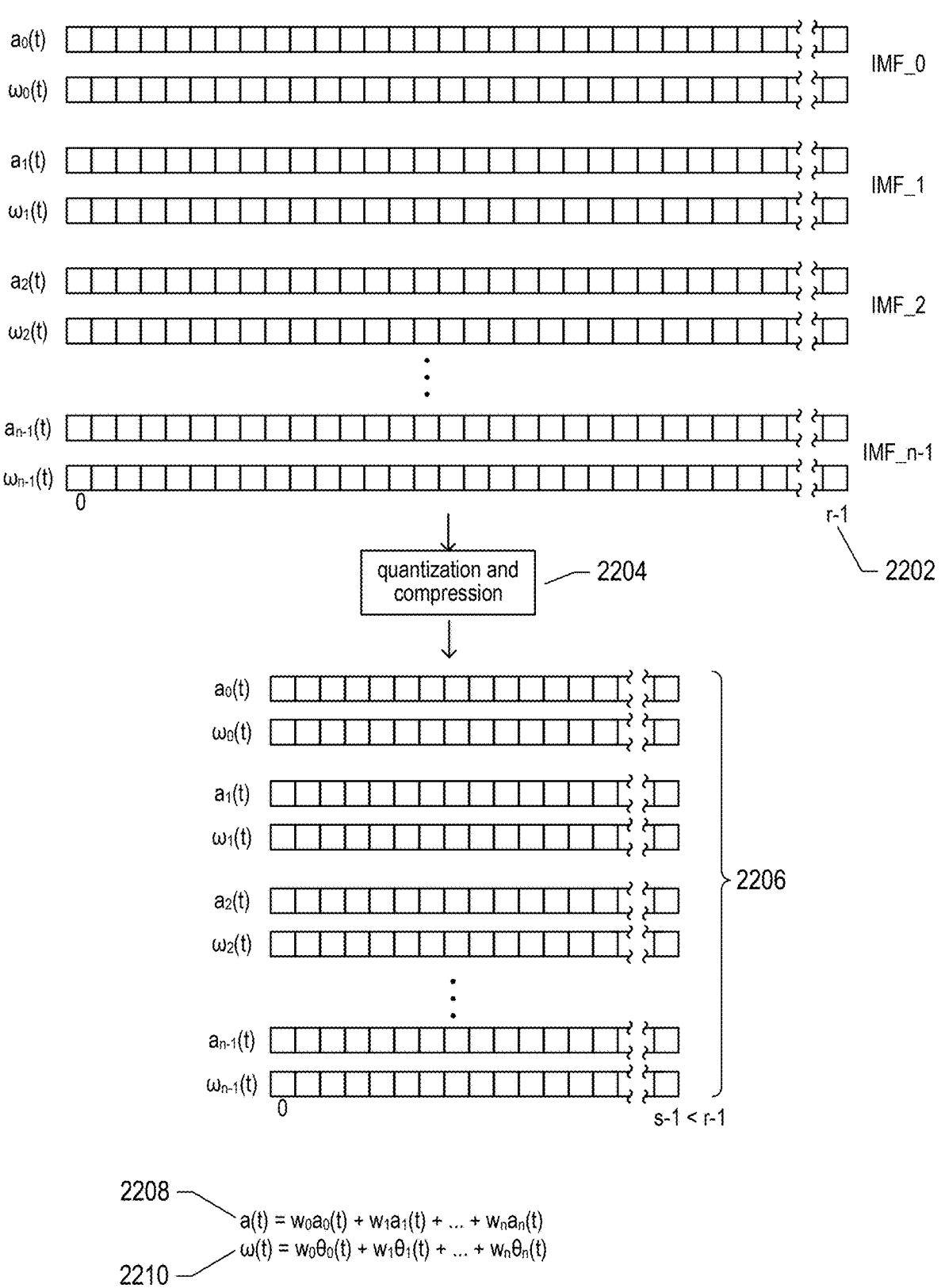
FIG. 22 illustrates the quantization and compression of the instantaneous-amplitude and instantaneous-frequency functions generated for each of the n IMFs for a participant and aggregation of the quantized and compressed instantaneous-amplitude and instantaneous-frequency functions to generate an aggregate quantized instantaneous-amplitude function and an aggregate quantized instantaneous-frequency function.

FIG. 22 illustrates the quantization and compression of the instantaneous-amplitude and instantaneous-frequency functions generated for each of the n IMFs for a participant and aggregation of the quantized and compressed instantaneous-amplitude and instantaneous-frequency functions to generate an aggregate quantized instantaneous-amplitude function and an aggregate quantized instantaneous-frequency function. The instantaneous-amplitude and instantaneous-frequency functions generated for each of the n IMFs 2202 are compressed by the quantization and compression method 2204 discussed above with reference to FIG. 21A to produce quantized and compressed instantaneous-amplitude and instantaneous-frequent functions 2206. Then the resulting instantaneous-amplitude function 2208 and the resulting instantaneous-frequency function 2210 are generated by employing a normalized weighting method, where the rates are determined from additional characteristics of the multiple instantaneous-amplitude and instantaneous-frequency functions corresponding to multiple IMFs, from historical data, and/or from additional sources. There are many alternative approaches to generating an aggregate or composite instantaneous-amplitude function from the multiple instantaneous-amplitude functions corresponding to the multiple IMFs and many alternative approaches to generating an aggregate or composite instantaneous-frequency function from the multiple instantaneous-frequency functions corresponding to the multiple IMFs.

Figure 23:
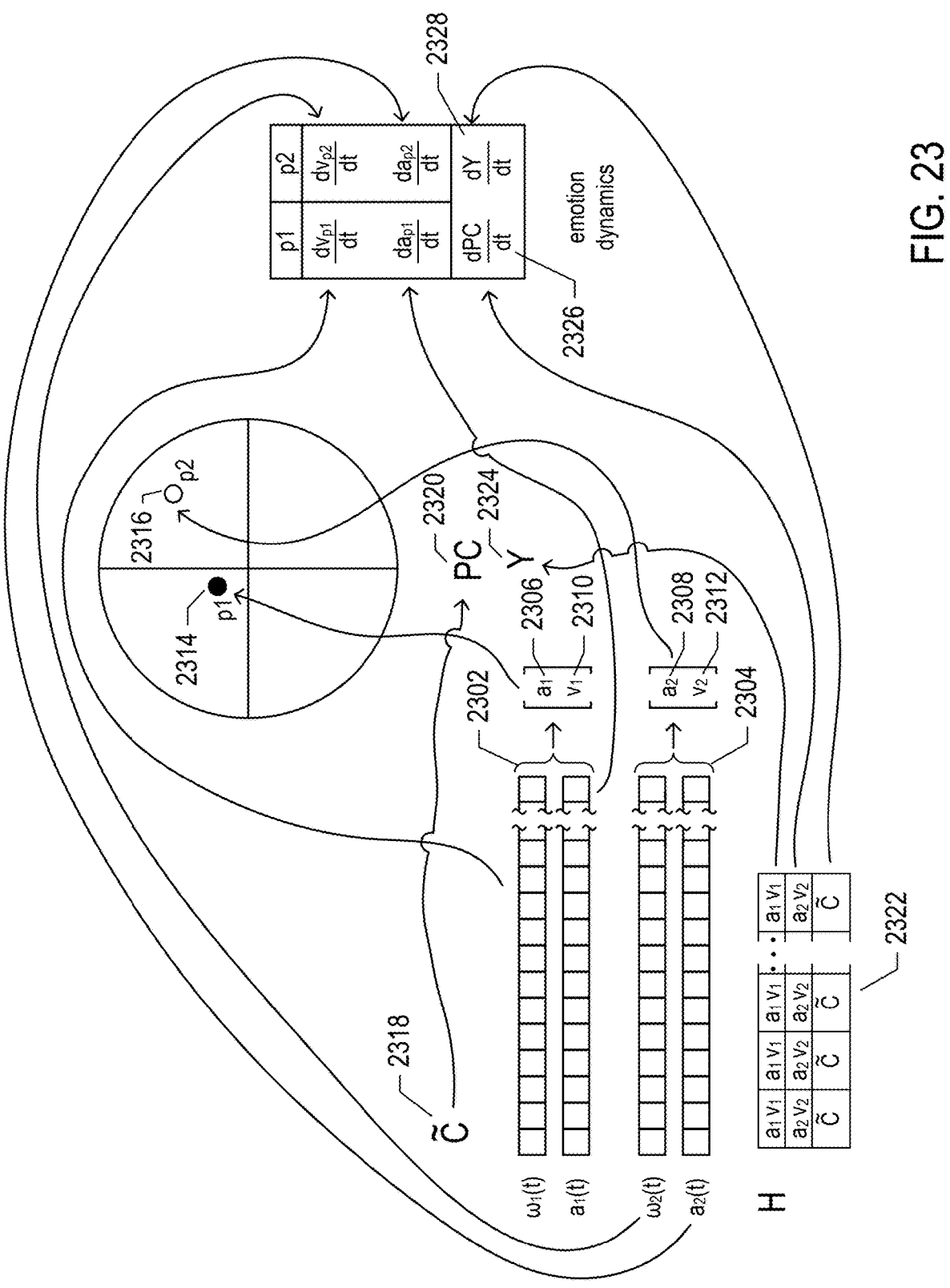
FIG. 23 illustrates the information sources from which the various components of the emotional compass, discussed above with reference to FIG. 14, are obtained.

FIG. 23 illustrates the information sources from which the various components of the emotional compass, discussed above with reference to FIG. 14, are obtained. The above discussion of FIG. 15A-22 explains how instantaneous-amplitude and instantaneous-frequency functions are generated for participants of an interaction. FIG. 23 shows a pair of quantized and compressed instantaneous-amplitude and instantaneous-frequency functions for a first participant 2302 and a pair of quantized and compressed instantaneous-amplitude and instantaneous-frequency functions for a second participant 2304. The arousal elements 2306 and 2308 in state vectors 2310 and 2312 for the two participants are determined from the instantaneous-frequency functions. Recall that the emotional compass is associated with a particular time point in the arousal-element values are proportional to the instantaneous frequencies at that time point. Similarly, the values of the valence elements are proportional to the instantaneous amplitudes at the time point. Thus, the state vectors 2310 and 2312 are directly obtained from the quantized and compressed instantaneous-amplitude and instantaneous-frequency functions. The state vectors are plotted as points in a representation of emotional-state space 2314 and 2316. The phase-coherence metric value 2318 computed from the instantaneous-amplitude and instantaneous-phase functions for the two participants provides the phase-coherence value 2320 of the emotional compass. A history of previous state vectors 2322 is used to compute the synchronization metric Y 2324, as discussed above with reference to FIG. 11A-F. The history of previous state vectors and phase-coherence metrics 2322 is also used to estimate the first derivatives of the phase-coherence metric 2326 and the synchronization metric 2328. The first derivatives of the valence and arousal elements of the state vectors are estimated from the quantized and compressed instantaneous-frequency and instantaneous-amplitude functions for the participants. Estimations of the first derivatives generally involve computation over local intervals of these functions centered at the specific time associated with the state of the emotional compass.

Figure 24A:
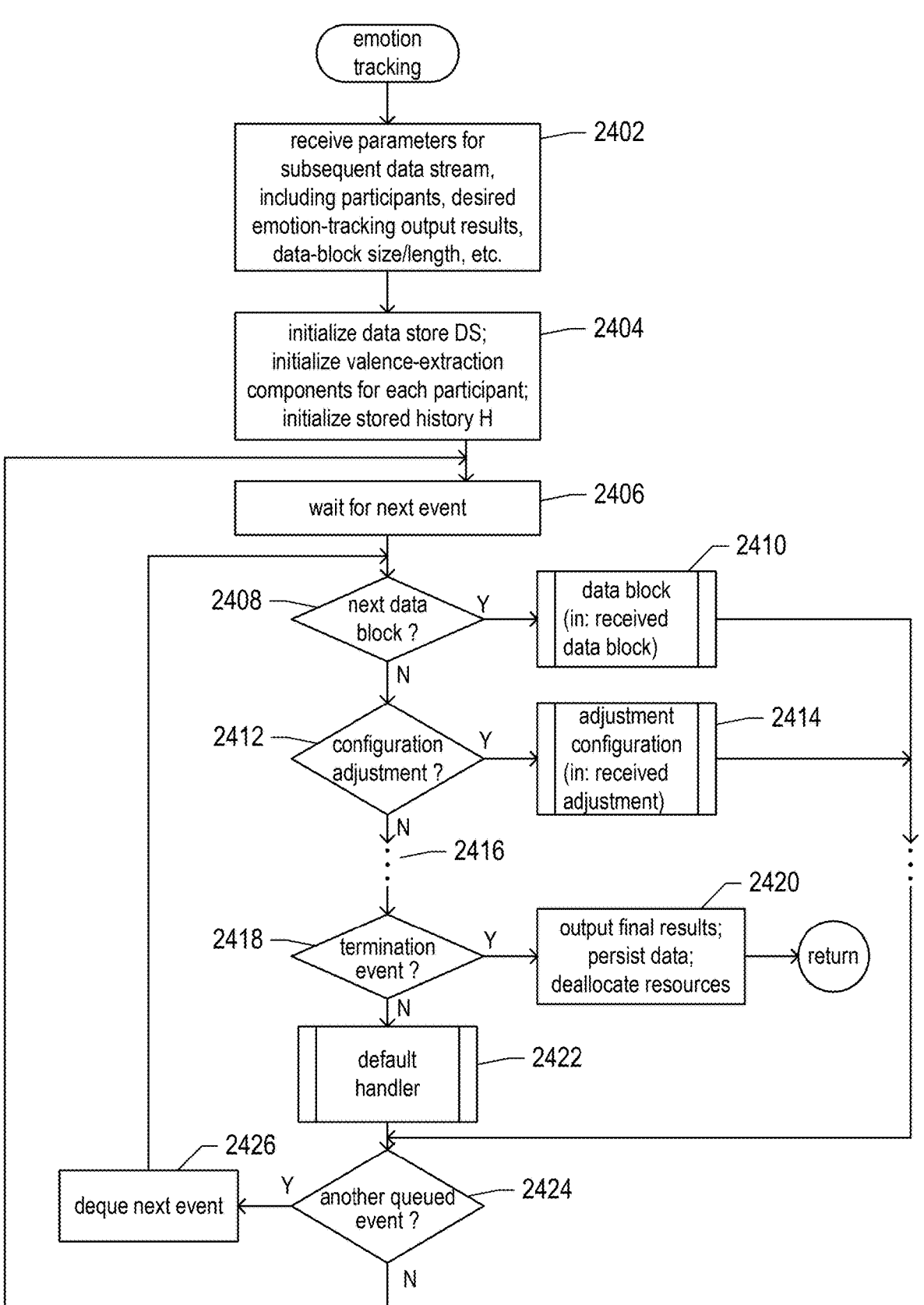
FIGS. 24A-B provide control-flow diagrams for a routine "emotion tracking" that continuously receives blocks of data and generates the above-discussed emotional compass by processing and analyzing each received block of data along with historical data.
Figure 24B:
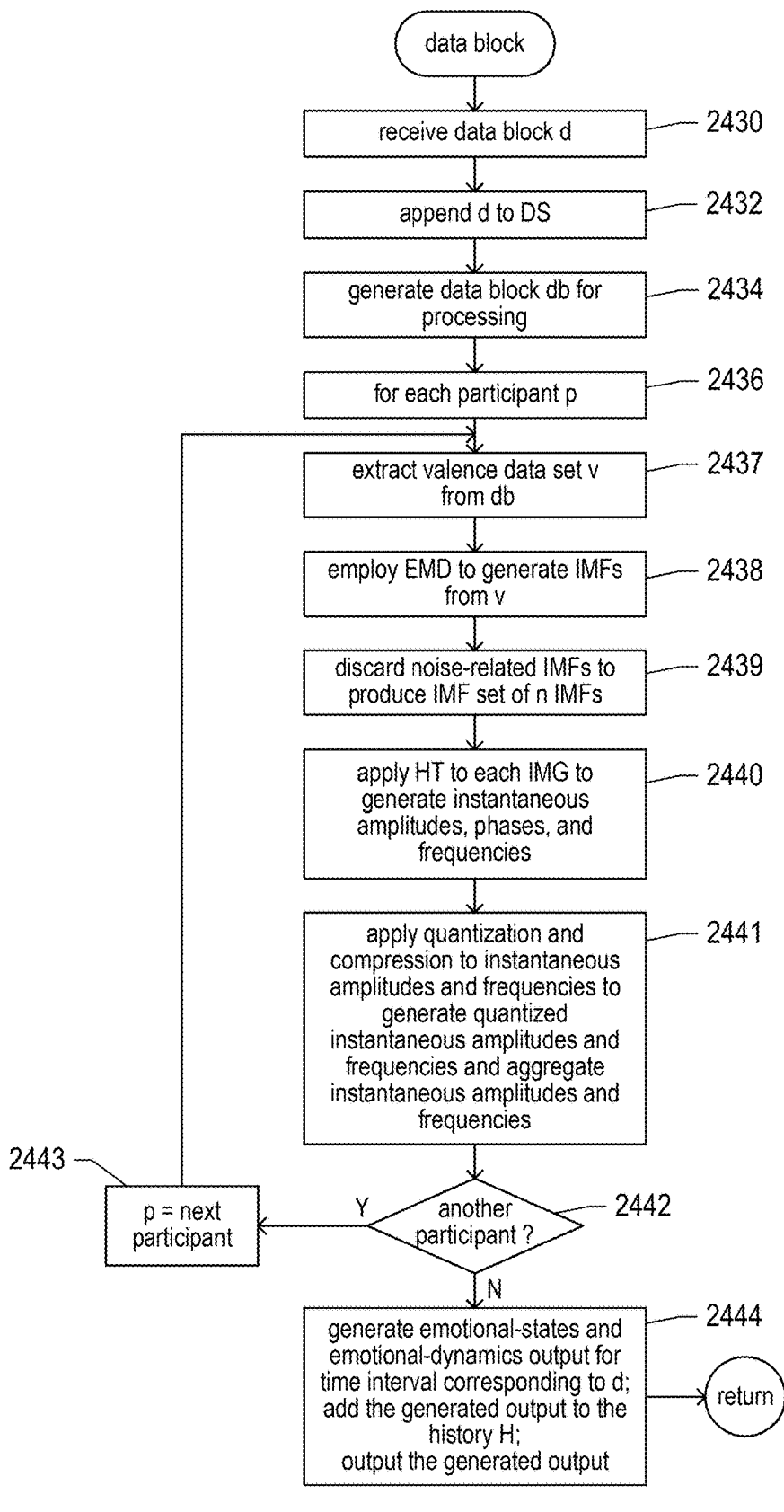

FIGS. 24A-B provide control-flow diagrams for a routine "emotion tracking" that continuously receives blocks of data and generates the above-discussed emotional compass by processing and analyzing each received block of data along with historical data. In step 2402 of FIG. 24A, the routine "emotion tracking" receives parameters for a data stream that will be subsequently received by the routine "emotion tracking," including the number and identities of the participants in an interaction, specification of the desired emotion-tracking output results, the expected data-block lengths or time interval between data blocks, the contents of the data blocks, and other such information. In step 2404, the routine "emotion tracking" initializes a data store DS, initializes valence-extraction components for each participant, and initializes a stored history H of results. In step 2406, the routine "emotion tracking" waits for the occurrence of a next event. When the next event is reception of a next data block, as determined in step 2408, a routine "data block" is called to process the received data block in step 2410. Otherwise, when the event represents some type of configuration adjustment, as determined in step 2412, a routine is called to affect the requested configuration adjustment, in step 2414. Ellipsis 2416 in the case of many other types of events may be received and handled by the routine "emotion tracking." When the next event is a termination event, as determined in step 2418, any final results are output, data is persisted, and resources are deallocated, in step 2420, following which the routine "emotion tracking" returns. A default handler, called in step 2422, handles any rare and unexpected events. When another event has been queued for handling, as determined in step 2424, a next event is dequeued, in step 2426, and control flows back to step 2408 for handling of the dequeued event. Otherwise, control returns to step 2406 where the routine "emotion tracking" waits for the occurrence of a next event.

FIG. 24B provides a control-flow diagram for the routine "data block," called in step 2410 of FIG. 24A. In step 2430, a data block d is received by the routine "data block." In step 2432, the routine "data block" appends the received data block to the data store. In step 2434, a data block db is generated for processing. The data block db may be identical to the received data block d, in certain implementations, but may include some amount of previously received data, in other implementations, to minimize discontinuities in the processing results. In the for-loop of steps 2436-2443, each participant p in the interaction is considered. In step 2437, the valence dataset v for the currently considered participant is extracted from data block db. Then, in step 2438, the EMD analysis method is employed to generate a set of IMFs from v. In step 2439, noisy, high-frequency IMFs are discarded to produce a set of n IMFs and a trend or remainder. In step 2440, a Hilbert-transform-based method is used to generate instantaneous-amplitude, instantaneous-frequency, and instantaneous-phase functions for each IMF. In step 2441, the above-discussed quantization and compression method is applied to the instantaneous-amplitude and instantaneous-frequency functions to generate quantized and compressed instantaneous-amplitude and instantaneous-frequency functions and to aggregate instantaneous-amplitude and instantaneous-frequency functions for the currently considered participant. When there is an additional participant to consider, as determined in step 2442, control returns to step 2437 to carry out the processing steps 2437-2441 for the next participant. Following completion of the for-loop of steps 2436-2443, the routine "data block" generates emotional-states and emotional-dynamics outputs for the time interval corresponding to the received data block d, in step 2444. This includes computing one or more phase-coherence metrics, such as pairwise phase-coherence metrics or multi-participant phase-coherence metrics based on more than two participants when there are more than two participants in the monitored interaction. The generated output is added to the history H and is then output to a display, a computational entity or automated system that uses the output for various purposes mentioned above, and/or to a data store or file for subsequent use by human users and/or automated systems.

The present invention has been described in terms of particular embodiments, it is not intended that the invention be limited to these embodiments. Modifications within the spirit of the invention will be apparent to those skilled in the art. For example, any of many different implementations of the currently disclosed methods and systems can be obtained by varying various design and implementation parameters, including modular organization, control structures, data
structures, hardware, operating system, and virtualization
layers, automated orchestration systems, virtualization-ag-
gregation systems, and other such design and implementa-
tion parameters.

The invention claimed is:

1. A first automated system that monitors interactions
between two or more humans or between a human and the
first automated system or a second automated system, the
first automated system comprising:
   one or more computer systems, each having one or more
      processors and one or more memories;
   one or more monitoring devices and/or sensors; and
   computer instructions, stored in one or more of the one or
      more memories that, when executed by one or more of
      the one or more processors of one or more of the one
      or more computer systems, control the emotionally
      aware, automated system to
      receive output data from the monitoring devices and/or
         sensors,
      process the received output data to continuously, peri-
         odically, or intermittently generate emotional-state
         vectors for one or more human or automated-system
         interaction participants,
      process the received output data and/or generated emo-
         tional-state vectors to generate one or more phase-
         coherence metrics and one or more emotional-syn-
         chronization metrics, and
      use the generated emotional-state vectors, the one or
         more generated phase-coherence metrics, and the
         one or more emotional-synchronization metrics to
         generate and output a response to one or more human
         interaction participants.

2. The first automated system of claim 1 incorporated into,
or accessed by, an application, the second automated system,
or a third automated system that implements one of:
   a call center;
   an automated-instruction system;
   an automated medical-diagnosis system; and
   an automated relationship-analysis system.

3. The first automated system of claim 1 wherein the
monitoring devices and/or sensors include one or more of:
   one or more audio sensors, such as microphones;
   a video camera;
   a user data-input device; and
   physiological sensors.

4. The first automated system of claim 1 wherein each
emotional-state vector includes:
   a valence element having a value that indicates a degree
      of positive/negative feeling; and
   an arousal element having a value that indicates a degree
      of interest, enthusiasm, and/or participation.

5. The first automated system of claim 1 wherein the
received output data is processed to generate emotional-state
vectors for one or more human or automated-system inter-
action participants by:
   receiving, for each participant, a timeseries dataset gen-
      erated from the received output data;
   generating a valence dataset from each timeseries dataset;
      and
   for each generated valence dataset,
      generating multiple intrinsic mode functions using an
         empirical-mode-decomposition method,
      generating, from intrinsic mode functions selected from
         the multiple intrinsic mode functions, a composite
         analytical function, using a Hilbert transform, generating an instantaneous-amplitude function, an
      instantaneous-frequency function, and an instanta-
      neous-phase function from the composite analytical
      function for each intrinsic mode function,
   generating a quantized-and-compressed instantaneous-
      amplitude function from the generated instanta-
      neous-amplitude functions,
   generating a quantized-and-compressed instantaneous-
      frequency function from the generated instanta-
      neous-frequency functions, and
   generating a time-ordered sequence of emotional-state
      vectors from the quantized-and-compressed instan-
      taneous-frequency function and the quantized-and-
      compressed instantaneous-amplitude function.

6. The first automated system of claim 5
   wherein the quantized-and-compressed instantaneous-
      amplitude function is generated by
      aggregating the instantaneous-amplitude functions
         generated from each of multiple intrinsic mode func-
         tions to generate an aggregate instantaneous-ampli-
         tude function, and
      using a quantization-and-compression method that res-
         cales the aggregate instantaneous-amplitude func-
         tion and attempts to map values in the rescaled
         aggregate instantaneous-amplitude function to final
         values with equal probabilities of occurrence in the
         quantized-and-compressed instantaneous-amplitude
         function; and
   wherein the quantized-and-compressed instantaneous-fre-
      quency function is generated by
      aggregating the instantaneous-frequency functions
         generated from each of multiple intrinsic mode func-
         tions to generate an aggregate instantaneous-fre-
         quency function, and
      using a quantization-and-compression method that res-
         cales the aggregate instantaneous-frequency func-
         tion and attempts to map values in the rescaled
         aggregate instantaneous-frequency function to final
         values with equal probabilities of occurrence in the
         quantized-and-compressed instantaneous-frequency
         function.

7. The first automated system of claim 5 wherein the
received output data and/or generated emotional-state vec-
tors are processed to generate one or more emotional-
synchronization metrics by one of:
   computing instantaneous phase-difference functions from
      instantaneous phases functions; and
   comparing emotional-state paths of two or more interac-
      tion participants.

8. The first automated system of claim 7 wherein com-
paring the emotional-state paths of two interaction partici-
pants comprises:
   numerically labeling a set of emotional-state vectors for
      each of the two interaction participants to indicate time
      points associated with the emotional-state vectors to
      generate a path of successive emotional-state vectors
      for each interaction participant,
   for each of n pairs of emotional-state vectors having the
      same numerical label selected from the two paths of
      successive emotional-state vectors, computing a differ-
      ence vector and adding the computed difference vector
      to a difference-vector sum;
   dividing the difference-vector sum by n to produce an
      average difference vector; and
   computing a synchronization value as the average of the
      magnitudes of the average difference vector subtracted
      from the n difference vectors.

9. The first automated system of claim 7 wherein instantaneous phase-difference functions are computed for two participants from instantaneous-phase functions and instantaneous-amplitude functions computed for the two participants by:

for each intrinsic mode function, computing the difference between the instantaneous-phase functions corresponding to the intrinsic mode function for each of the two participants to generate an instantaneous phase-difference function.

10. The first automated system of claim 7 wherein an emotional-synchronization metric for the two participants is computed by differentiating the instantaneous phase-difference functions.

11. The first automated system of claim 7 wherein a phase-coherence metric is computed for two participants from the instantaneous phase-difference functions by:

for a time interval T, computing, from the instantaneous phase-difference functions, phase-coherence values for time interval T by integrating an exponential function of each instantaneous phase-difference function over time interval T, computing a weight for each phase-coherence value from the instantaneous-amplitude function computed from the intrinsic mode function corresponding to the phase-coherence value, and computing a phase-coherence-metric value from the phase-coherence values and weights.

12. The first automated system of claim 1 further comprising an automated emotional compass that incorporates a selection of the generated emotional-state vectors, one or more phase-coherence metrics, and one or more emotional-synchronization metrics into one or more of:

an emotional-compass data structure; and a graphical representation of the emotional-compass data structure.

13. A method for automatically generating an emotional-compass data structure containing one or more emotional-state vectors, one or more phase-coherence metrics, and one or more emotional-synchronization metrics, the method comprising:

employing one or more computer systems, each having one or more processors and one or more memories and one or more monitoring devices and/or sensors to monitor interactions between two or more humans or between a human and the first automated system or an automated system, generate output data from the monitoring devices and/or sensors, process the output data to continuously, periodically, or intermittently generate emotional-state vectors for one or more human or automated-system interaction participants, process the received output data and/or generated emotional-state vectors to generate one or more phase-coherence metrics and one or more emotional-synchronization metrics, and use the generated emotional-state vectors, the one or more generated phase-coherence metrics, and the one or more emotional-synchronization metrics to generate and output a response to one or more human interaction participants.

14. The method of claim 13 wherein each emotional-state vector includes:

a valence element having a value that indicates a degree of positive/negative feeling; and an arousal element having a value that indicates a degree of interest, enthusiasm, and/or participation.

15. The method of claim 13 wherein the received output data is processed to generate emotional-state vectors for one or more human or automated-system interaction participants by:

receiving, for each participant, a timeseries dataset generated from the received output data;

generating a valence dataset from each timeseries dataset;

for each generated valence dataset, generating multiple intrinsic mode functions using an empirical-mode-decomposition method, generating, from intrinsic mode functions selected from the multiple intrinsic mode functions, a composite analytical function, using a Hilbert transform, generating an instantaneous-amplitude function, an instantaneous-frequency function, and an instantaneous-phase function from the composite analytical function for each intrinsic mode function, generating a quantized-and-compressed instantaneous-amplitude function from the generated instantaneous-amplitude functions, generating a quantized-and-compressed instantaneous-frequency function from the generated instantaneous-frequency functions, and generating a time-ordered sequence of emotional-state vectors from the quantized-and-compressed instantaneous-frequency function and the quantized-and-compressed instantaneous-amplitude function.

16. The method of claim 15 wherein the quantized-and-compressed instantaneous-amplitude function is generated by aggregating the instantaneous-amplitude functions generated from each of multiple intrinsic mode functions to generate an aggregate instantaneous-amplitude function, and using a quantization-and-compression method that rescales the aggregate instantaneous-amplitude function and attempts to map values in the rescaled aggregate instantaneous-amplitude function to final values with equal probabilities of occurrence in the quantized-and-compressed instantaneous-amplitude function; and wherein the quantized-and-compressed instantaneous-frequency function is generated by aggregating the instantaneous-frequency functions generated from each of multiple intrinsic mode functions to generate an aggregate instantaneous-frequency function, and using a quantization-and-compression method that rescales the aggregate instantaneous-frequency function and attempts to map values in the rescaled aggregate instantaneous-frequency function to final values with equal probabilities of occurrence in the quantized-and-compressed instantaneous-frequency function.

17. The method of claim 15 wherein the received output data and/or generated emotional-state vectors are processed to generate one or more emotional-synchronization metrics by one of:

computing instantaneous phase-difference functions from instantaneous phases functions; and comparing emotional-state paths of two or more interaction participants.

18. The method of claim 17 wherein comparing the emotional-state trajectories of two interaction participants comprises:

numerically labeling a set of emotional-state vectors for each of the two interaction participants to indicate time points associated with the emotional-state vectors to generate a path of successive emotional-state vectors for each interaction participant, for each of n pairs of emotional-state vectors having the same numerical label selected from the two paths of successive emotional-state vectors, computing a difference vector and adding the computed difference vector to a difference-vector sum;

dividing the difference-vector sum by n to produce an average difference vector; and computing a synchronization value as the average of the magnitudes of the average difference vector subtracted from the n difference vectors.

19. The method of claim 17 wherein instantaneous phase-difference functions are computed for two participants from instantaneous-phase functions and instantaneous-amplitude functions computed for the two participants by:

for each intrinsic mode function, computing the difference between the instantaneous-phase functions corresponding to the intrinsic mode function for each of the two participants to generate an instantaneous phase-difference function.

20. The method of claim 19 wherein an emotional-synchronization metric for the two participants is computed by differentiating the instantaneous phase-difference functions.

21. The method of claim 19 wherein a phase-coherence metric is computed for two participants from the instantaneous phase-difference functions by:

for a time interval T, computing, from the instantaneous phase-difference functions, phase-coherence values for time interval T by integrating an exponential function of each instantaneous phase-difference function over time interval T, computing a weight for each phase-coherence value from the instantaneous-amplitude function computed from the intrinsic mode function corresponding to the phase-coherence value, and computing a phase-coherence-metric value from the phase-coherence values and weights.

\* \* \* \* \*